US012614881B2

(12) United States Patent
O'Rourke

(10) Patent No.: US 12,614,881 B2
(45) Date of Patent: Apr. 28, 2026

(54) WIRELESS MONITORING OF ELECTRICAL CONNECTOR

(71) Applicant: Kevin O'Rourke, Nashville, TN (US)

(72) Inventor: Kevin O'Rourke, Nashville, TN (US)

( * ) Notice: Subject to any disclaimer, the term of this patent is extended or adjusted under 35 U.S.C. 154(b) by 0 days.

(21) Appl. No.: 18/099,535

(22) Filed: Jan. 20, 2023

(65) Prior Publication Data

US 2023/0253741 A1 Aug. 10, 2023

Related U.S. Application Data

(63) Continuation of application No. 16/863,964, filed on Apr. 30, 2020, now Pat. No. 11,594,847.

(51) Int. Cl.
*H01R 13/713* (2006.01)
*G08B 5/22* (2006.01)
(Continued)

(52) U.S. Cl.
CPC ............. *H01R 13/713* (2013.01); *G08B 5/22* (2013.01); *G08B 21/182* (2013.01);
(Continued)

(58) Field of Classification Search
CPC .............. H01R 13/713; H01R 13/6683; H01R 13/6691; H01R 13/7135; H01R 31/065; H01R 25/003; H01R 13/7137; H01R 24/22; H01R 24/30; G08B 5/22; G08B 21/182; G08B 17/06; Y02T 10/70; Y02T 10/7072;
(Continued)

(56) References Cited

U.S. PATENT DOCUMENTS 1,512,888 A 10/1924 Haft
1,758,982 A 5/1930 Seghers
(Continued)

FOREIGN PATENT DOCUMENTS

CN 101814765 A * 8/2010
CN 102738859 A * 10/2012 ................ B60L 3/04
(Continued)

OTHER PUBLICATIONS

Sphiroth, J; Title: Integrated electric meter and an electric vehicle charging; entire specification and drawings (Year: 2012).*
(Continued)

*Primary Examiner* — Dharti H Patel
(74) *Attorney, Agent, or Firm* — Merchant & Gould P.C.

(57) ABSTRACT

An electrical connector includes a male electrical plug, a female socket, a housing, and a control system. The male electrical plug, which is supplied with power, is electrically connected to the female socket. The housing contains the male electrical plug, the female socket, and a control system. The control system includes a temperature sensor and a transceiver with the temperature sensor sensing a temperature at a location within the housing and the transceiver transmitting a signal representative of the temperature to an alarm device remotely located from the electrical connector. The electrical connector can include one or more switches that are remotely controllable by the alarm device to interrupt the electrical connection between the male plug and the female socket.

29 Claims, 34 Drawing Sheets

(51) Int. Cl.
*G08B 21/18* (2006.01)
*H01R 13/66* (2006.01)
*H01R 25/00* (2006.01)
*H01R 31/06* (2006.01)

(52) U.S. Cl.
CPC ..... *H01R 13/6683* (2013.01); *H01R 13/6691* (2013.01); *H01R 13/7135* (2013.01); *H01R 31/065* (2013.01); *H01R 25/003* (2013.01)

(58) Field of Classification Search
CPC ......... Y02T 90/12; Y02T 90/14; Y02T 90/16; G01K 1/024; G01K 3/005
USPC .................................................... 361/56, 103
See application file for complete search history.

(56) References Cited

U.S. PATENT DOCUMENTS 1,818,884 A 8/1931 Eckstein
1,974,472 A 9/1934 Seghers
2,456,038 A 12/1948 Young
2,675,444 A 4/1954 Shapiro
2,680,234 A 6/1954 Kissick
3,359,527 A 12/1967 Hart
3,409,858 A 11/1968 Krehbiel
3,536,907 A 10/1970 Kramer
3,584,213 A 6/1971 Meltzer
3,594,681 A 7/1971 Weiss
3,656,083 A 4/1972 Brook
3,890,030 A 6/1975 Mcdaniel
4,037,901 A 7/1977 Kaszuba
4,083,621 A 4/1978 Davidson et al.
4,278,970 A 7/1981 Streczyn et al.
4,369,487 A 1/1983 Carlow
4,390,228 A 6/1983 Schleusner
4,520,239 A 5/1985 Schwartz
4,577,094 A 3/1986 Mills
4,644,456 A 2/1987 Lydell
4,653,829 A 3/1987 Lamont
4,717,350 A 1/1988 Lax
4,781,609 A 11/1988 Wilson et al.
4,861,288 A 8/1989 Friedman
4,864,477 A 9/1989 Engelman
4,875,874 A 10/1989 Windsor
5,071,367 A 12/1991 Luu
5,096,434 A 3/1992 Byrne
5,102,345 A 4/1992 Stanwick et al.
5,171,159 A 12/1992 Byrne
5,174,785 A 12/1992 Endo et al.
5,213,519 A 5/1993 Dorfman
5,231,519 A 7/1993 Koike
5,234,360 A 8/1993 Kramer, Jr.
5,236,374 A 8/1993 Leonard et al.
5,238,416 A 8/1993 Dickie
5,238,424 A 8/1993 Vindum
5,308,253 A 5/1994 Maki
5,315,476 A 5/1994 Hedrick
5,418,521 A 5/1995 Read
5,418,678 A 5/1995 Mcdonald
5,453,916 A 9/1995 Tennis et al.
5,541,800 A 7/1996 Misencik
5,541,803 A 7/1996 Pope, Jr. et al.
5,542,852 A 8/1996 Yu-Yuan
5,600,306 A 2/1997 Ichikawa et al.
5,642,248 A 6/1997 Campolo et al.
5,657,841 A 8/1997 Morvan
5,742,464 A 4/1998 Ceola et al.
5,742,466 A 4/1998 Kram
5,833,357 A 11/1998 Ting
5,834,696 A 11/1998 Kurosawa et al.
5,841,617 A 11/1998 Watkins, Jr. et al.
5,862,030 A 1/1999 Watkins, Jr. et al.
5,899,761 A 5/1999 Crane et al.
5,900,804 A 5/1999 Yewell
5,902,148 A 5/1999 O'Rourke
5,917,416 A 6/1999 Read
5,931,702 A 8/1999 Fladung
5,993,239 A 11/1999 Wright
6,150,940 A 11/2000 Chapman et al.
6,172,860 B1 1/2001 Yoshimizu et al.
6,315,617 B1 11/2001 Al-Sabah
6,326,766 B1 12/2001 Small
6,409,531 B1 6/2002 Millard
6,481,875 B1 11/2002 Bryant
6,486,407 B1 11/2002 Hawker et al.
6,512,444 B1 1/2003 Morris et al.
6,514,099 B2 2/2003 Endo
6,552,888 B2 4/2003 Weinberger
6,603,385 B2 8/2003 Kitchens
6,801,117 B2 10/2004 Morris et al.
6,805,579 B2 10/2004 Marchand et al.
6,847,300 B2 1/2005 Yee et al.
6,863,555 B2 3/2005 Ito
6,893,153 B2 5/2005 Hoffer et al.
6,929,514 B1 8/2005 Chuang
6,985,083 B2 1/2006 Yost et al.
7,066,616 B2 6/2006 Howell
7,198,502 B2 4/2007 Koenig et al.
7,210,813 B2 5/2007 Harwood
7,210,960 B2 5/2007 Mak
7,410,377 B2 8/2008 Wharton
7,515,057 B2 4/2009 Chen
D599,290 S 9/2009 Lee
D614,134 S 4/2010 Chen et al.
D618,617 S 6/2010 Lee
7,808,761 B2 10/2010 O'Rourke
8,242,918 B2 8/2012 Brusveen et al.
8,541,716 B2 9/2013 Moran et al.
8,605,402 B2 12/2013 Ward et al.
8,706,270 B2 4/2014 Fadell et al.
8,834,198 B2 9/2014 O'Rourke
8,902,555 B2 12/2014 Cheng
8,981,731 B1 3/2015 Oku
9,222,693 B2 12/2015 Gourlay et al.
9,352,659 B1 * 5/2016 Turner ............... G06Q 30/0264
9,450,348 B2 9/2016 O'Rourke
11,034,260 B2 * 6/2021 Dickinson .............. H02H 3/085
11,850,961 B1 * 12/2023 Hall ........................ B64F 1/362
2004/0023548 A1 2/2004 Noro
2004/0092158 A1 5/2004 Chien
2004/0252425 A1 12/2004 Baldwin et al.
2004/0259412 A1 12/2004 Howell
2005/0014412 A1 1/2005 Wharton
2005/0221674 A1 10/2005 Ching
2006/0232366 A1 10/2006 Li
2008/0055811 A1 3/2008 O'Rourke
2009/0316321 A1 12/2009 Ouwerkerk
2012/0119702 A1 * 5/2012 Gaul ....................... B60L 53/16
439/620.21
2013/0148248 A1 6/2013 Zhou
2014/0302717 A1 10/2014 Cheng
2015/0377949 A1 12/2015 Ramirez
2016/0056588 A1 2/2016 Motoichi
2016/0056589 A1 * 2/2016 Kagawa ............. H01R 13/6683
361/42
2016/0082852 A1 * 3/2016 Kim ......................... G01K 7/16
439/620.21
2017/0001529 A1 * 1/2017 Fuchs ..................... B60L 53/65
2017/0237205 A1 * 8/2017 Fuehrer .............. H01R 13/6683
439/620.22
2017/0334304 A1 * 11/2017 Steele ..................... B60L 58/12
2018/0229615 A1 * 8/2018 Shumaker ............... B60L 53/16
2018/0244165 A1 * 8/2018 Anma ..................... B60L 53/80
2019/0030983 A1 * 1/2019 Miller ................. H02J 7/00309
2019/0067973 A1 * 2/2019 Yamada .................. B60L 53/16
2019/0123494 A1 4/2019 Gustafsson
2019/0176633 A1 * 6/2019 Booth ..................... B60L 53/60
2019/0181676 A1 * 6/2019 Steinbuchel, IV ... G01R 31/389
2020/0064408 A1 * 2/2020 Sato .................... H01M 10/482
2020/0076013 A1 * 3/2020 Sato ...................... H01M 10/48
2020/0083701 A1 * 3/2020 Myer ....................... G01K 5/52

(56) References Cited

U.S. PATENT DOCUMENTS

| | | | | |
|---|---|---|---|---|
| 2020/0238841 | A1* | 7/2020 | Zaki | B60L 53/60 |
| 2021/0291694 | A1* | 9/2021 | Shaaban | B60L 53/67 |

FOREIGN PATENT DOCUMENTS

| | | | | |
|---|---|---|---|---|
| EP | 2928024 A1 | 10/2015 | | |
| EP | 2963626 A1 | 1/2016 | | |
| EP | 2706628 B1 | 5/2016 | | |
| WO | WO-2010049775 A2 * | 5/2010 | | B60L 53/66 |

OTHER PUBLICATIONS

CN-102738859; Entire specification and drawings (Year: 2015).*
Amazon.com, Home Audio & Theater, SIPAILING Smart Power Strip WiFi Power Bar 5ft Extension Cord Compatible with Alexa Google Home_Surge Protector with 4 AC Outlets_Voice Individual Control_Timer Schedule_Remote Control via APP, Downloaded from the Internet on Jul. 2, 2019, 10 pages.
Amazon.com, Home Audio & Theater, Web Power Switch Pro Model, Downloaded from the Internet on Jul. 2, 2019, 11 pages.
YouTube, Smart Cord Bluetooth Extension Cord, Downloaded from the Internet on Jul. 2, 2019, 1 page.
Amazon.com, Tools & Home Improvment_Electrical_Plugs, Kasa Smart WiFi Power Strip by TP-Link—6 Outlet Surge Protection_ Works with Alexa Echo & Google (HS300), Downloaded from the Internet on Jul. 3, 2019, 10 pages.
Amazon.com, Patio, Lawn & Garden_Outdoor Decor_ Thermometers & Weather Instruments, SensorPush Wireless Thermometer/Hygrometer for iPhone/Android—Humidity & Temperature Smart Sensor with Alerts, Downloaded from the Internet on Jul. 3, 2019, 11 pages.
Amazon.com, Additional indoor Module for Netatmo Weather Station—Retail Packaging—Aluminium, Downloaded from the Internet on Jul. 3, 2019, 9 pages.
WatchAware, Apple Watch App, Honeywell Home by Resideo Technologies, Inc., Downloaded from the Internet on Jul. 9, 2019, 2 pages.

* cited by examiner

WIRELESS MONITORING OF ELECTRICAL CONNECTOR

CROSS-REFERENCE TO RELATED APPLICATIONS

This application is a continuation of application Ser. No. 16/863,964 filed Apr. 30, 2020, the entire disclosure of which is incorporated herein by reference.

TECHNICAL FIELD

This patent document is related to electrical connectors and, more particularly, to wireless monitoring of electrical connectors.

BACKGROUND

Electrical connectors, such as electrical cords (e.g., pigtails), power strips, adapters, and in particular extension cords, are used extensively in many applications, both residential and commercial, because they provide a way to deliver electrical power from an electrical outlet to an electrical device (e.g., a device that needs power to perform a task) that is remotely positioned from the outlet. However, electricity, if not properly controlled, can result in serious danger to those who use it and to the structures in which it is used. Extensive usage of electrical connectors, such as extension cords, increases the likelihood of an electrical fault, cord degradation, cord overloading, or cord overheating, which can result in electrical fires, electrical shocks, and other hazards.

For example, the National Fire Protection Association (NFPA) reports, in a March 2019 publication, that electrical failures or malfunctions were the second leading cause of U.S. home fires in 2012-2016 accounting for 13% of residential structure fires. Further, home fires involving electrical failure or malfunction caused an estimated average of 440 civilian deaths and 1250 civilian injuries each year in 2012-2016, as well as an estimated $1.3 billion in direct property damage a year. The U.S. Fire Administration reports that during the years of 2014-2016, electrical failure or malfunction caused an estimated 8% of non-residential building fires. As such, the ability to monitor one or more parameters related to the delivery of electricity through an electrical connector may aid in reducing the dangers that delivery of electricity poses.

SUMMARY

An electrical connector includes a control system with a temperature sensor to sense a temperature of the electrical connector as the electrical connector receives power and supplies that power to a load through a closed circuit. The control system transmits a signal representative of that temperature to an alarm device. In the instance of an undesirable temperature in the electrical connector, the alarm device is responsive to the transmitted signal to deliver a warning enabling a user to respond to the warning. A user response can include directing the alarm device to transmit an instruction to the electrical connector to interrupt the supply of power, e.g., direct the control system of the electrical connector to open the circuit via activation of a switch. A user response can include manual operation of the switch at the electrical connector to open the circuit. The alarm device can also provide an automatic response to the warning, e.g., a response without intervening user input, with a transmission to the electrical connector to interrupt the supply of power.

An electrical connector includes a male electrical plug, a female socket, a housing, and a control system. The male electrical plug, which is supplied with power, is electrically connected to the female socket; an electrical load can be electrically coupled to the female socket. The housing contains the male electrical plug, the female socket, and a control system. The control system includes a temperature sensor and a transceiver with the temperature sensor sensing a temperature at a location within the housing and the transceiver transmitting a signal representative of the temperature to an alarm device remotely located from the electrical connector. The electrical connector can include one or more switches that are remotely controllable by the alarm device to interrupt the electrical connection between the male plug and the female socket.

DETAILED DESCRIPTION

Figure 1:
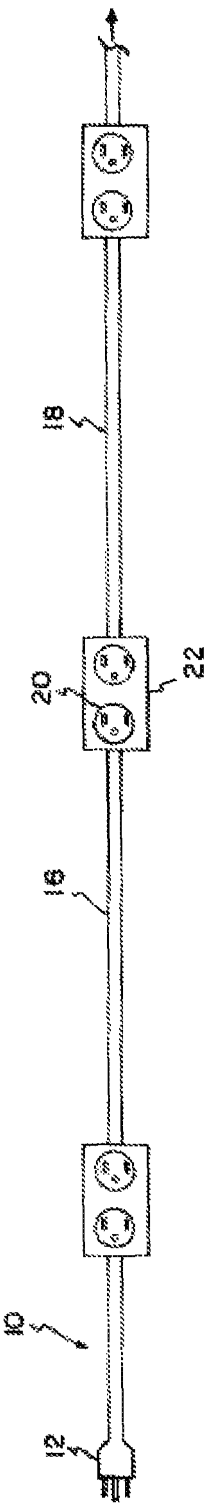
FIG. 1 is a front view of an extension cord showing a male plug, female sockets, and socket blocks of the cord, in which various aspects of the present disclosure can be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

U.S. Pat. No. 7,688,563, entitled "Power Cord having Thermochromatic Material," issued Mar. 30, 2010, is hereby incorporated by reference in its entirety.

Referring to the drawings, FIG. 1 shows an exemplary extension cord 10 in which aspects of the present disclosure can be implemented. The exemplary cord 10 provides electrical connections at a plurality of locations along its length. The extension cord 10 includes a male plug 12 attached to one end within a housing 13, with socket blocks 22 housing female sockets 20 disposed along the cord.

The male plug 12 electrically connects to two or more conducting wires and an optional ground wire, as discussed herein. The conducting wires and optional ground wire are typically bound together into a single cord 16 that is covered by an insulated sheathing 18. The gauge of the conducting wires is chosen based on the length and expected use of the extension cord. Thicker wires are appropriate for longer cords and for cords used in heavy-duty applications that have large power requirements. Finer gauged wires are used for household extension cords.

Typically, the socket blocks 22, insulated sheathing 18, and the housing 13 of the male plug 12 are constructed from plastics or polymers. In one possible embodiment, the male plug 12, socket blocks 22, and insulated sheathing 18 are molded together to form one continuous piece. This continuously molded embodiment of the extension cord is desirable because of the elimination of joints between the sheathing and the plug or socket blocks. Such joints often weaken the cord integrity and may provide an avenue for the entry of moisture into the interior of the cord which may short or damage the conducting wires.

The socket blocks 22 reside at intervals along the length of the extension cord 10. These intervals are typically regular, but may also be irregular. Each socket block 22 houses two female sockets 20. In other possible embodiments, however, the socket blocks 22 house one female socket 20 or three or more female sockets 20. Yet other possible embodiments of the extension cord 10 include a mixture of sockets blocks containing different numbers of female sockets, such as one female socket in some of the socket blocks and two female sockets in other socket blocks.

Each of the female sockets 20 is an electrical socket that electrically connects to at least two wires in the cord 10. In a possible embodiment, one or more of the female sockets 20 is a twist lock socket, as described herein. In another possible embodiment, one or more of the female sockets 20 is a three prong socket and includes the optional ground wire. Additional embodiments of the extension cord described herein are discussed in U.S. Pat. No. 5,902,148, the entire disclosure of which is hereby incorporated by reference.

Safety devices reside at various locations along the extension cord 10, which is configurable for use with such devices. The safety devices reside at any of a variety of locations along the extension cord, although in some embodiments the devices reside near the male plug 12 or female socket 20 due to the propensity for electrical fault or failure occurrences in those locations. In a possible embodiment, the housing 13 for the male plug 12 encloses a safety device integrated with the extension cord 10. In another possible embodiment, the socket block 22 or other female connector housing encloses a safety device as well. In various embodiments, the housings 13 and socket block 22 enclose ground fault circuit interrupters. In other embodiments, the housings 13 and socket block 22 include a thermal or temperature indicator circuit formed by the combination of a thermal switch and an indicator, or some other heat sensing configuration. Additionally, the male plug 12 can include a male twist lock configuration, whether that configuration is a standard configuration or a non-round configuration as described in more detail herein. The female sockets 20 can include a female twist lock configuration, whether that configuration is a standard configuration or a configuration adapted to mate with a non-round male configuration as described in more detail herein.

In an application of the cord 10, light sockets can be plugged into one or more of the female sockets 20. The light sockets can include a clamp or other retaining member to secure the light socket to the female socket blocks 22. In one possible embodiment, the female socket 20 can include a detent that the clamp mates with and snaps into. Alternatively, the clamp or retaining member can be connected to the female socket 20 and receive the light socket. The light socket can include a basket or similar structure to protect a light bulb inserted in the light socket. One or more light sockets can also be packaged with the electrical cord 10 in a kit.

Examples of electrical connection configurations between the female sockets 20 and the conducting wires 14*a*-14*g* that include ground fault circuit interrupters 30 are provided in FIGS. 2A-2F.

Figures 2A, 2B:
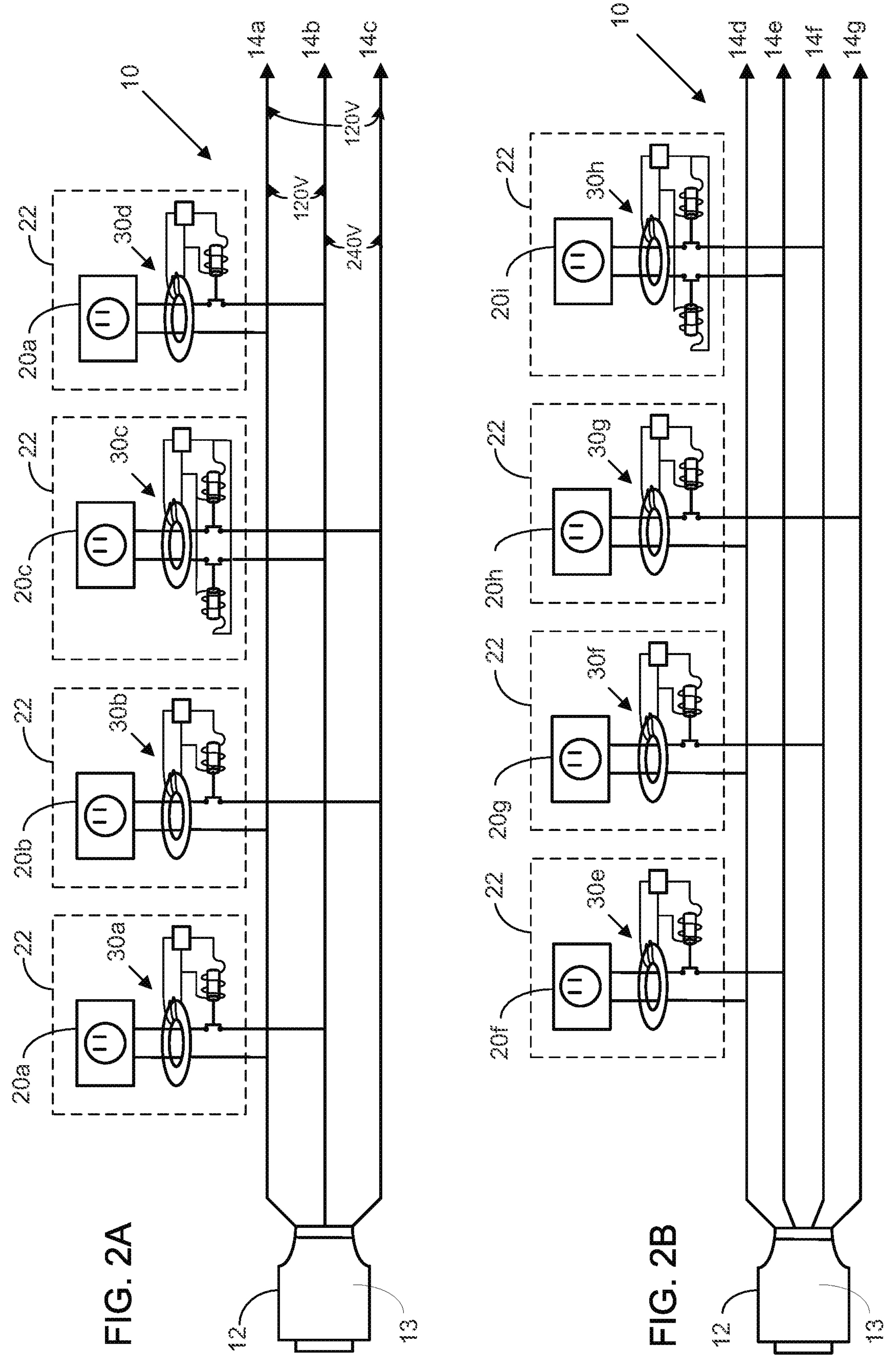
FIGS. 2A-2F are schematic views of various extension cords having integrated ground fault circuit protection.

One embodiment of the extension cord 10 of the present disclosure has three conducting wires and is illustrated in FIG. 2A. This extension cord 10 can be used, for example, with a single phase, three wire 120/240V service. Various embodiments of the extension cord 10 can be used with other service ratings as well, whether the service rating defines a voltage different than 120/240V, current capacity, phase, or any other operating characteristic. This type of service is often available in the United States as the primary connection from electrical transmission lines to residential and commercial properties. The extension cord includes three conducting wires 14*a-c* connecting the male plug 12 to the female sockets 20*a-c*. The female sockets 20*a-c* reside within socket blocks 22, which also include ground fault circuit interrupters 30*a-d*.

In this configuration, one of the conducting wires 14*a* is a neutral wire that is typically held at or near ground. The other two conducting or circuit wires 14*b*, 14*c* are held at about 120V above ground. These latter two wires are typically called "hot" or active wires because they provide a non-zero voltage drop across any grounded object. Each circuit wire is used to establish a separate circuit to which female sockets are attached.

Female sockets 20*a* and 20*b* are electrically connected to different active wires to create a cord 10 with two electrically isolated circuits. One or more female sockets 20*a* of extension cord 10 electrically connect in parallel to the neutral wire 14*a* and one of the 120V active wires 14*b*. One or more female sockets 20*b* electrically connect in parallel to the neutral wire 14*a* and the other 120V active wire 14*c*. Each of the female sockets 20*a*, 20*b* is capable of providing 120 volts to electrically operated devices plugged into that socket. In the embodiment shown, one female socket 20*a* or 20*b* is included in each socket block 22.

One or more female sockets 20*c* are capable of providing 240 volts, in addition to the female sockets 20*a* and 20*b* which provide 120 volts. The 240 volt female socket 20*c* electrically connects in parallel to both of the 120V active wires 14*b* and 14*c* (and not to the neutral wire 14*a*) and provides 240 volts because the 120V circuit wires are 1800 out of phase. Many heavy-duty tools and appliances, such as clothes dryers, require 240 volts, while the majority of electrically operated devices in the United States operate with 120 volts. Only one cord 10 is needed to operate pieces of equipment that have different voltage ratings.

Each female socket 20*a-c* of FIG. 2A includes ground fault circuit interrupters 30*a-d* incorporated within each socket block 22. The ground fault circuit interrupters 30*a-d* detect sudden imbalances in current flow such as can be caused by grounding of the load. This happens, for example, by a user accidentally stepping in water or otherwise causing a grounding path. The ground fault circuit interrupters 30*a-d* couple across the parallel electrical leads branching from the neutral wire 14*a* and conducting wire 14*b*. Each ground fault circuit interrupter 30*a-d* includes a transformer 32, sense circuitry 34, one or more switches 36, and one or more solenoids 38. Operation of the components of the ground fault circuit interrupters 30*a-d* is discussed in greater detail below in FIGS. 3A-3B.

The ground fault circuit interrupters 30*a-d* electrically isolate the female sockets 20*a* and 20*b*. If ground fault circuit interrupter 30*a* senses a current imbalance to socket 20*a* within the same socket block 22, it interrupts current flow to that socket. Electrical connection to socket 20*a* associated with ground fault circuit interrupter 30*d* is not interrupted because it is formed from an electrical circuit parallel to the circuit disconnected by ground fault circuit interrupter 30*a*. An electrical tool is capable of being used if connected to any female socket 20*a-b* associated with the non-interrupting ground fault circuit interrupters 30*b-d*. Various embodiments also could include an arc fault interrupter in place of the ground fault circuit interrupter 30.

Figures 2C, 2D:
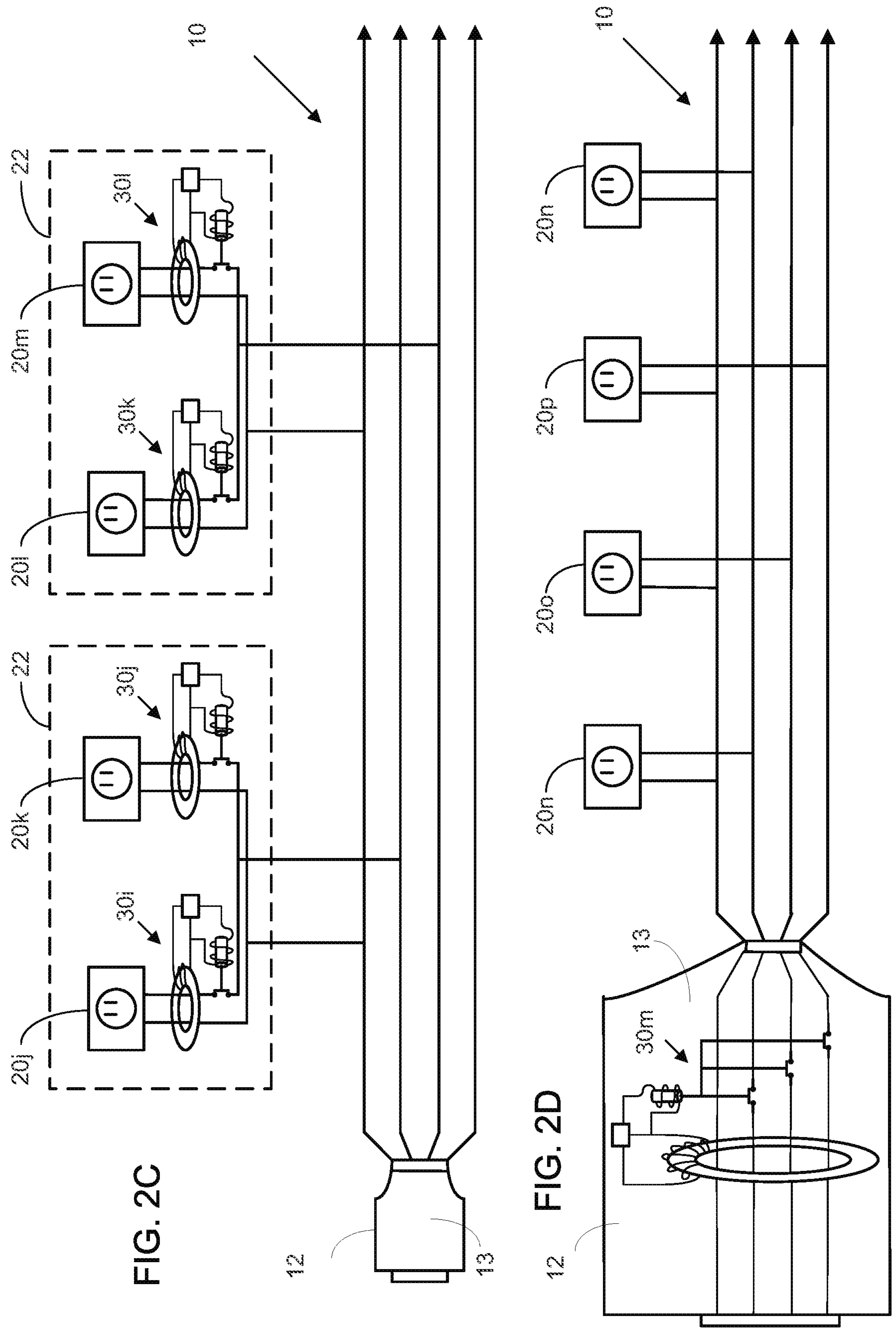

Extension cords 10 can also be made for use with voltage services other than the typical 120/240 volt service, and can include ground fault circuit interrupters in various locations along the extension cord. One example is a 120/208 volt service which is often configured as a three-phase, four-wire system. FIGS. 2B-2D illustrate alternative embodiments of cords for use with this type of service.

FIG. 2B shows an exemplary embodiment of a cord 10 for use with a four-wire service. The cord is substantially similar to the one described in conjunction with FIG. 2A, except that has a neutral wire 14*d* and three 120V conducting wires 14*e*, 14*f* and 14*g*. Three different 120V circuits can be made. One or more female sockets 20*f* electrically connect in parallel to neutral wire 14*d* and active wire 14*e*, one or more female sockets 20*g* electrically connect in parallel to neutral wire 14*d* and active wire 14*f*, and one or more female sockets 20*h* electrically connect in parallel to neutral wire 14*d* and active wire 14*g*. The four circuits corresponding to sockets 20*f*, 20*g*, and 20*h*, respectively, are electrically isolated due to these parallel connections. In one possible embodiment, an additional female socket 20*i* electrically connects in parallel between any two of the active wires 14*e*-14*g*, such as wires 14*e* and 14*f* shown. The socket 20*i* provides 208 volts to any electrically operated devices plugged into the socket. Ground fault circuit interrupters 30*e-h* are coupled across each socket 20*f-i*, and operate as described in conjunction with FIGS. 2A and 3A-B. As described above, each of the ground fault circuit interrupters 30*e-h* only disconnects electricity to the associated socket 20*f* and 20*g* due to the parallel connection to the conducting wires 14*d-g*.

In an alternative embodiment, the cord 10 has a separate neutral wire associated with each conducting wire 14*e*-14*g*. For example, a cord 10 having three conductors 14*d*-14*g* would also include three neutral wires. Each female socket 20 would have a contact connected between the conducting wire and the neural associated with that conducting wire.

FIG. 2C shows another possible embodiment of a cord 10 for use with a four wire service as described in conjunction with FIG. 2B. In this embodiment, each socket block 22 incorporates multiple female sockets 20*j*-*m*, which connect in parallel within each socket block 22 and to the conducting wires 14*d*-*g*. Separate ground fault circuit interrupters 30*i*-1 are associated with each female socket 20*j*-*m*, respectively. In this configuration, one female socket 20 can be disabled within a socket block 22 by a ground fault circuit interrupter 30 while the other female socket within the same socket block 22 remains active. All female sockets 20 in the other socket blocks 22 also remain active.

In an alternate embodiment (not shown), one ground fault circuit interrupter can be included in each socket block, and is associated with two or more female sockets. In such a configuration, both sockets within the socket block disable upon detection of a fault by a ground fault circuit interrupter.

Figure 3A:
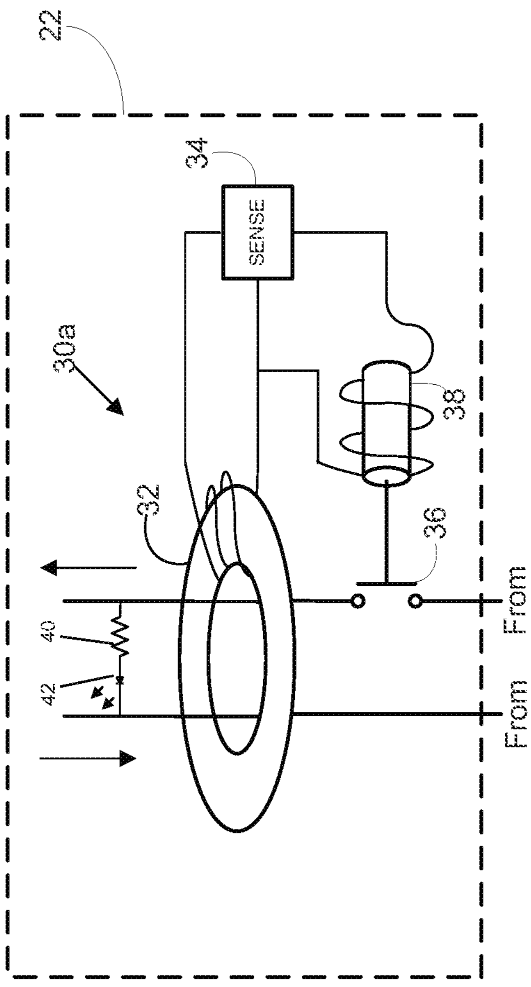
FIGS. 3A-3B are schematic views of circuit sections shown in FIG. 2A.
Figure 3B:
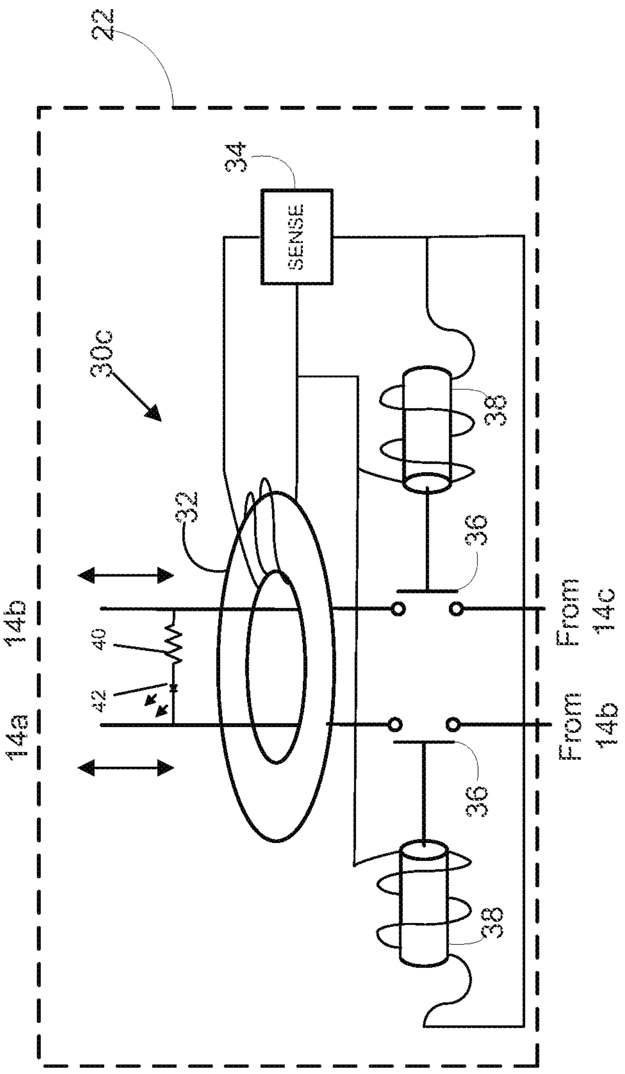

FIG. 2D shows a further possible embodiment of a cord 10 for use with a four wire service as described in conjunction with FIG. 3B. In this embodiment, female sockets 20*n*-*p* are distributed along the cord 10, and electrically connected to two of the wires 14*d*-*g*. A ground fault circuit interrupter 30*m* couples across the wires 14*d*-*g*, and resides within the housing 13 of the male plug 12. In this configuration, the ground fault circuit interrupter 30*m* detects a zero sum current across all of the conducting wires 14*e*-*g* and the neutral wire 14*d*. Upon detection of a current change, the ground fault circuit interrupter 30*m* disconnects the conducting wires 14*e*-*g*, deactivating all of the sockets 20*n*-*p* along the cord 10.

Figure 2E:
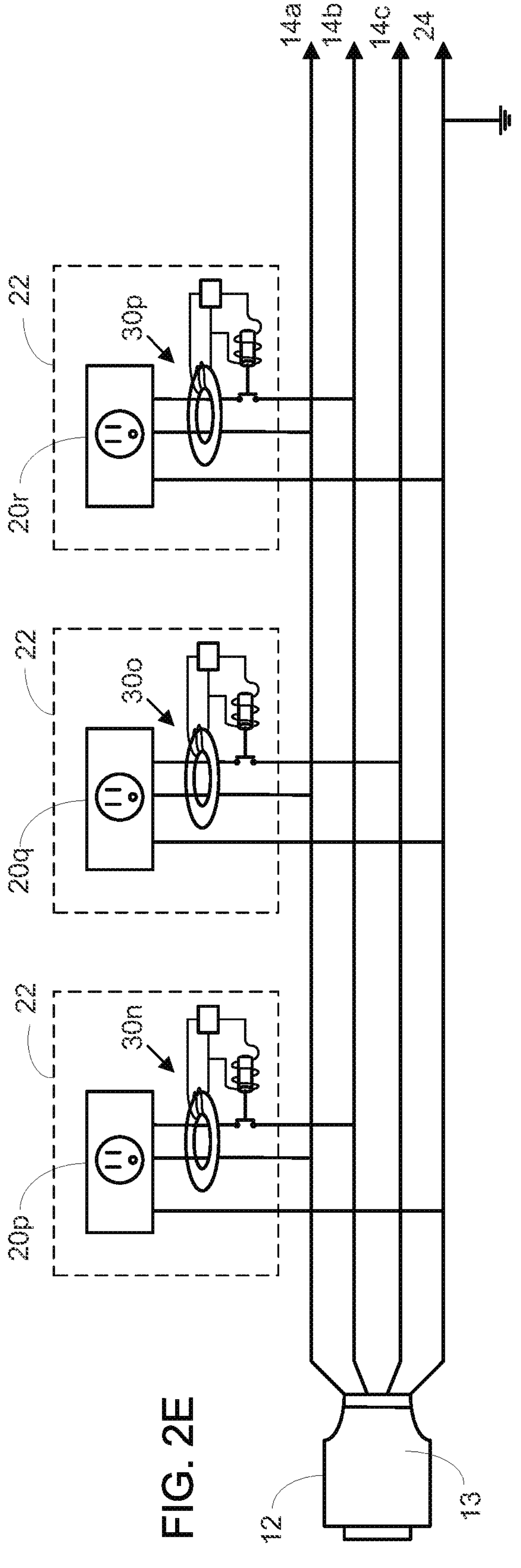
Figure 2F:
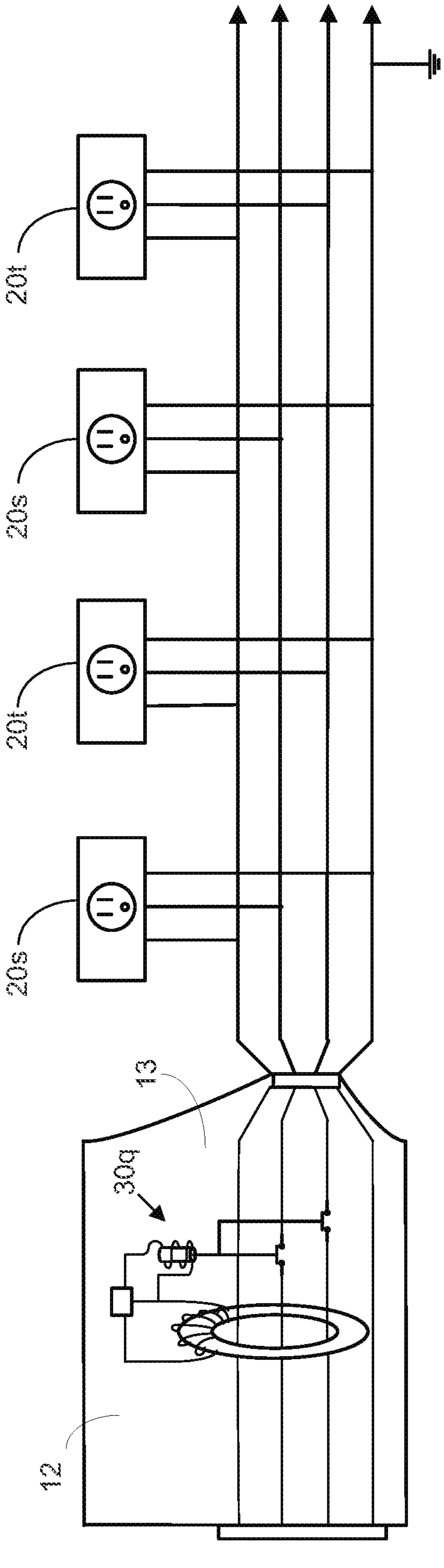

Two further embodiments are depicted in FIGS. 2E and 2F which include a grounding wire 24 incorporated into the extension cord 10. Typically, grounding wire 24 is locally grounded as opposed to being grounded at the power source as is often the case for neutral wire 14*a* of FIG. 2A or wire 14*d* of FIGS. 2B-2D.

In FIG. 2E, the extension cord 10 incorporates a number of female sockets 20*q* electrically connected to a neutral wire 14*a*, a 120V conducting wire 14*b*, and a grounding wire 24. The extension cord 10 also incorporates a number of female sockets 20*r* electrically connected to the neutral wire 14*a*, the other 120V conducting wire 14*c*, and the grounding wire 24. Each female socket 20*q*, 20*r* resides within a separate socket block, although it is understood that two or more female sockets can be incorporated in each socket block consistent with the principles described above in FIG. 2C.

The socket blocks 22 each include ground fault circuit interrupters 30*n*-*p* coupled across the parallel connections to female sockets 20*p*-*r*, which reside within the socket blocks 22. This configuration corresponds to the configuration of FIG. 2A, with inclusion of grounding wire 24. The ground fault circuit interrupters 30*n*-*p* are not coupled across the parallel connection to the grounding wire 24. Current within the grounding wire 24 is therefore not detected using the ground fault circuit interrupters 30*n*-*p*.

FIG. 2F has a similar three wire configuration to FIG. 2E, and also includes grounding wire 24. Ground fault circuit interrupter 30*q* couples across and detects a zero sum across all of the conducting wires 14*b*-*c* and the neutral wire 14*a*. Current within the grounding wire 24 is not detected using the ground fault circuit interrupter 30*q*. Upon detection of a fault, the ground fault circuit interrupter 30*q* disconnects the electrical supply to all of the female sockets 20*s*-*t*.

The extension cords 10 of the present disclosure, especially those with electrically isolated circuits, are especially useful when heavy power drawing devices or many electrically operated devices are attached to the extension cord. The power load from these devices can be balanced between the two or more isolated circuits so that a single extension cord can be used where two or more extension cords would otherwise be required. By balancing the power load between the isolated circuits, devices may be plugged into a single extension cord and draw power which, when plugged into a typical one circuit cord would otherwise result in tripping a fuse attached to the outlet or the cord; damage the cord or the equipment plugged into it; or even causing a fire. Balancing the power load between the multiple circuits of the extension cord permits more equipment to be operated safely with a single extension cord. Ground fault circuit interruption associated with either the male plug or the female sockets of the extension cords 10 provides additional safety to each female socket 20. By incorporation of ground fault circuit interruption with each female socket, operation of all devices connected to the cord 10 is not interrupted upon detection of a fault at one female socket.

Alternatively, if the cord 10 has a separate neutral for each conducting wire, an embodiment can include a separate ground fault interrupter circuit for each separate circuit or pair of conductor and neutral wire. For example, if there are two conductors and two matching respective neutral wires, the cord can include two separate ground fault interrupters 30. Thus if one circuit fails, the other circuit may still be operating and conducting electricity.

The alternative embodiments shown in FIGS. 2A-2F are merely illustrative. It will be recognized that the same principles can be used to construct extension cords and distribute ground fault circuit interrupters across the cords for any voltage service that has two or more conducting wires. In addition, all of the female sockets represented in each of FIGS. 2A-2F are not necessary for a cord constructed according to the principles of the present disclosure. For example, an extension cord can be constructed similar to the embodiment depicted in FIG. 2A by including only female sockets 20*a* and 20*b*. Such a cord would have two electrically isolated circuits, one of which would provide 120V service and the other 240V service. Extension cords can be constructed having any combination of female sockets connected to different conducting wires and any combination of female sockets within a single socket block. One or more of the electrically isolated circuits or female sockets can include ground fault circuit interrupters, in various configurations as shown above, or a combination thereof.

Ground fault circuit interrupters operate in electrical installations to disconnect a circuit when imbalanced current flow is detected between a conducting wire and a neutral wire. GFI's open the circuit because an imbalance might represent current through a person who is accidentally touching the energized part of the circuit and is therefore about to receive a potentially lethal shock. GFI's include a normally closed switch connected to sense circuitry that is designed to open and disconnect electricity quickly enough to prevent such shocks. FIGS. 3A and 3B shows exemplary schematic views of portions of the extension cord 10 of FIG. 2A including ground fault circuit interrupters 30*a* and 30*c*.

FIG. 3A shows ground fault circuit interrupter 30*a* residing within the socket block 22 and coupled across conducting wire 14*b* and neutral wire 14*a*. The ground fault circuit interrupter includes a transformer 32, sense circuitry 34 electrically connected to the transformer 32, and a switch 36 and solenoid 38 connected to the transformer 32 and sense circuitry 34.

The transformer 32 detects current within both the conducting wire 14*b* and the neutral wire 14*a*. In normal operation, all of the current flowing along the conducting wire 14*b* returns along neutral wire 14*b*. This causes a balanced current state within the cord 10, and does not induce any current in the transformer 32. In the case of a sudden change in current flow, for example caused by a person touching a live component in the attached appliance, some of the current takes a different return path. This results in an imbalance in the current flowing in the conductors 14*a* and 14*b* or, more generally, a nonzero sum of currents from among multiple conductors. This difference causes a current to flow in the transformer 32.

The sense circuitry 34 detects current flowing to it from the transformer 32. The sense circuitry 34 activates the solenoid 38, which in turn disconnects the switch 36, which in turn disconnects the conducting wire 14*b*. Disconnecting the switch 36 opens the circuit defined by the leads 14*a-b* by disconnecting the conducting wire 14*b*. The electricity supply to the circuit is interrupted, preventing potential electrocution.

In a possible embodiment, optional resistor 40 and light emitting diode 42 connect between the conducting wire 14*b* and the return wire 14*a*. The resistor 40 and light emitting diode 42 form an indicator circuit configured to illuminate the light emitting diode while the circuit connected to the socket block 22 remains active. In an alternate embodiment, the light emitting diode 42 is replaced by an incandescent bulb or other illumination device. In still other embodiments, all or a portion of the socket block 22 is formed from a translucent material, and illuminates while the light emitting diode 42 remains illuminated.

FIG. 3B shows a ground fault circuit interrupter 30*b* coupled across conducting wires 30*b*-30*c*. The ground fault circuit interrupter 30*b* operates similarly to the ground fault circuit interrupter 30*a* of FIG. 3A, but is designed with switches 36 and solenoids 28 connected to the sense circuitry 34 to disconnect both of the conducting wires 14*b* and 14*c* upon detection of imbalanced current flow. Such a configuration is useful for multiphase power connections because it prevents accidental power transmission if the load connected to the female socket is accidentally grounded.

The ground fault circuit interrupters are designed so that the current is interrupted in a very short time after the imbalanced current is detected, such as a fraction of a second. This greatly reduces the chances of an electric shock being received.

In additional possible embodiments, ground fault circuit interrupters 30 can sense current changes among more than two wires, and may require different electrical connections depending upon the configuration used. For example, a multiphase conducting wire cord may require more than one switch 36 connected to the sense circuitry 34. For clarity, the basic schematics shown in FIGS. 3A-3B are used throughout the present disclosure, but are understood to represent additional possible configurations of ground fault circuit interrupter wiring.

Figure 4:
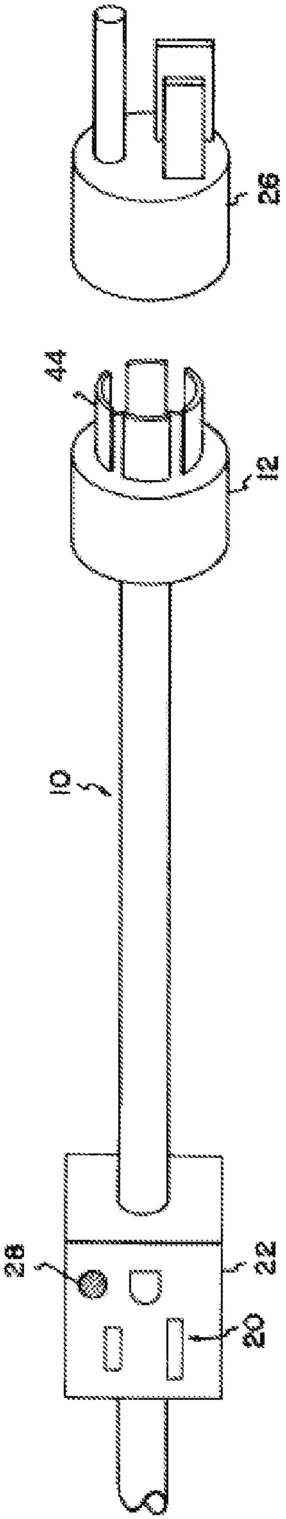
FIG. 4 is a perspective view of an alternative embodiment of the extension cord shown in FIG. 1 having an optional adapter for the male plug of the extension cord.

Referring now to FIG. 4, a female socket 20 for use with a standard U.S. 120V male plug from an electrically operated device is shown. In this embodiment, the male plug 12 of the extension cord 10 has four prongs 44 and is configured for attachment to a 120/240V service. One common configuration for a male plug 12 to be used with a 120/240V service is a twist lock plug where the plug is inserted into an appropriate female outlet, not shown, and then the male plug is twisted to securely fasten the prongs 44 of the plug within the outlet. This type of male plug configuration ensures that the plug 12 does not come out of the outlet by simply pulling on the plug 12. Although the plug 12 shown includes four prongs 44, plugs with any number of prongs can be used in this twist lock configuration.

An optional adapter 26 may be provided for adapting this embodiment of the extension cord for use with a 120V source. This adapter 26 has a female portion configured to receive the male plug 12 of the extension cord 10 and a male portion for plugging into a female outlet of a 120V source. If such an adapter were used, for example, with the extension cord configuration of FIG. 2A, the adapter would include an electrical connection between the two 120V conducting wires 14*b* and 14*c* so that they would be attached to the same prong of the adapter. When using this adapter the electrically operated devices plugged into the extension cord will all be part of the same circuit despite using coupling configurations illustrated in FIG. 2A due to the connection of the two circuit wires in the adapter. Furthermore, instead of being a separate attachment, the adapter may alternatively be integrally coupled to the cord 10.

Other adapters may be provided for conversion between extension cords of the present disclosure and other voltage source configurations. In addition, adapters may be provided that will convert the prong configuration of the male plug of the extension cord to an appropriate configuration for use in another country or region.

Figure 5B:
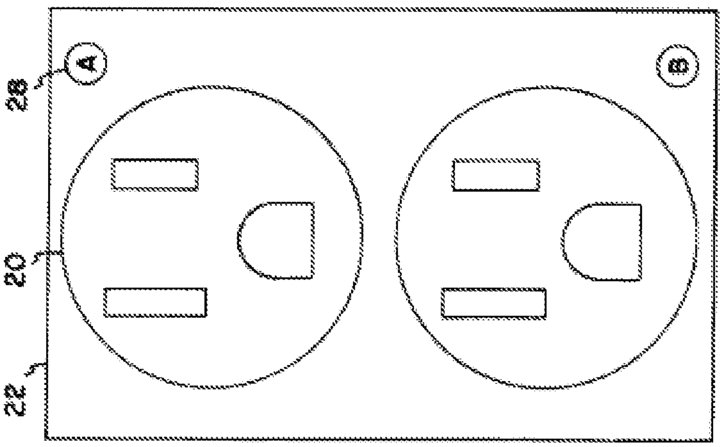
FIGS. 5A and 5B are front views of alternative socket block configurations having circuit identifying marks for use with the extension cord shown in FIG. 1.
Figure 5A:
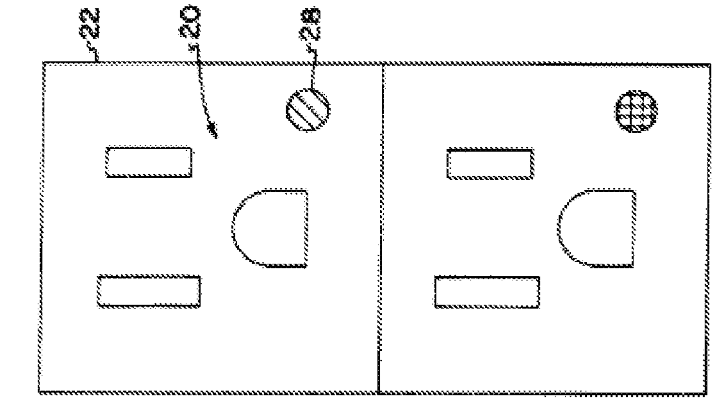

FIG. 5A shows a socket block 22 with rectangular female sockets 20. FIG. 5B shows a socket block 22 with circular female sockets 20. Other socket and socket block configurations are possible.

In one possible embodiment, a circuit identifying mark 28 is provided proximate each of the female sockets 20. The circuit identifying mark 28 may be color-coded (see FIG. 5A), numbered, lettered (see FIG. 5B), stamped, or otherwise configured to indicate the circuit to which the proximate female socket is attached. The circuit identifying mark 28 provides an extension cord user with information about which circuit the device is being plugged into so that the user may balance the power load of the circuit.

In another possible embodiment, the circuit identifying mark 28 is a light emitting diode or other illumination device. The light emitting diode is configured to illuminate upon connection of a male plug to the female socket 20, and is color coded to the circuit corresponding to that socket.

FIGS. 5A and 5B both show socket blocks 22 for use with extension cords in which the two female sockets 20 of the socket block 22 are each attached to different circuits. However, other configurations are also possible including having the female sockets 20 of each socket block 22 attached to the same circuit or alternatively, having more than one female socket in each socket block attached to the same circuit. For example, in one embodiment, not shown, two out of four female sockets in a socket block are attached to one circuit with the other two sockets attached to a second circuit.

Figure 6:
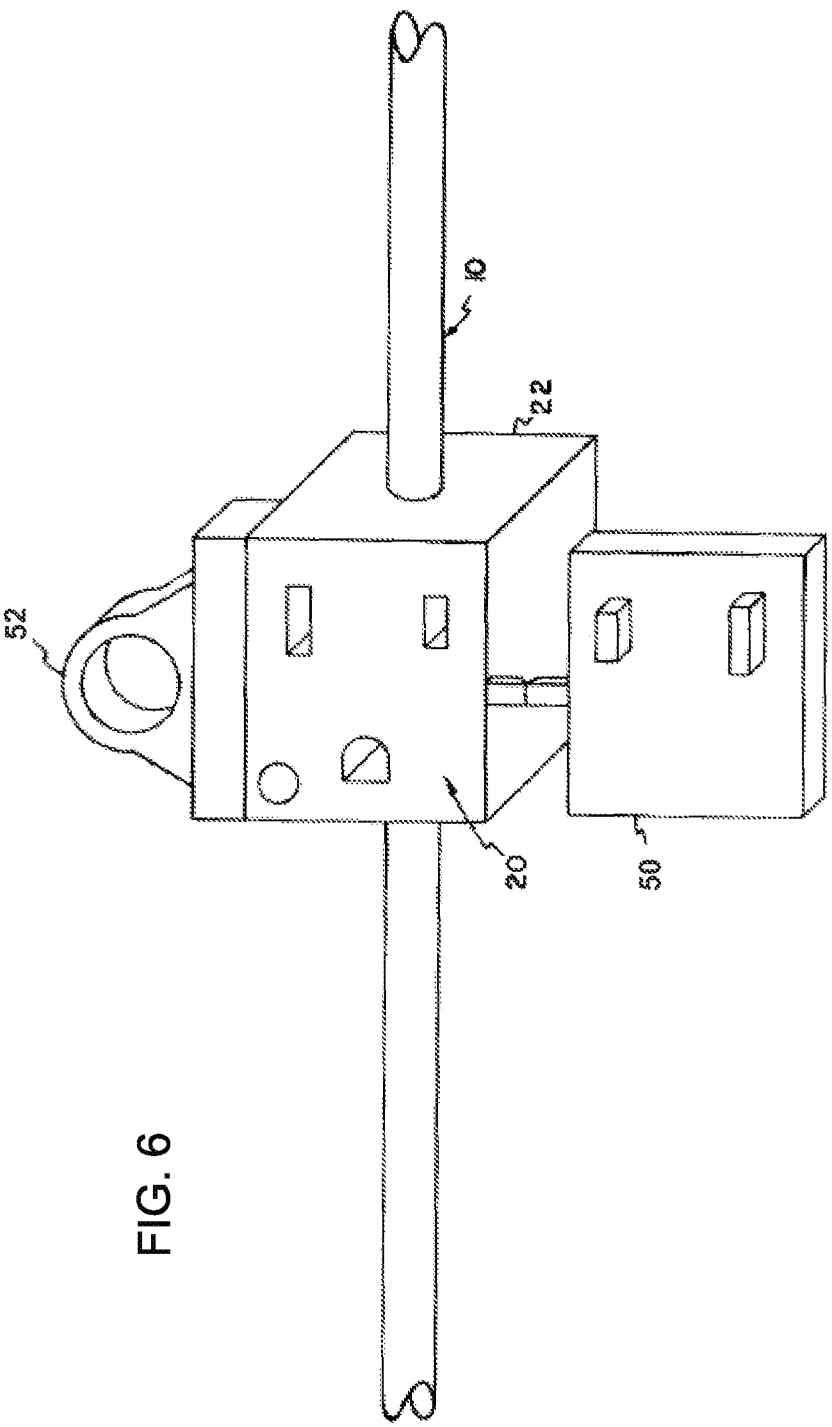
FIG. 6 is a perspective view of a female socket and socket block with an optional cap and an optional mooring member.

FIG. 6 shows another alternative embodiment. In this embodiment, one or more of the female sockets 20 have a cap 50. Typically, there is a cap 50 for each female socket 20. The cap 50 and female socket 20 are configured so that the cap 50 can be placed on or into female socket 20 when the female socket 20 is not in use. The cap 50 provides a safety mechanism for the extension cord 10 to avoid unwanted contact between the active conducting wires 14$a$-14$g$ of the extension cord 10 and individuals, moisture, or other external objects.

Figure 7:
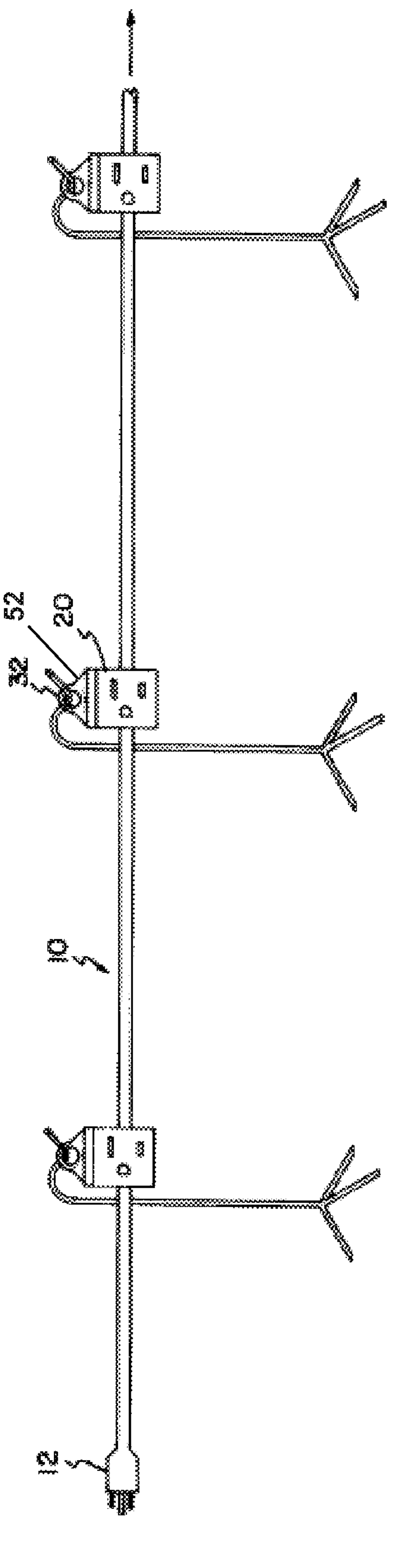
FIG. 7 is a front view of the extension cord shown in FIG. 5 being held off the ground by use of mooring members attached to the socket blocks of the cord.

Additionally, a mooring member 52 is attached to either the female sockets 20 or the socket blocks 22, which can be used to hold the extension cord 10 in place. For example, the mooring member 52 may be used to fasten the extension cord 10 in a desired place or position or to hold the extension cord 10 off the ground, as depicted in FIG. 7. The mooring member may be a loop or ring of material. Alternatively, the mooring member may be a hook, strap, bracket, slot, or similar device that will permit attachment of the cord to an external object. The mooring member 52 may be used with any extension cord, not only those with multiple circuits. In one embodiment, the mooring member is integrally molded to the socket or socket block to provide a stable and durable structure.

In an alternative embodiment, the extension cord is made of a male plug, two or more conducting wires electrically connected to the male plug, and one or more female sockets electrically connected to the conducting wires with a mooring member attached to the female sockets or to a socket block that houses the female sockets. In this embodiment, the female sockets may all be electrically connected to the same conducting wires, or alternatively, they may be electrically connected to different conducting wires.

Figure 8A:
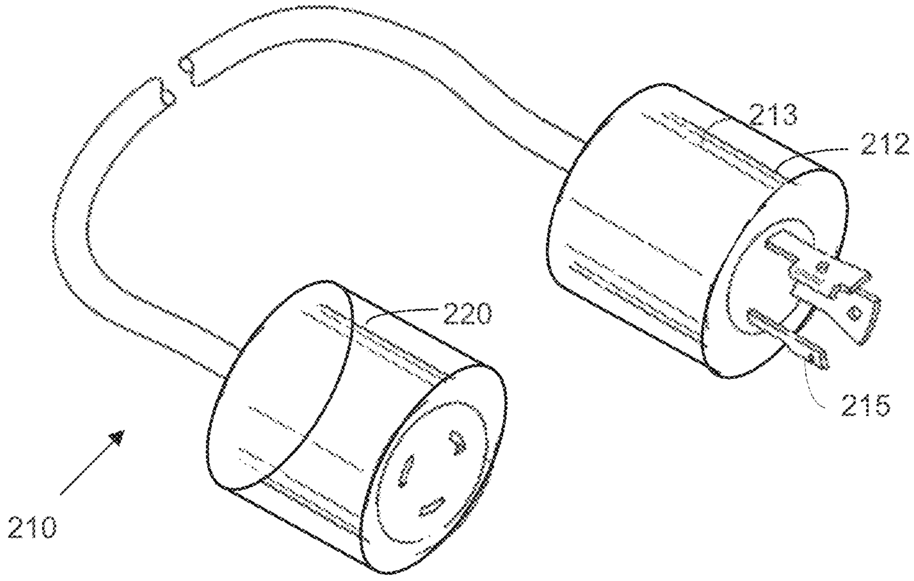
FIG. 8A is a perspective view of a prior art twist lock cord.

FIG. 8A shows an extension cord 210 including a male twist lock plug 212. The extension cord 210 can be used in construction or other high voltage applications. The cord 210 has a male twist lock plug 212, which includes a housing 213. The cord also includes a female twist lock socket 220, configured to mateably receive a male twist lock plug 212. In use, a male twist lock plug 212 is inserted into a female twist lock socket 20, and axially rotated (either clockwise or counterclockwise, depending upon the configuration of the plug and socket) into a locked position. Removal of the male plug 212 from the female socket 220 requires twisting the male plug 212 in the opposite direction.

The male twist lock plug 212 includes a plurality of prongs 215 formed in a circular configuration to lockably mate with a female socket 220. The male twist lock plug 212 is twisted to securely fasten the prongs 215 of the plug 212 within the outlet.

The male twist lock plug housing 213 has an oval cross-sectional shape at its face or at any other point within the housing 213. The oval shape of the housing 213 indicates the rotational position of the plug, which in turn dictates whether the plug 212 is in a locked or unlocked position when inserted into a female socket 220. In various embodiments, the plug 212 can be other non-circular shapes. Although the plug 212 can retain a circular configuration of the prongs 215, the housing 213 can have a triangular, rectangular, or any other cross sectional shape capable of indicating the rotational position of the plug 212. In further embodiments, the male twist lock plug 213 includes an indicator that corresponds to an indicator on a corresponding female twist lock socket 220. Alignment of the indicators can indicate a locked or unlocked position of the male twist lock plug 212.

The female twist lock socket 220 optionally has an oval cross-sectional shape as well. The oval shape of the female twist lock socket 220 aligns with the oval cross sectional shape of a male twist lock plug housing 213 when in either a locked or unlocked position.

Figure 8B:
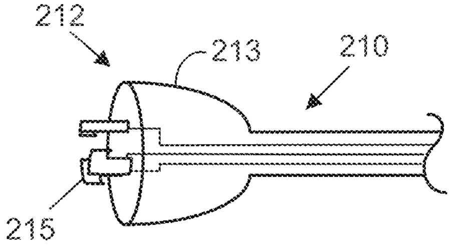
FIG. 8B is a perspective side view of a male connector for a twist lock cord.

FIG. 8B shows a perspective side view of a section of an electrical cord 210 including a male twist lock plug 212 with a housing 213 having an oval cross-sectional shape as described in FIG. 8A. Each of the plurality of prongs 215 connects to an internal conductor, such as the conducting or neutral wires 14 of FIGS. 2A-2E. The housing 213 has a variable-sized oval cross section, which indicates the rotational position of the plug, showing whether the plug 212 is in a locked or unlocked position when inserted into a female socket 220.

Figure 8C:
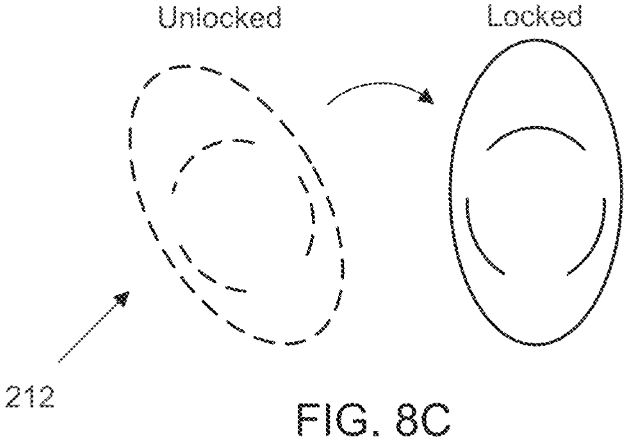
FIG. 8C is a functional schematic view of showing locked and unlocked positions of the male twist lock connector shown in FIG. 8B.

FIG. 8C shows a schematic functional view of a section of an extension cord including a male plug 212 according to an embodiment of the present disclosure. The non-circular cross-section of the housing 213 enables a user to readily ascertain whether the plug is in a locked position. In the embodiment shown, the oval plug is inserted in an askew position, shown in FIG. 8C in dotted lines. The askew position corresponds to an unlocked, or insertion position. When the plug 212 is fully inserted and twisted to the locked position, the oval shaped housing 213 is upright, allowing a user to readily determine the locked status of the plug 212. Alternately, the housing 213 can be in a locked position at a different ascertainable rotational position.

Figure 9A:
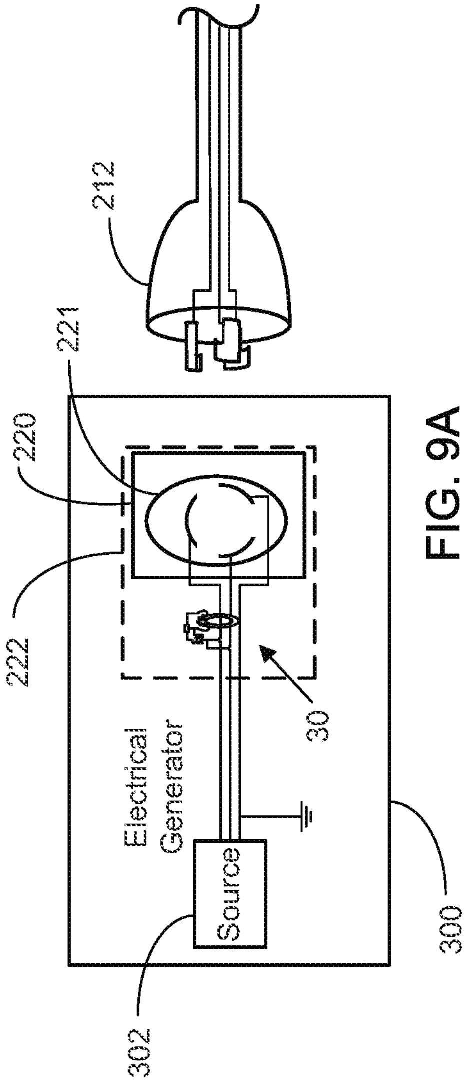
FIGS. 9A-9B are schematic views of electricity distribution from an electrical generator.
Figure 9B:
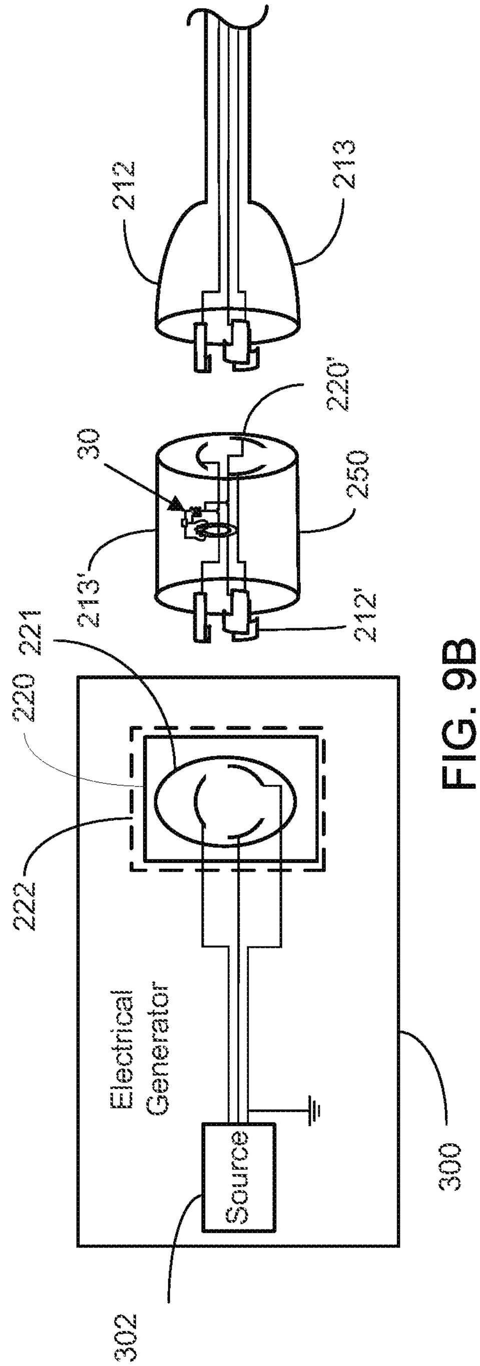

FIGS. 9A and 9B show schematic views of the male twist lock plug 212 used in conjunction with a female socket 220 incorporated into an electrical generator 300. The electrical generator 300 provides a power source 302 that can be used at a construction site, a home, or other location where a portable or backup power supply is desired. The electrical generator 300 generates an electrical current which passes through an electrical cord 210 associated with the male twist lock plug 212 when the cord is connected to the electrical generator. Socket orientation indicia 221 located on a visible face of the socket 220 and/or socket block 222 indicates the locked state, the unlocked state, or both the locked state and the unlocked state of the combination of the male plug 212 and female socket 220. The socket orientation indicia 221 can include an outline displaying the cross-sectional shape of the male housing 213 when in the locked and/or unlocked positions.

Additional configurations of the socket orientation indicia 221 are possible as well. For example, a colored indicator located on the male plug can align with a colored indicator on the female socket when in a locked and/or unlocked position. In another alternative embodiment, the socket orientation indicia 221 is defined by a portion of the face of the socket block 222 (or on the face plate enclosing the female socket) that is raised, elevated, or otherwise set-off relative to adjacent portions of the socket block or surrounding structure. The profile of the raised portion of the face plate would match the profile for the face of the male twist lock plug 212.

The female socket 220 can optionally be located within a socket block 222 incorporated into the electrical generator 300. As shown in FIG. 9A, the socket block 222 can include a ground fault circuit interrupter 30 associated with the female socket 220. In such a configuration, the ground fault circuit interrupter 30 provides global ground fault protection to any electrical cord plugged into the female socket 220.

FIG. 9B shows socket block 222 incorporated into the electrical generator 300 and including a female twist lock socket 220 including socket orientation indicia 221. A socket adapter 250 includes a male plug 212' used to connect to a twist lock female socket, such as the socket 220 integrated with the electrical generator 300. The socket adapter further includes a female plug 220' that can accept other male twist lock plugs, such as the male plug 212 connected to the electrical cord 210.

Connection wires connect the male plug 212' to the female socket 220' within a housing 213' of the socket adapter 250. The socket adapter 250 can optionally include a ground fault circuit interrupter 30 electrically connected between a male plug 212' and a female socket 220'. The ground fault circuit interrupter 30 resides within the housing 213' of the socket adapter 250.

Figure 10A:
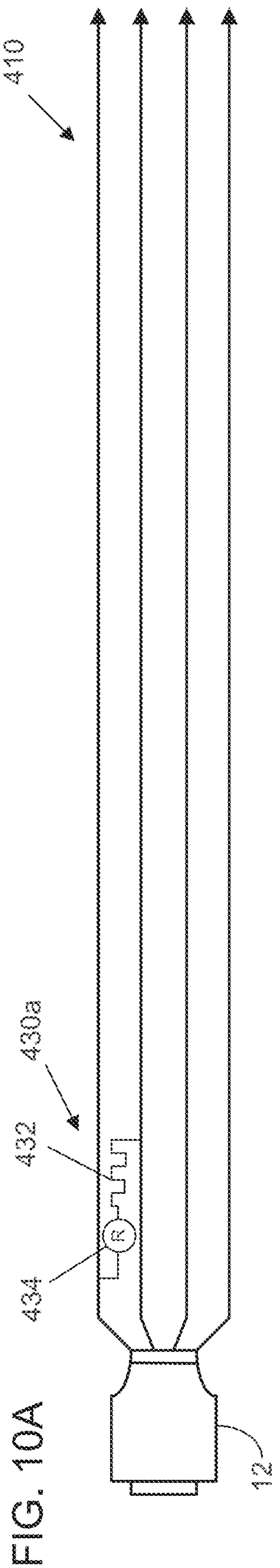
FIGS. 10A-10D are schematic views of various extension cords having integrated thermal failure detection.

FIGS. 10A-10D show schematic views of an extension cord 410 incorporating a thermal indicator circuit according to various embodiments of the present disclosure. FIG. 10A shows the cord 410 including a thermal indicator circuit 430*a* located near a male plug 12. The cord 410 correlates to the cord 10 of FIG. 3B, in that a four wire configuration is shown. The thermal indicator circuit 430*a* includes a thermal switch 432 and an indicator 434.

The thermal indicator circuit 430*a* connects across a conducting wire 14*e* and a neutral wire 14*d* in the extension cord 410. Additional thermal indicator circuits can connect between the neutral wire 14*d* and other conducting wires 14*f*-*g*, or between two conducting wires. The inclusion of a thermal indicator circuit 430 does not depend upon the specific configuration of the extension cord 410; two, three, or four or more wire cords can include thermal protection. In various embodiments, the thermal indicator circuit 430*a* can be located within a housing 13 of the male plug 12 and/or the thermal indicator circuit can be located along the extension cord 410.

The thermal switch 432 activates the thermal indicator circuit 430 when a temperature above a specific temperature is detected. In an exemplary embodiment, the thermal indicator circuit 430 is activated without interrupting electrical flow along the electrically conducting wires. For example, as an extension cord wears, added electrical resistance occurs at the wear areas of the cord 410. This added electrical resistance causes heat. Because cord degradation typically occurs near plug and socket connections, fires and other thermal hazards generally occur in these places as well. The thermal indicator circuit 430 provides a warning to a user of the cord 410 that potentially unsafe temperatures exist within potentially problematic locations within the cord. While the thermal indicator circuit 430 provides the warning, the electrical flow along the electrically conducting wires continues to run and is not interrupted, although other embodiments can include a switch or other mechanism to open the circuit in the event the thermal indicator is tripped.

In one embodiment, the thermal switch 432 is a thermistor, such as an NTC switching thermistor. In an exemplary embodiment, a thermistor such as an NTC switching thermistor, detects a specific temperature using the following generalized equation (1):

$$T = \frac{1}{a + b\ln R + c(\ln R)^3} \tag{1}$$

where a, b, and c are device-specific parameters, T is the temperature, and R is the resistance of the thermistor. The threshold value for the resistance is selected to correspond to a temperature value at or below a temperature limit for safe operation of the extension cord 410. When the temperature reaches the threshold, the resistance reaches a low enough level that the circuit is considered to be a "closed" circuit. Other temperature sensitive switches can be used as well. Although equation (1) is presented in this disclosure, various embodiments may operate according to physical and mathematical principles other than those described by equation (1).

The thermal switch 432 generally operates to connect a circuit upon detection of a minimum temperature. Thermal switches can include thermistors, which are variable-resistance resistors, whose resistance changes according to its temperature. In one possible type of thermistor, a negative temperature coefficient (NTC) thermistor, a decrease in resistance occurs as temperature increases. The thermistor can be made from a semiconducting material, such as a metal oxide. Raising the temperature of such a thermistor increases the number of charge carriers in the thermistor. The more charge carriers that are available, the more current that can be conducted, and the lower the resistance of the material. In another possible type of thermistor, a positive temperature coefficient (PTC) thermistor, an increase in resistance occurs as temperature increases. Thermal switches generally use a switching thermistor (either NTC or PTC), which means that the resistance of the thermistor either rises or falls suddenly at a certain critical temperature. This critical temperature is the critical temperature at which the thermal switch changes state. Other embodiments can include a thermal switch other than a thermistor.

The indicator 434 is an electrically activated indicator perceptible to a user of the cord, and indicates when the temperature reaches a specific threshold and the thermal switch 432 reaches its "closed" state. The indicator 434 activates upon activation of the thermal switch 432. The indicator 434 can include a light, such as a light-emitting diode, incandescent bulb, or other display or illumination device. The indicator 434 can also include a fuse or circuit protection device. The indicator 434 can include an audible alarm. A combination of indicators can be used in combination as well, such as multiple lights, a light and an audible alarm, a light and a fuse, or other configurations. Additionally, a light can be positioned within a housing that is at least partially translucent.

Figure 10B:
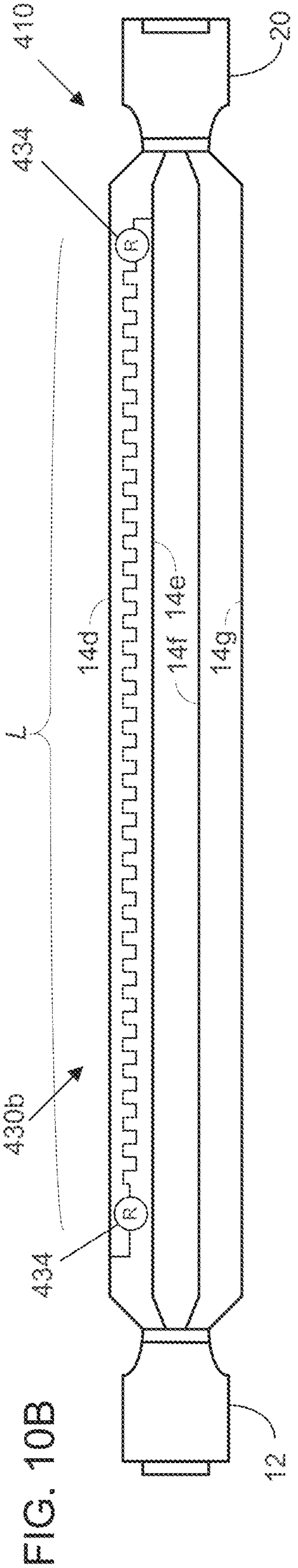

FIG. 10B shows the cord 410 including a thermal indicator circuit 430*b* that reaches across the entire length L of the cord 410. The thermal switch 432 spans the length of the cord 410, and can include one or more indicators 434, such as one indicator at each end of the cord 410. The thermal switch 432 activates the thermal indicator circuit 430*b* by activating the indicators 434 upon detection of the threshold temperature (or higher) at any location along the cord 410. In a further embodiment, the thermal indicator circuit 430*b* spans less than the entire length L of the cord 410.

In the embodiment shown, both indicators 434 are the same type of indicator. However, in alternate embodiments various types of indicators can be used in combination, such as an audible alarm and a light emitting diode, or other combinations. In yet another possible embodiment, the indicators are replaced by or positioned in electrical series with a relay having contacts in line with conducting wire 14*e* and an armature activated by the thermal switch 432. When the thermal switch 432 is tripped, the armature moves the contacts and creates an open circuit in the conducting wire 14*e*.

Figure 10C:
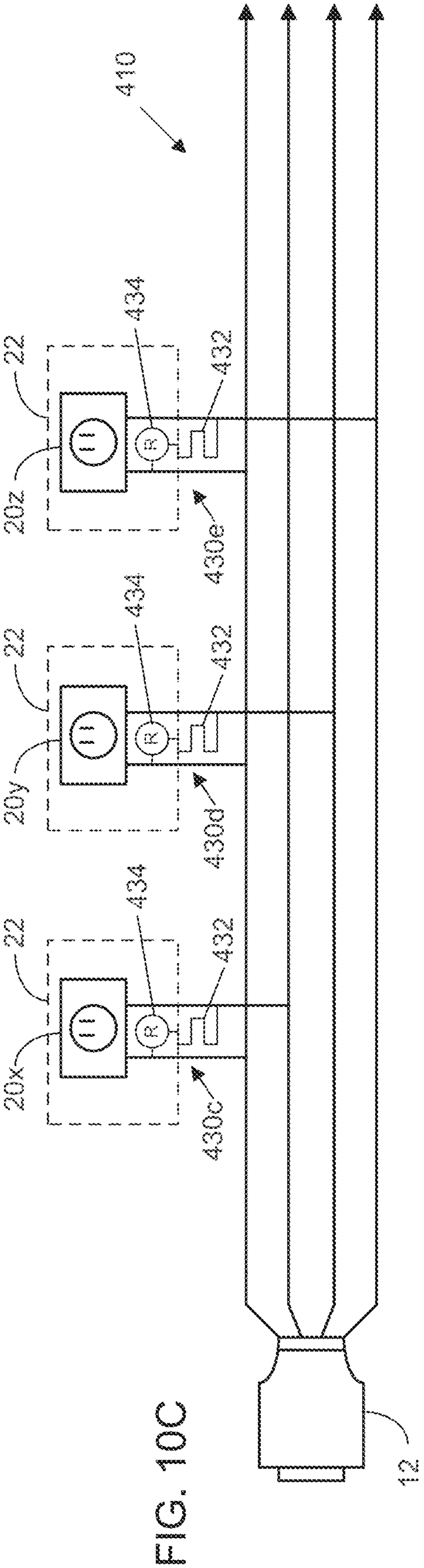

FIG. 10C shows the cord 410 including multiple separate circuits including female sockets 20*x*-*z*, and corresponds to FIG. 3B, above, in that it shows an embodiment of a cord 410 for use with a four-wire service and including a number of socket blocks 22 dispersed along the cord 410. Each socket block 22 contains one or more female sockets 20*a*-*c*, which can be configured in a manner as described in conjunction with FIG. 3. Thermal indicator circuits 430*c*-*e* reside near each socket block 22, with at least a portion of the thermal switch 432 located near the junction of the socket block 22 with a flexible portion of the cord 410 due to the high probability of wear at those locations. The thermal indicator circuits 430_c-e_ detect thermal degradation near each socket block 22, such that a user of the cord 410 can choose to continue use of the cord 410 after one socket block 22 becomes unsafe by switching to a separate electrically isolated socket block. The indicator 434 can reside within or be located separate from the socket block 22.

In an alternate configuration, a thermal indicator circuit 430_a_ can be located proximate to the male plug 412, and is used in conjunction with the thermal indicator circuits 410_c-e_ located near the female sockets 20_x-z_.

Figure 10D:
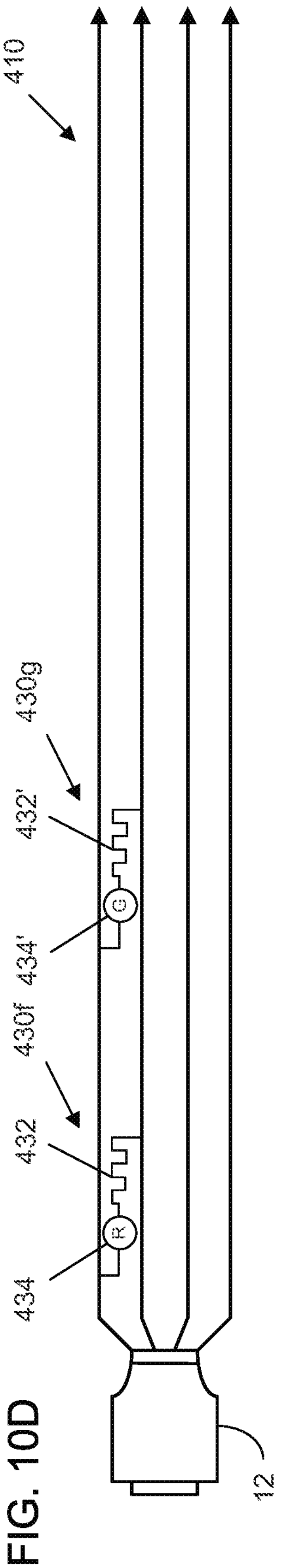

FIG. 10D shows the cord 410 including two thermal indicator circuits 430_f-g_. FIG. 10D corresponds to FIG. 10A, but includes a second thermal indicator circuit 430_g_ having different operation from the first thermal indicator circuit 430_f_.

Thermal indicator circuit 430_f_ includes a thermal switch 432 and an indicator 434. Thermal indicator circuit 430_g_ includes a thermal switch 432' and an indicator 434'. Thermal switches 432 and 432' can differ based on threshold temperature, normal state (open or closed), or other factors. Indicators 434 and 434' can be either the same or different indicators selected from among the possible indicators described above in conjunction with FIG. 10A.

In a first possible embodiment, second thermal indicator circuit 430_g_ is a warning circuit, and has a thermal switch 432' with a lower threshold temperature than thermal switch 432 of thermal indicator circuit 430_f_. A user of such a device is provided two levels of severity warnings for use of the electrical cord 410. In various other embodiments, the thermal switch 432' has inverse operation to the operation of thermal switch 432. In one implementation of this embodiment, thermal switch 432 is an NTC thermistor and thermal switch 432' is a PTC thermistor, and both switches 432, 432' have the same threshold temperature. The circuit 430_g_ remains normally connected, activating indicator 434'. When the temperature of the cord exceeds the threshold temperature, thermal switch 432' opens and deactivates indicator 434' in thermal indicator circuit 430_g_, and thermal switch 432 closes and activates indicator 434 in thermal indicator circuit 430_f_. In a possible embodiment, indicator 434' can be a green light emitting diode and indicator 434 can be a red light emitting diode. Illumination of the green light emitting diode indicates safe operation of the cord 410, and illumination of the red light emitting diode indicates hazardous operation of the cord 410. Other configuration of indicators and threshold temperatures are possible as well.

Figure 11A:
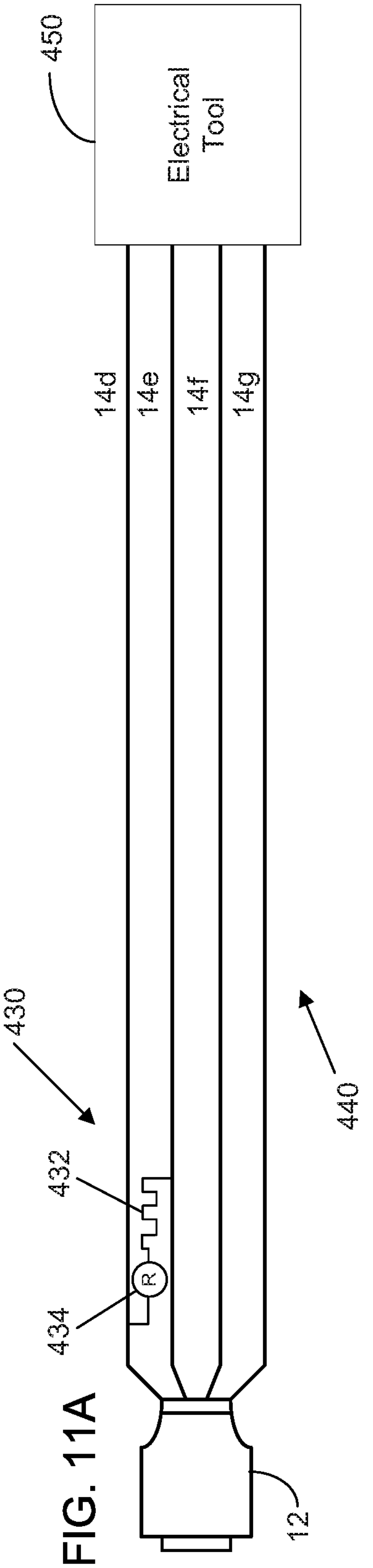
FIGS. 11A-11C are schematic views of various electrical cords having integrated thermal failure detection.
Figure 11B:
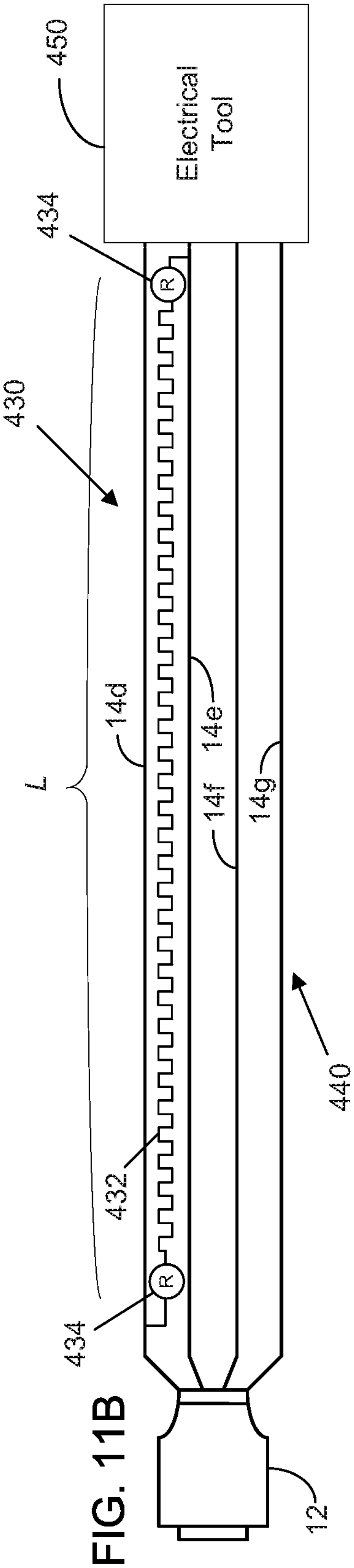
Figure 11C:
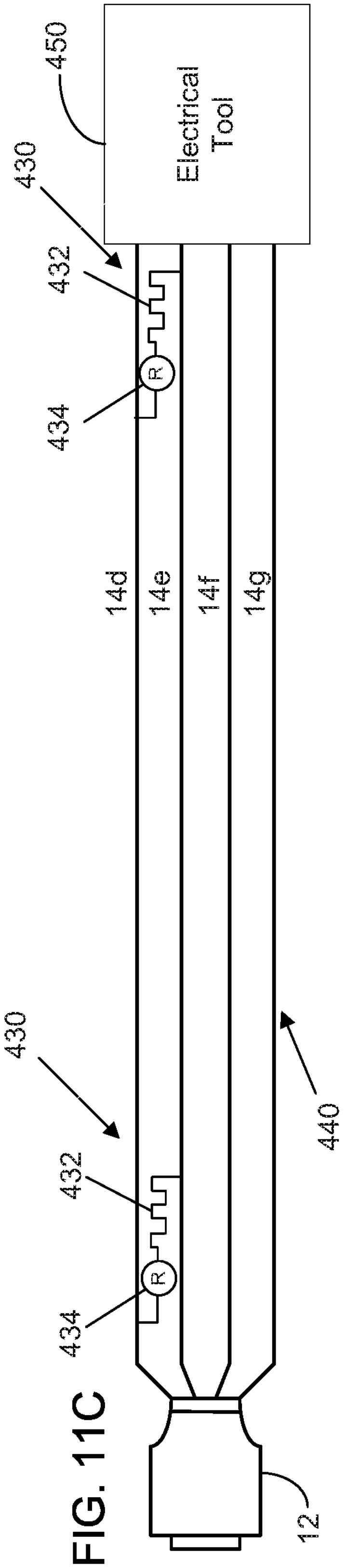

FIGS. 11A-11C show schematic views of various embodiments of an electrical cord 440 incorporating a thermal indicator circuit 430 into an electrical cord 440. The electrical cord 440 connects to an electrical tool 450, and can be either an extension cord as described in FIGS. 10A-C, or can be non-detachably incorporated onto the electrical tool 450. The electrical tool 450 can be any of a number of construction tools, such as a rotary saw, a sander, nail gun, drill, or other machinery. The electrical tool 450 can also be unrelated to construction, and can be any other type of electrical device which typically draws a high current or where cord wear could be a concern. Such devices could include, for example, a hair dryer, a microwave or other appliance, a vacuum, or other devices.

FIG. 11A corresponds to FIG. 10A incorporated with an electrical tool 450, and shows the electrical cord 440 including a thermal indicator circuit 430_a_ near or integrated with a male plug 12 as previously described. FIG. 11B corresponds to FIG. 10B incorporated with an electrical tool 450, and shows the electrical cord 440 including a thermal indicator circuit 430_b_ spanning the length L of the electrical cord 440 between the male plug 12 and the electrical tool 450. FIG. 11C corresponds to both FIGS. 10A and 10C, and shows the electrical cord 440 including a thermal indicator circuit 430_a_ proximate to the male plug 12 and a second thermal indicator circuit 430_c_ proximate to the electrical tool 450.

In each of the embodiments shown, the thermal indicator circuit 430 is connected across the neutral wire 14_d_ and conducting wire 14_e_. In alternate configurations of the electrical tool, additional thermal indicator circuits 430 connect between the neutral wire 14_d_ and a different conducting wire 14_e_-f in the electrical cord 440. The electrical cord 440 can include more or fewer conducting wires 14, and can include a ground wire (not shown).

Figure 12:
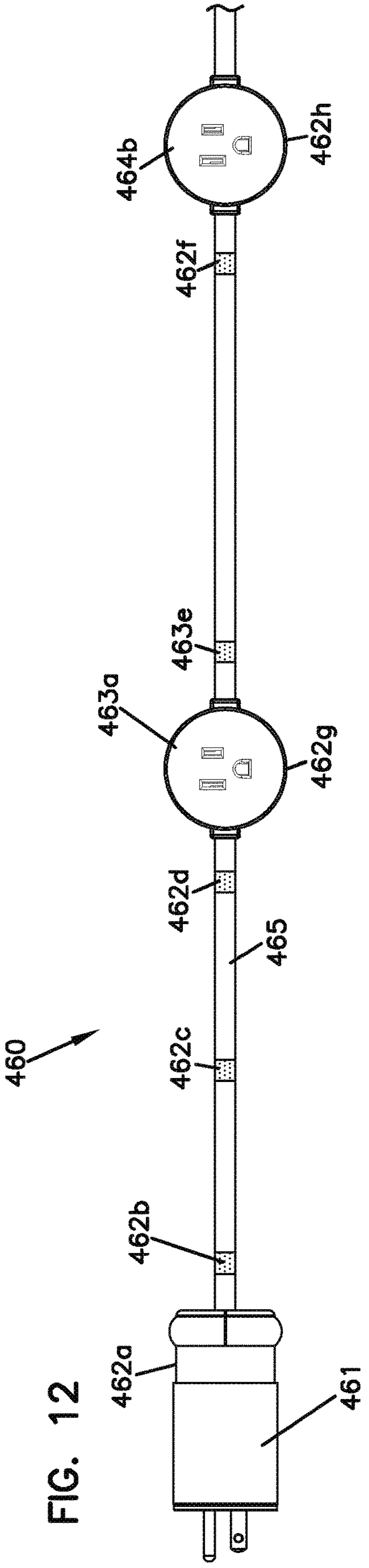
FIG. 12 is a front view of an extension cord having a thermochromatic material to indicate temperature of the cord.
Figure 13A:
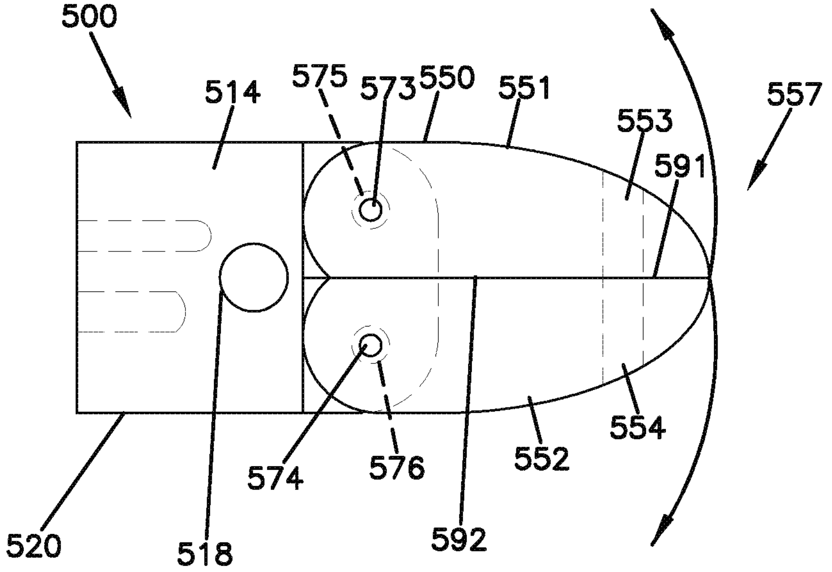
FIG. 13A is a side view of a female socket having an adjustable anchor in a closed position.
Figure 13B:
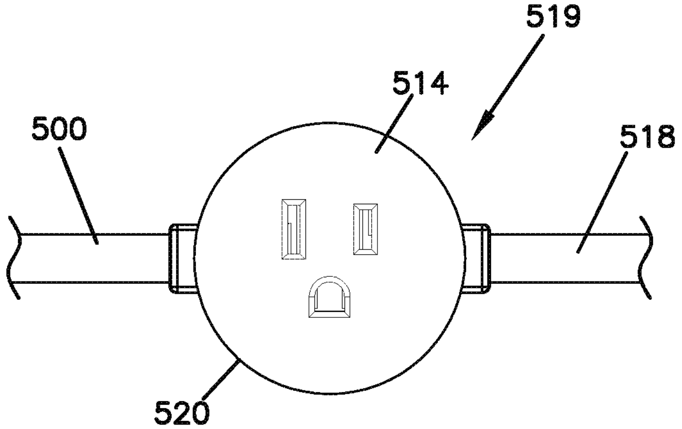
FIG. 13B is a front view of the female socket shown in FIG. 13A with the adjustable anchor in the closed position.
Figure 14B:
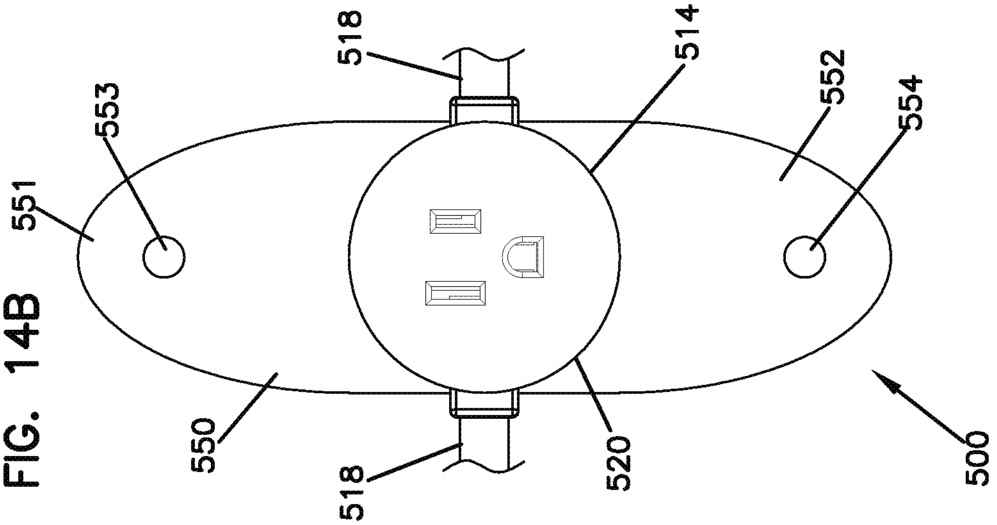
FIG. 14B is a front view of the female socket shown in FIG. 13A when the adjustable anchor is in an open position.
Figure 14A:
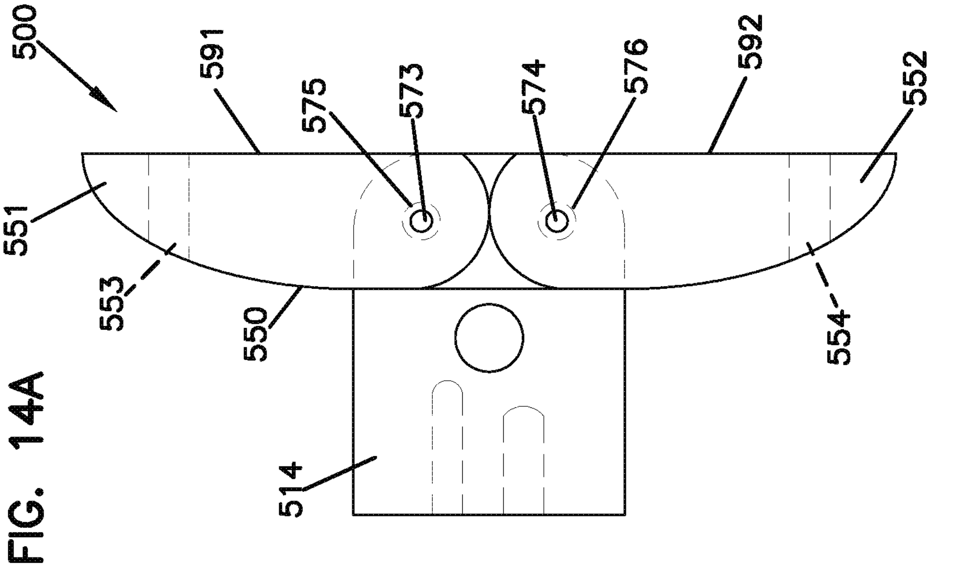
FIG. 14A is a side view of the female socket shown in FIG. 13A when the adjustable anchor is in an open position.

FIG. 12 shows an exemplary extension cord 460 having a male plug 461, one or more female sockets 463_a_ and 463_b_, and an electrical conductor 465. A thermochromatic material 462 forms a thermal indicator and is mounted on or integrated into the extension cord 460 at one or more locations 462_a_-462_h_. The thermochromatic material 462 can be formed with any type of temperature sensitive material that changes color in response to temperature as described herein. Examples of possible thermochromatic materials include thermochromatic liquid crystals, polymers, paints, dyes, and inks.

The thermochromatic material 462 can have different forms and can be applied to the extension cord 460 in different ways. For example, the thermochromatic material 462 can be in the form of a tape, label, or other substrate having an adhesive backing that is applied to the surface of the extension cord 460. In another possible embodiment, the thermochromatic material 462 can be a coating or material such as polymer, liquid crystal, paint, dye, or ink applied directly to extension cord 460. In this embodiment, the thermochromatic material 462 can be applied to the surface of the extension cord 460 by any suitable techniques such as brushing, spraying, or otherwise depositing it onto the surface of the extension cord 460. Alternatively, the male plug 461, one or more female sockets 463 or insulator on the conductor 465 is formed, at least in part, with the thermochromatic material 462 molded into the extension cord 460. In these embodiments, the thermochromatic material 462 is applied to the male plug 461 (e.g., thermochromatic material 462_a_), one or more of the female sockets 463 (e.g., thermochromatic material 462_g_ and 462_h_), the conductor 465 (thermochromatic material 462_b_-462_f_), or any combination thereof.

The thermochromatic material 462 can have different sizes and shapes. Thermochromatic material 462 can be applied to the extension cord 460 during the manufacturing process or provided to users to apply to the extension cords 460 as an after-market product. Additionally, thermochromatic materials 462 having different sizes and shapes can be positioned at different locations along a single extension cord 460.

In use, the thermochromatic material 462 changes a color upon detecting a temperature at or above a threshold temperature of the extension cord 460 so that it provides a warning that the extension cord 460 might be over-heated. When the portion of the extension cord 460 proximal to the thermochromatic material 462 has a temperature below the threshold temperature, the color of the thermochromatic material 462 has a first color. When the portion of the extension cord 460 proximal to the thermochromatic material 462 reaches a temperature at or above the threshold temperature, the color of the thermochromatic material 462 changes to a second color which is different from the first color.

In an exemplary embodiment, once the temperature of the extension cord 460 proximal to the thermochromatic material 462 decreases and becomes lower than the threshold temperature, the thermochromatic material 462 changes its color from the second color back to the first color. In another exemplary embodiment, the color of the thermochromatic material 462 does not return to its original color even after the temperature falls below the threshold value. An advantage of applying a thermochromatic material 462 to an extension cord is that it can indicate when the extension cord 460 has reached such a temperature as to become a fire hazard.

In an alternative embodiment, the thermochromatic material 462 can be made to change a color when the temperature reaches multiple different temperature thresholds so that multiple warnings can be given to a user. For example, when the temperature of the extension cord 460 reaches or exceeds a first threshold temperature, the thermochromatic material 462 changes its color from a first color (e.g., green) to a second color (e.g., orange). This first color gives a user a first warning. When the temperature of the extension cord 460 continues to rise and reaches a second threshold, the temperature sensitive sheet 462 changes its color from the second color (orange) to a third color (e.g., red) and gives the user a second level warning which is more serious than the first warning regarding over heating of the extension cord 460. The thermochromatic material 462 can further be configured to change from any number of colors to different colors when the temperature reaches a different threshold temperature and then give more levels of warnings as described above. In another possible embodiment, the color of the thermochromatic material 462 may change continuously in responding to the continuous changes of the temperature.

In one possible application, the thermochromatic material 462 is applied to locations of the extension cord 460 that are most likely subject to failure or resistive heating. Examples of such locations are where the electrical current flows from one electrical conductor to another or the cord is most commonly subject to twisting and bending. Examples of such locations include the male plug 461, the female sockets 463, and the portion of the insulator on the conductor 465 that is adjacent to the male plug 461 and the female sockets 463. In other possible embodiments, the thermochromatic material 462 extends along substantially the entire length of the extension cord 460.

Although the thermochromatic material 462 is illustrated as being applied to an extension cord having intermittently spaced female sockets and anchors, it could be applied to many other types of cords. For example, the thermochromatic material 462 can be applied to extension cords having a single female socket or socket block, power cords for electrical devices, and other power distribution device.

Referring now to FIGS. 13A, 13B, 14A, and 14B an alternative embodiment of the extension cord 500, includes a female socket 520 mounted on an electrical conductor 518 having an adjustable anchor 550 that can pivot between at least two positions to enable the extension cord 500 to be either suspended or mounted on a vertical surface such as a wall, studs, or posts. The anchor 550 includes first and second anchor members 551 and 552, which are pivotally connected to a housing 514 of the female socket 520 by first and second pivots 573 and 574, respectively. The first anchor member 551 defines a first void 553 and has a first surface 591. The second anchor member 552 defines a second void 554 and has a second surface 592. The first and second voids 553 and 554 are sized to receive a hanger for suspending the extension cord 500 and alternatively a fastener such as a screw, nail, pin, or peg to mount the extension cord 500 on a vertical surface. In the exemplary embodiment, the female socket 520 has a generally tear-drop shape configuration. Although the exemplary embodiment illustrates the adjustable anchor as forming a part of the female socket block, other embodiments will have adjustable anchors positioned along the extension cord at locations other than a female socket.

When the anchor 550 is in a first or closed position (illustrated in FIGS. 13A and 13B), the first and second surfaces 591 and 592 of the first and second anchor members 551 and 552, respectively, are directly adjacent to one another and the first and second voids 553 and 554 are axially aligned to one another. In a second or open position (illustrated in FIGS. 14A and 14B), the first and second surfaces 591 and 592 are coplanar and the voids 553 and 554 are parallel to one another and are orthogonal to the first and second surfaces 591 and 592. The first and second anchor members 551 and 552 can be pivoted between the first and second positions or any other position such as in a 90° arrangement to adapt to a corner. The adjustable anchor 550 provides flexibility to allow the extension cord to be suspended or mounted on a variety of different surfaces having a variety of different orientations and shapes.

In an exemplary embodiment, the anchor 550 is spring-loaded. For example, the anchor 550 includes first and second springs 575 and 576 which extend around the pivots 573 and 574, respectively, and between the first and second members 551 and 552 and the housing 514, respectively. The first and second springs 575 and 576 bias the first and second members 551 and 552 into the first or closed position. Alternative embodiments do not include springs 575 and 576 and the first and second anchor members 551 and 552 are not biased to any particular position. Any suitable structure that biases the first and second anchor members 551 and 552 can be used such as other spring structures. The anchor 550 can also be formed with a resilient material that naturally urges the anchor members 551 and 552 to a predetermined position. In another alternative embodiment, the first and second anchor members 551 and 552 are biased into the second or open position.

In another possible embodiment, the first and second anchor members 551 and 552 engage the housing 514 with a snap fit when in the first or closed position as described herein. The snap fit can be formed with any suitable structure such as nubs (not shown) on the first and second anchor members 551 and 552 and mating depressions (not shown) in the housing 514. The snap fit holds the first and second anchor members 551 and 552 in the closed position so that the first and second voids 553 and 554 remain aligned even when a user is not directly grasping the anchor 550. In another embodiment, the anchor 550 includes a snap fit structure that holds the first and second anchor members 551 and 552 in the second or open position. An advantage of this embodiment is that it can make the female socket 520 and anchor 550 easier to handle when mounting it on a surface as described below in conjunction with FIG. 15, especially if the first and second anchor members 551 and 552 are biased in the closed position.

Figure 15:
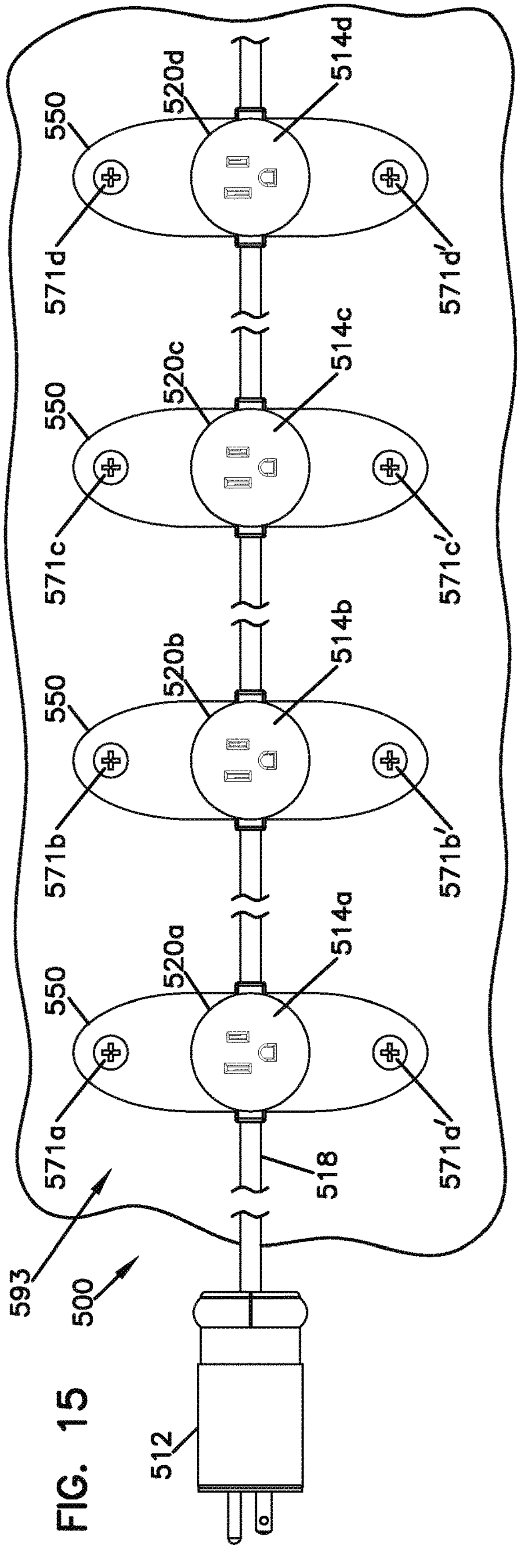
FIG. 15 is a side view of an extension cord having intermittently spaced sockets and adjustable anchors in an open position and mounted on a vertical surface.
Figure 16:
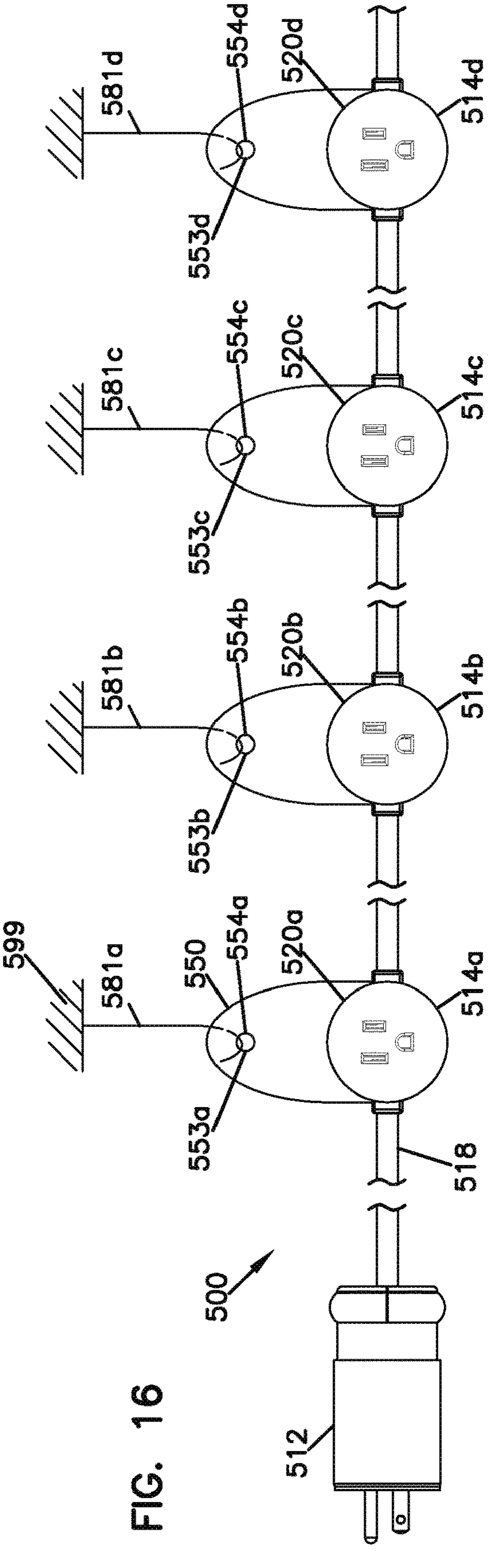
FIG. 16 is a side view of an extension cord having intermittently spaced sockets and adjustable anchors in a closed position suspended.

FIGS. 15 and 16 illustrate alternative ways to use the extension cord 500 and the flexibility provided by the anchor 550. The extension cord 500 includes a male plug 512, a conductor 518, and a plurality of female sockets 520*a*-520*d*.

In FIG. 15, the first and second anchor members 551*a*-551*d* and 552*a*-552*d* are in the second or open position so that the first and second surfaces 591 and 592 for each anchor member 551 and 552 are coplanar and positioned against a vertical surface 593 such as a wall. The first and second anchor members 551*a*-551*d* and 552*a*-552*d* are held in place by fasteners 571*a* and 571*a*'-571*d* and 571*d*', respectively, that extend through the first and second voids 553 and 554 and are attached to the vertical surface 593. The illustrations show the fasteners 571 as screws, but other fasteners or similar structures can be used such as nails, pins, hooks, or pegs. Additionally, the anchors 550*a*-550*d* can be attached to structures other than walls such as studs or posts. In FIG. 16, the first and second anchor members 551*a*-551*d* and 552*a*-552*d* are in the first or closed positions so the first and second voids 553*a*-553*d* and 554*a*-554*d* are axially aligned. The extension cord 500 is then suspended by hooking the anchors 550*a*-550*d* on a hook 581*a*-581*d*, respectively, that passes through the first and second voids 553*a*-553*d* and 554*a*-554*d*. The hooks 581*a*-581*d* can be attached to an overhead structure 599 such as a ceiling or rafters. Alternatively the hooks 581*a*-581*d* can extend from a wall, from stakes planted in the ground, or from any other structure that can support the extension cord 500. Also, any structure other than a hook that can pass through the voids 553*a*-553*d* and 554*a*-554*d* can be used. An advantage of these cords is that they can be mounted on or suspended from many different types and orientations of surfaces, which allows the cords to be positioned in safe and convenient locations.

Figure 17:
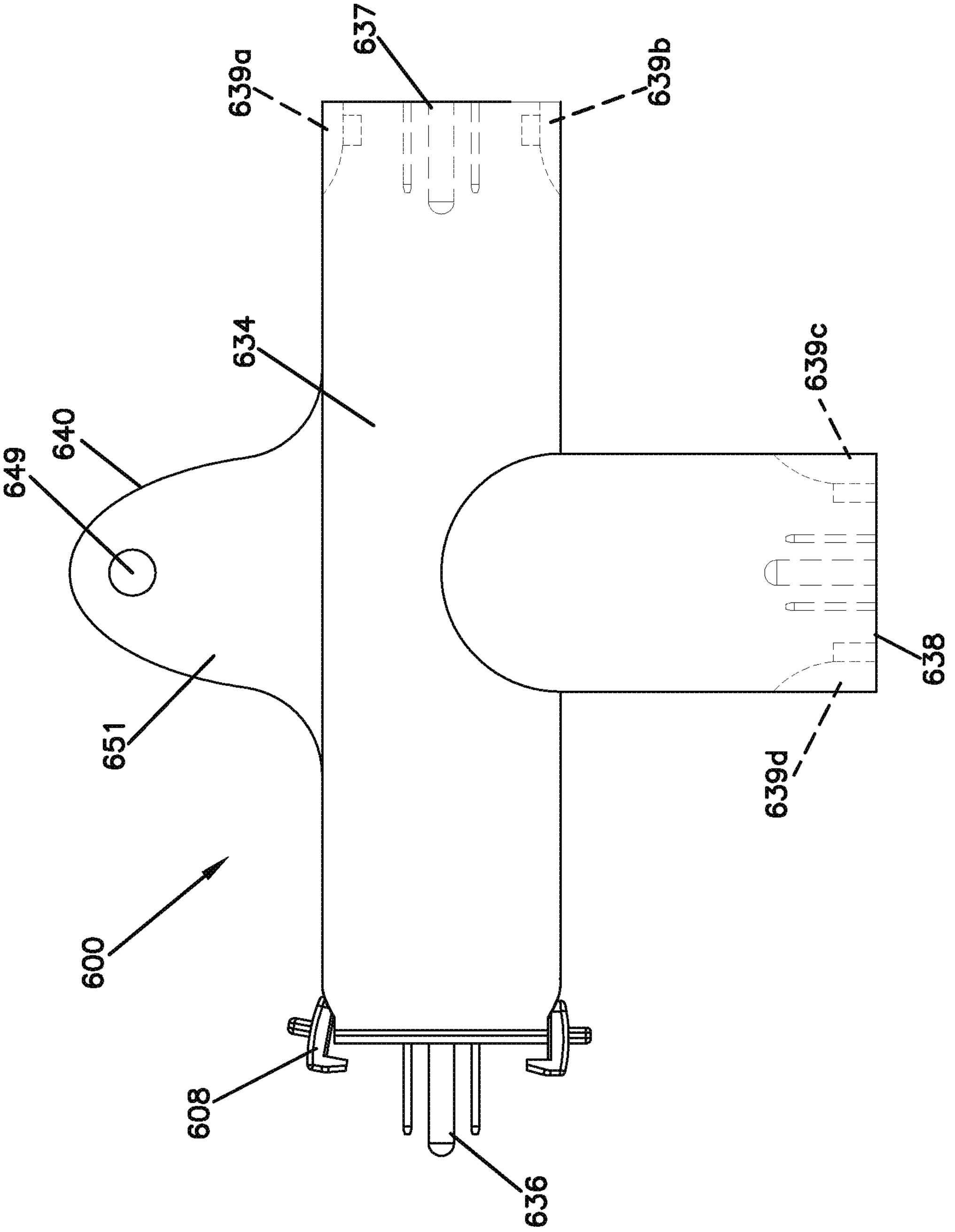
FIG. 17 is a side view of an electrical adapter having an anchor and a fastener.

FIG. 17 is a view of an electrical adapter 600 that includes a housing 634 and three electrical connectors 636, 637, and 638 which are positioned in the housing 634. The three electrical connectors 636, 637, and 638 are in electrical communication with each other. The first electrical connector 636 is substantially axially aligned with the second electrical connector 637. In addition, the third electrical connector 638 is positioned generally orthogonal to the first electrical connector 636 and the second electrical connector 637. The first electrical connector 636 is a male electrical plug. The second and third electrical connectors 637 and 638 are female electrical sockets. In alternative embodiments, each of the first, second, third connectors 636, 637, and 638 can be either a male electrical plug or a female electrical socket.

Figure 19:
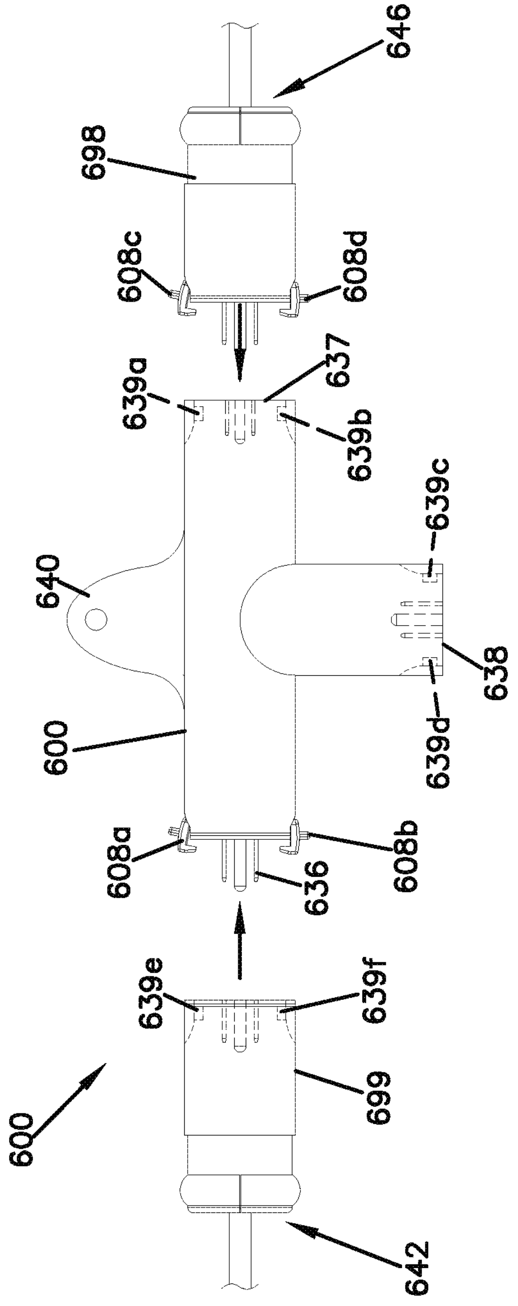
FIG. 19 is a side view of the electrical adapter shown in FIG. 17 connecting two extension cords.

The electrical adapter 600 also includes fasteners 608*a* and 608*b* positioned proximate to the first electrical connector 636 (male plug) and pivotally connected to the housing 634 and adapted to secure the housing 634 to an extension cord (shown in FIG. 19). The electrical adapter 600 also includes engaging structures 639*a*-639*d* proximal to the second and third electrical connectors 637 and 638 (female sockets) configured to engage, receive, catch, or otherwise mate with a fastener (similar to fastener 608) from other extension cords or power cords from electrical devices. In the exemplary embodiment, the engaging structures 639*a*-639*d* are depressions defined in the housing 634 and arranged to receive the fastener. In alternative embodiments, the engaging structures 639*a*-639*d* are protruding flanges (not shown) or other suitable structure configured to be caught or otherwise engaged by a fastener (similar to fastener 608) from other extension cords, power cords, or electrical devices. Although the illustrated embodiment shows the fasteners 608*a* and 608*b* proximal to the male electrical plug and the engaging structures 639*a*-639*d* proximal to the female sockets, other embodiments could reverse this arrangement so the fasteners 608*a* and 608*b* is positioned proximal to the female sockets and the engaging structures 639*a*-639*d* are positioned proximal to the male plugs.

In alternative embodiments, the fasteners 608*a* and 608*b* are biased to a closed position so that the second portions 624 (described below) for each fastener 608*a* and 608*b* are urged toward one another and toward the center of the housing 634 at the site of the electrical connector 636. In various embodiments, the fasteners 608*a* and 608*b* can be spring loaded to create the bias or can be formed with a resilient material that naturally returns to the biased position. Additionally, in other embodiments the fasteners engage the housing 634 with a snap fit such as can be formed with a nub and depression arrangement. The snap fit structure can be positioned to hold the fasteners 608*a* and 608*b* in the open position, the closed position, or both.

In one possible embodiment, the electrical adapter 600 also includes an anchor 640 operably connected to the housing 634. The anchor 640 is formed by a hole 649 which is defined in the housing 634. The housing 634 includes a projecting member 651 to form the anchor 640 and the projecting member 651 defines the hole 649. In another possible embodiment, the anchor 640 is substantially similar to the anchor discussed above for example in FIGS. 13A, 13B, 14A, and 14B. In an alternative embodiment, the anchor 640 is an adjustable anchor as described in more detail herein.

Generally, the anchor 640 and the third electrical connector 638 are positioned on substantially opposite sides of the housing 634. In one possible embodiment, the anchor 640 is positioned about half way between the first electrical connector 636 and the second electrical connector 637. In alternative embodiments, the anchor 640 can be positioned anywhere along the electrical adapter 600.

Figure 18A:
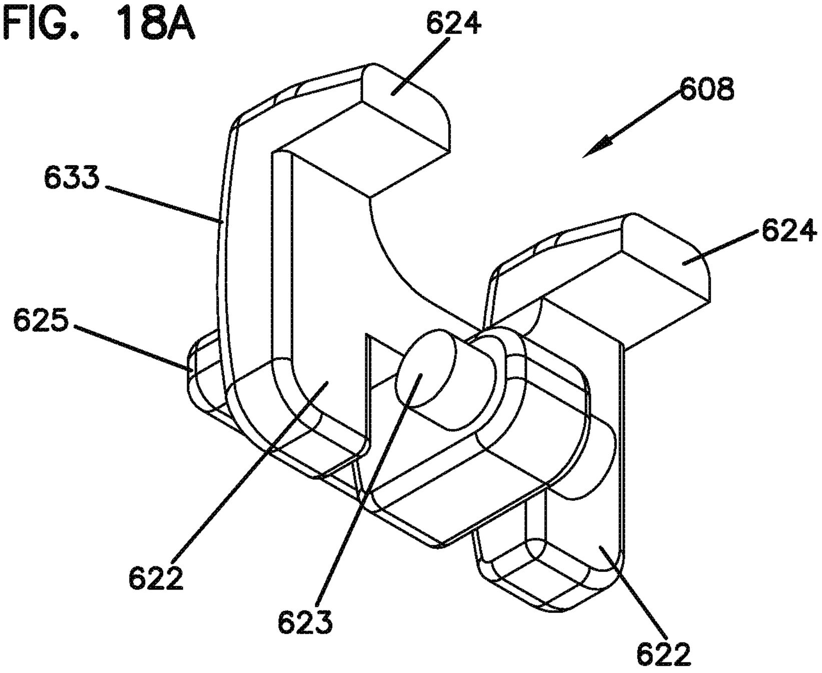
FIGS. 18A and 18B are perspective and side views, respectively, of the fastener shown in FIG. 17.
Figure 18B:
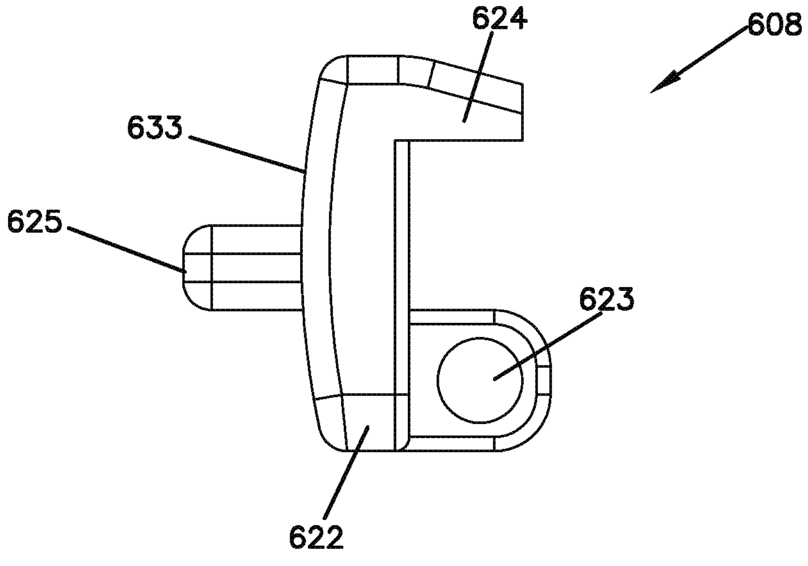

Referring now to FIGS. 18A-18B, the fastener 608 has a pivot 623 that pivotally connects to the housing 634 of the electrical adapter 630. The fastener 608 has a generally L-shaped member 633 with a first portion 622 and a second portion 624. The fastener 608 pivots around the pivot 623 so the second portion 624 selectively engages an engaging structure (similar to engaging structure 639) on another electrical adapter, extension cord, power cord, or electrical device. The fastener 608 also has a knob or other projecting member 625 generally parallel to the second portion 624 and projecting from the first portion 622 in a direction opposite to the second portion 624. The projecting member 625 provides a structure for a user to engage with their finger and pivot the fastener 608 around the pivot 623.

The fasteners 608 can have any type of structure that allows a male plug on an electrical adapter, extension cord, power cord, or electrical device to be secured to a female socket on another electrical adapter, extension cord, power cord, or electrical device. In lieu of the L-shaped structure illustrated, for example, the fastener 608 can be formed with clips, threaded structures such as nuts or collars, prongs, elastic bands, or hook and loop fasteners such as VELCRO© brand fasteners. Additionally, the engaging structure 639 can be any structure that engages the mating fastener to secure together male plugs and female sockets. Examples other than the illustrated depression include flanges, thread structures, elastic bands, and hook and loop fasteners. In yet other embodiments, the fastener 608 may be able to secure a male plug to a female socket without an engaging structure 639.

FIG. 19 is a view of the electrical adapter 600 including two extension cords 642 and 646. Each of the extension cords 642 and 646 has intermittently spaced female sockets (not shown) and anchors (not shown) as described in more detail herein, although extension cords having a single female socket can be used. The first extension cord 642 has a female socket 699 connected to the first electrical connector 636 while the second extension cord 646 has a male plug 698 connected to the second electrical connector 637. The female socket 699 of the first extension cord 642 has engaging structures 639*e* and 639*f* to mate with the fasteners 608*a* and 608*b*, respectively. The second extension cord 646 has fasteners 608*c* and 608*d* that mate with the engaging structures 639*a* and 639*b*, respectively when the second extension cord 646 connects to the second electrical connector 637. In addition, a third extension cord or electrical device (not shown) can be connected to the third electrical connector 638.

Additionally, alternative embodiments of the electrical adapter 600 can include any number of electrical connectors and any combination of male plugs and female sockets. Additionally, the electrical connectors (e.g., male plugs and female sockets) can have any orientation with respect to each other including being parallel, orthogonal, or angled. The housing 634 also can have many different configurations other including a t-shape, linear shape, cross, and a 90° bend or corner shape.

Figure 20:
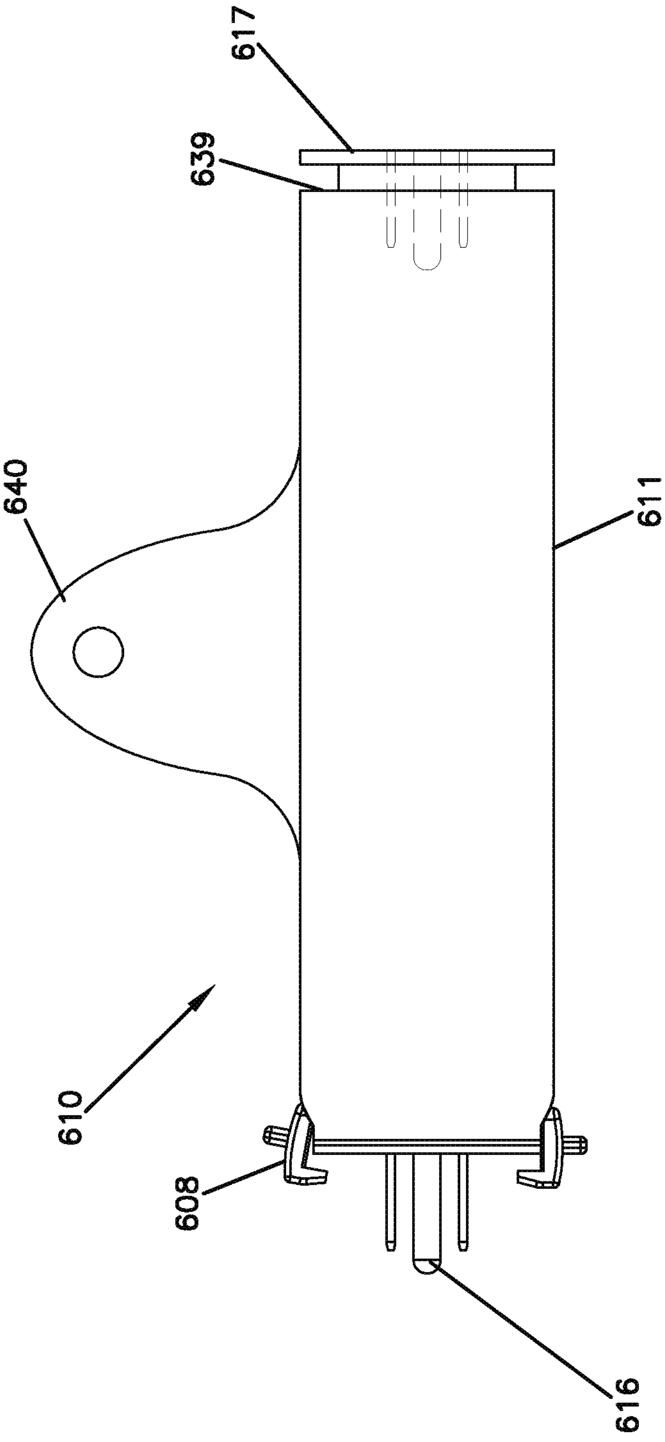
FIG. 20 is a side view of an alternative embodiment of the adapter shown in FIG. 17.

Referring to FIG. 20, for example, an electrical adapter 610 is similar to the electrical adapter 600 shown in FIG. 17 except that the electrical adapter 610 has a linear housing 611 and only first and second electrical connectors 616 and 617 positioned at opposite ends of the housing 611. The first and second electrical connectors 616 and 617 are substantially axially aligned with each other. The first electrical connector 616 is a male electrical plug. The second electrical connector 617 is a female electrical socket. Fasteners 608*a* and 608*b* are positioned proximal to the first electrical connector 616 and an engaging structure 639 is positioned proximal to the second electrical connector 617. In the exemplary embodiment, the engaging structure 639 is a groove defined in and extending around the entire circumference of the housing 611. The electrical adapter 610 has an anchor 640.

Figure 21:
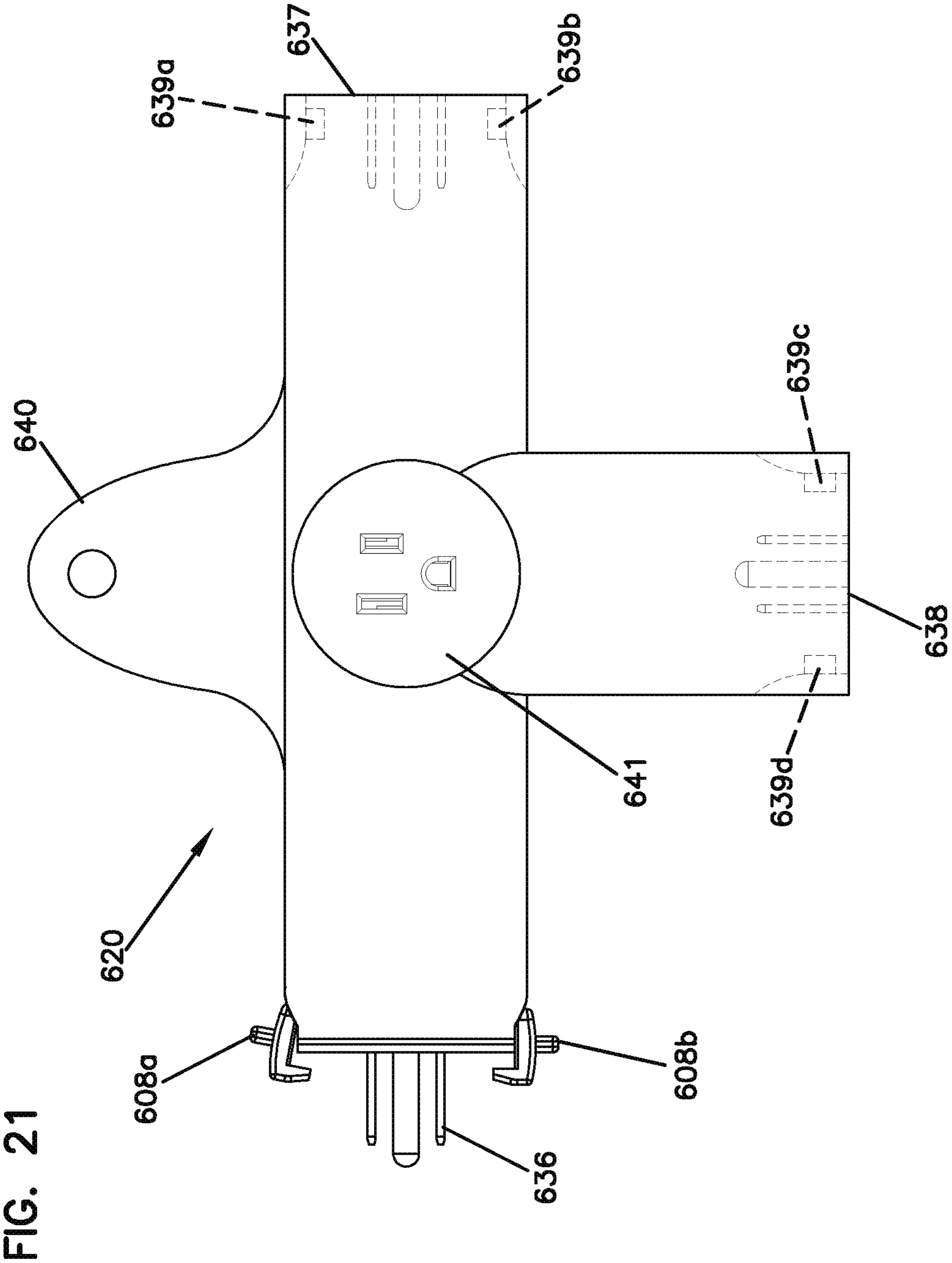
FIG. 21 is a side view of another alternative embodiment of the adapter shown in FIG. 17.

FIG. 21 shows an electrical adapter 620 similar to the electrical adapter 600 shown in FIG. 17 except that the electrical adapter 620 has a fourth electrical connector 641 that is orthogonal to the first, second, and third electrical connectors 636, 637, and 638. The fourth electrical connector 641 is positioned between the first electrical connector 636 and the second electrical connector 637. In alternative embodiments, the electrical connectors 636, 637, 638, and 641 can be any combination of male plugs and female sockets.

The electrical adapters described herein can be used with many different types of extension cords including extension cords having intermittently spaced female sockets and/or intermittently spaced anchors. When used with extension cords having intermittently spaced anchors, the anchor 640 on the electrical adapter 600 provides a location to suspend the string of extension cords proximal to the connection between the male plug of one cord and the mating female socket of the other cord so that the string of extension cords is supported at that location. For extension cords that have intermittently spaced anchors, but do not have any anchor proximal to the male plug or last female socket, electrical adapters having an anchor 640 provide a way to further support the cords so the male connector receives support and does not hang down significantly lower than other portions of the extension cords. Additionally, the electrical adapter 600 enables users to assemble a network of extension cords to establish a power distribution network that can be suspended overhead, extend along vertical surfaces such as walls or studs, or simply suspended off of the ground on stakes plated in the ground to keep the extension cords out of puddles and other damp surfaces.

The electrical adapters and extension cords also can be used with the temporary light fixtures described in more detail herein to set up temporary and/or emergency lighting at constructions sights. Alternatively, a networks or string of extension cords can be assembled with lighting fixtures connected to only some of the female sockets to provide both temporary lighting and access to electricity for other electrical devices such as tools. Furthermore, the fasteners described herein provide a mechanism to hold the various components together so they do not become inadvertently disconnected causing a sudden and unexpected loss of power that is potentially both inconvenient and dangerous.

Figure 22:
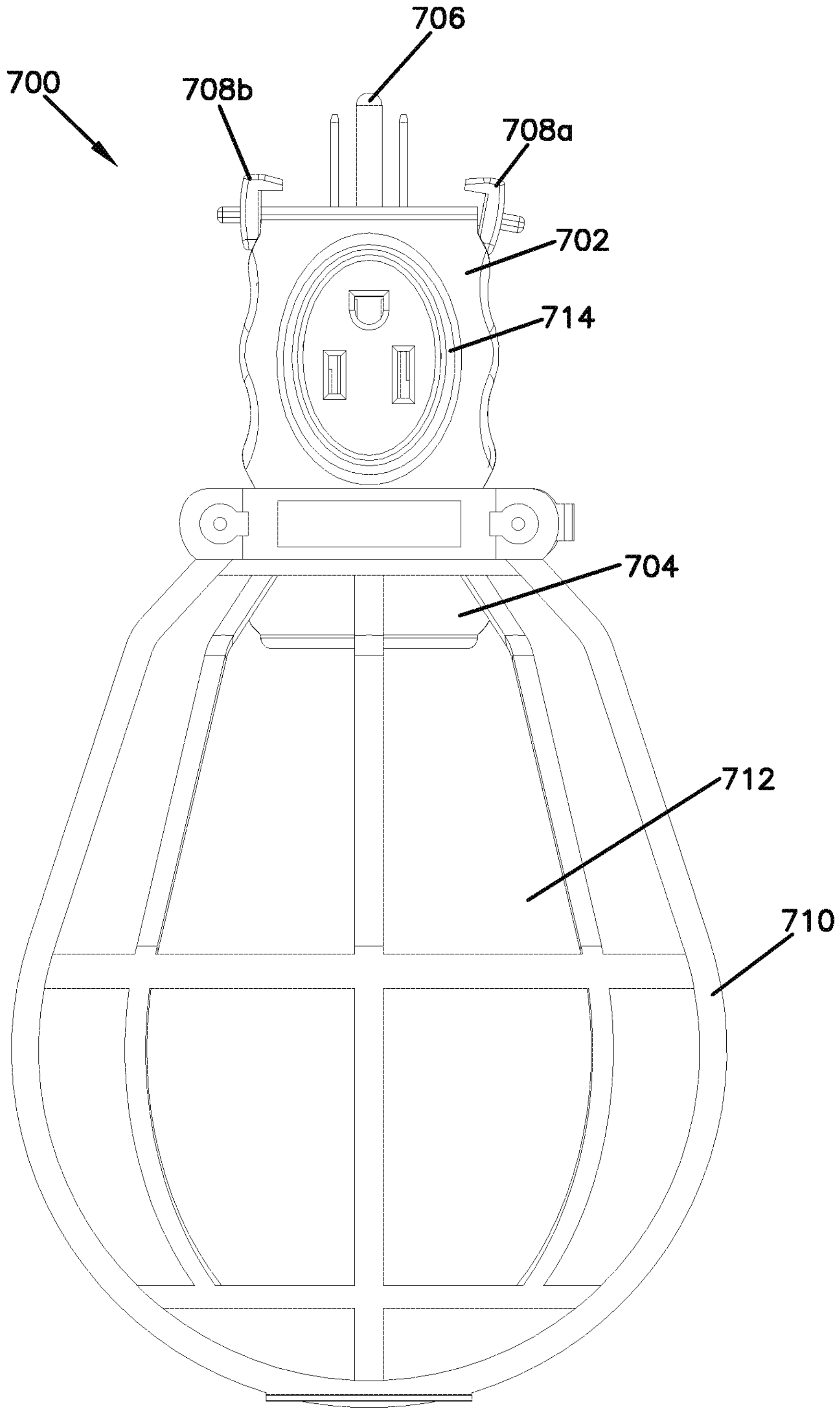
FIG. 22 is a view of a temporary lighting fixture having a fastener to secure the fixture to a female socket.

Referring now to FIG. 22, a temporary lighting fixture 700 includes a housing 702, a light-bulb socket 704, a male electrical plug 706 and fasteners 708*a* and 708*b*. The light-bulb socket 704 is positioned in the housing 702. The male electrical plug 706 is in electrical communication with the light-bulb socket 704. The fasteners 708*a* and 708*b* are operatively connected to the housing 702 and the fastener 708 is adapted to secure the housing 702 to a female socket on an extension cord, electrical adapter, or other electrical device. The fasteners 708*a* and 708*b* have substantially similar structure as the fastener 608 discussed in more detail herein and is configured to mate with an engaging structure similar to the engaging structure 639 also described in more detail herein.

The temporary lighting fixture 700 also includes a protective cover 710. The protective cover 710 is operatively connected to the housing 702. In addition, the protective cover 710 defines a void 712 for receiving a light-bulb (not shown) to be connected to the light-bulb socket 704. In one possible embodiment, the protective cover 710 has a basket or lattice structure. In other possible embodiments, the protective cover 710 is a translucent plastic or glass enclosure.

In the exemplary embodiment, the temporary lighting fixture 700 also includes a female electrical socket 714 which is positioned in the housing 702 and in electrical communication with the male electrical plug 706. The female electrical socket 714 also includes an engaging structure (not shown) to mate with a fastener on an extension cord, power cord, or electrical device. The engaging structure is similar to engaging structure 639 described herein, and the fastener is similar to the fastener 608 described herein.

Figure 23A:
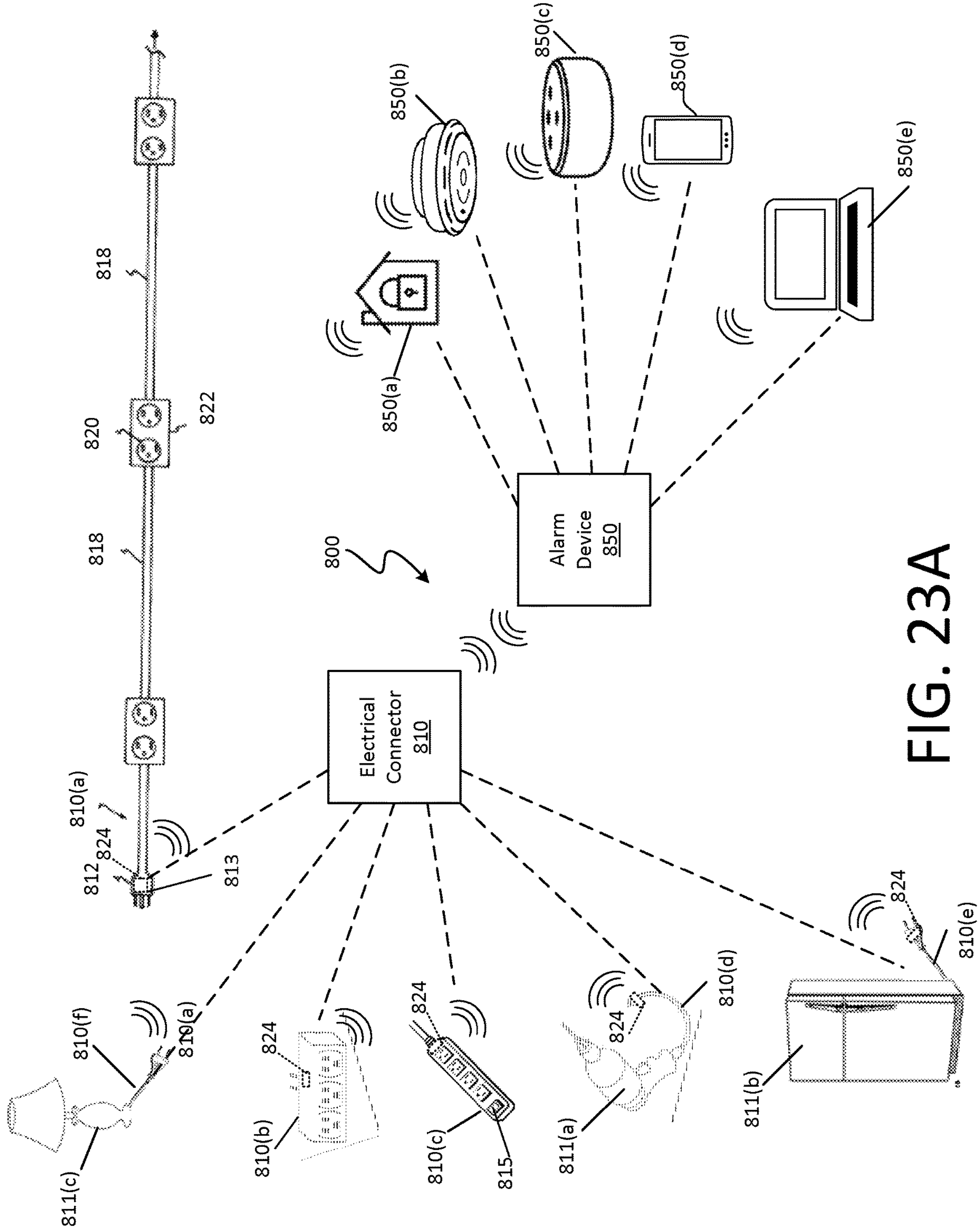
FIGS. 23A-23C are example configurations of an electrical connector warning system, in which various aspects of the present disclosure can be implemented.

FIG. 23A illustrates an exemplary embodiment of an electrical connector warning system 800 that includes an electrical connector 810 that is in direct or facilitated communication with an alarm device 850. The electrical connector 810 comprises an intermediary device that supplies power from an existing electrical outlet to a device requiring electricity/power to perform a task. The electrical connector 810 can be configured for an industrial (e.g., non-residential) or residential application.

In exemplary embodiments, the electrical connector 810 includes a male plug, which is removably insertable into an electrical outlet, and an electrical cord length providing one or more female receptacles or outlets into which another male plug can be inserted. An example of such an electrical connector 810 is an extension cord 810(*a*). The extension cord 810(*a*) includes a male plug 812 within a housing 813 connected by conducting wires within a sheathing 818 to one or more socket blocks 822 that include one or more female sockets 820. Other examples of this type of electrical connector 810 include an adapter 810(*b*), and a power strip 810(*c*).

In other embodiments the electrical connector 810 includes a male plug, which is removably insertable into an electrical outlet, and an electrical cord length that is fixedly or removably coupled to an electrical device, sometimes referred to as a "pigtail." Examples of this type of electrical connector include electrical connector 810(*d*) coupled to electrical device 811(*a*), a drill; electrical connector 810(*e*) coupled to electrical device 811(*b*), a refrigerator; electrical connector 810(*f*) coupled to an electrical device 811(*c*), and a lamp. The electrical connector 810(*d*) also can be connected to a charging station for electric vehicles. In various embodiments, the electrical connector 810 can be a power cord, extension cord, or electrical adapter for delivering two-phase electric power or three-phase electric power. Additionally, the electrical connector 810 can be rated for caring different levels of electrical current, or different voltage ratings such as 120 V or 240 V.

Each of the electrical connectors 810 is equipped with a control system 824 enabling communication with the alarm device 850. An advantage of the electrical connector 810 meaning communication with a separate alarm device 850 is that the alarm device can record and track data such as alerts, alarms, notifications, and meter readings. Another advantage is that a separate alarm device 850 can maintain alarms, alerts, notifications, and meter readings even if power to the electrical connector 810 is interrupted.

The control system 824 is sized to be contained within the housing or sheathing of the electrical connector 810. In exemplary embodiments, either the entire control system 824 or portions of the control system 824 are placed in or proximate the male plug (e.g., within the housing 813 of the extension electrical connector 810(*a*)), or near a location within the electrical connector that is most likely to experience wear such as the ends of a sheathing that bend or fray as movement of the electrical connector occurs, adjacent to or spanning the transition from the housing to the cord, within a housing for female sockets, or within or near any other portion that may experience high temperature. For example, one or more temperature sensors can be placed at locations that are the most susceptible to high temperature conditions and the rest of the control system 824 can be conveniently located within the housing as packaging permits. In exemplary embodiments, wherein the electrical connector 810 presents its own electrical outlets (e.g., outlets 822), the control system 824 can be placed proximate the electrical outlets.

In exemplary embodiments, more than one control system 824 is provided within each electrical connector 810. The control system 824 that can provide one or more of temperature monitoring functionality, energy metering functionality, local or remote ON/OFF functionality and communications functionality in cooperation with the alarm device 850. For example, there could be a control system 824 in or near the housing for the male connector of an extension cord and a control system 824 in or near each of the female housings of the extension cord.

In yet other embodiments, the electrical connector can have multiple sensors, with sensors in different positions along the length of the connector. For example, there could be a temperature sensor positioned in the housing for male plugs, and other sensors can be positioned in the housings for one or more for a female receptacles. In other embodiments, the temperature sensor can be placed at locations between housings for male plugs and female receptacles, or between housing for female receptacles.

The alarm device 850 receives transmitted communications from one or more of the electrical connectors 810. In exemplary embodiments, the alarm device 850 is capable of bi-directional communication with the electrical connector 810 while in other embodiments the alarm device 850 only receives communications from the electrical connector 810. The alarm device 850 delivers an alarm responsive to a communication indicating an alarm state at the electrical connector 810. An alarm state occurs at the electrical connector 810 when a temperature sensor of the control system 824 detects an instance of meeting and/or exceeding a predetermined temperature threshold. In exemplary embodiments, the alarm device 850 delivers a visual alarm (e.g., display warning text or a warning graphic), an audible alarm (e.g. deliver a sound warning through a speaker), and/or a tangible alarm (e.g., deliver a haptic effect warning through a housing); other alarm types are also possible.

The alarm device 850 can comprise an industrial (e.g., non-residential) or residential configured device. For example, the alarm device 850 can comprises one or more of a residential or non-residential monitoring system 850(*a*); a smoke detector 850(*b*); a voice-activated smart personal assistant 850(*c*) such as an Echo Dot, Google Home, or Apple HomePod; a smart phone 850(*d*); and a computing device 850(*e*) such as a tablet, laptop, or desktop. Any other device capable of receiving a communication (wired or wireless, directly or indirectly) from an electrical connector 810 and delivering an alarm in one form or another also can be used as an alarm device 850.

In exemplary embodiments, the alarm issues immediately from the alarm device 850 responsive to receipt of the communication representative of an alarm state. A delay of a pre-determined amount of time can be built into the response by the alarm device 850 providing a user an opportunity to disable the electrical connector 810 or attend to the issue occurring at the electrical connector 810. For example, the control circuit 824 might generate a non-alarm notification alerting a user to a rising temperature or other potential alarm situation enabling the user to take action before an is actually generated. Examples of a non-alarm notification might include a message on a smartphone to table, a soft or low-volume audible notification, or illuminating an LED or lamp.

In exemplary embodiments, the electrical device 810 is configured to provide more than one alarm state indicator. For example, a first alarm state, based on a first temperature threshold, can indicate a warning level with the alarm device 850 delivering a first type of warning and a second alarm state, based on a second temperature threshold, can indicate a critical level with the alarm device 850 delivering a second type of warning.

In exemplary embodiments, the electrical connector 810 is configured to automatically turn OFF (e.g., open the circuit delivering power) in response to an alarm state occurring. In other embodiments, the electrical connector 810 continues operation while in an alarm state and awaits a manual turn OFF or an instruction to turn OFF.

In exemplary embodiments, the electrical connector 810 itself includes one or more indicators, such as light emitting diode 815, to indicate one or more alarm states occurring within the electrical connector. The electrical connector 810 can include an indicator, such as a light emitting diode, to indicate that that it is in communication with the alarm device and/or a monitoring system. In exemplary embodiments, the electrical connector 810 includes one or more indicators, such as a light emitting diode, to indicate that that electrical connector is turned ON (e.g., one or more circuits in the electrical connector are closed enabling current to flow). The electrical connector can include other types of indicators in place of or in addition to or in place of a light emitting diode. Examples include audible alarms such as speakers or buzzers, haptic transducers, or other suitable indicators.

FIG. 23A illustrates a configuration of the electrical connector warning system 800 where the electrical connector 810 is in direct communication with the alarm device 850 (e.g., a signal transmitted from the electrical connector is received directly at the alarm device 850 without interventional devices using a communication technology such as (WiFi, Bluetooth, radio, Zigbee, NFC (Near Field Communication), Z-Wave, Insteon, or Thread).

Figure 23B:
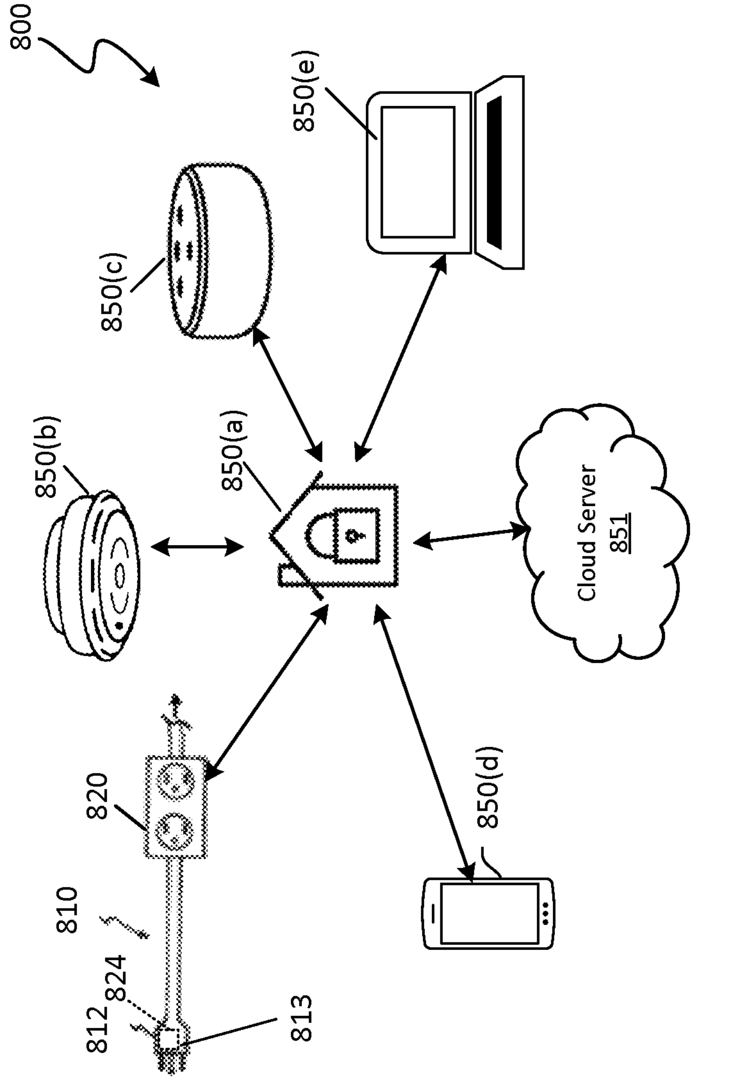

FIG. 23B illustrates a configuration of the electrical connector warning system 800, where communications from the electrical connector 810 are transmitted via the monitoring system 850(*a*) out to alarm devices 850 (e.g., 850(*b*), 850(*c*), 850(*d*) and 850(*e*)) that are communicatively coupled to the monitoring system 850 via a wired or wireless network. In such a configuration, the monitoring system 850(*a*) is on-premises and can, itself, deliver an alarm or direct one or more of the other of the alarm devices 850 to deliver an alarm. In example embodiments, the monitoring system 850(*a*) includes a processor that hosts a monitoring application while in other embodiments the monitoring application is hosted on a remote server, e.g., a cloud server 851. In example embodiments, each alarm device 850 executes an application to communicate with the electrical connector 810 and to deliver an alarm.

Figure 23C:
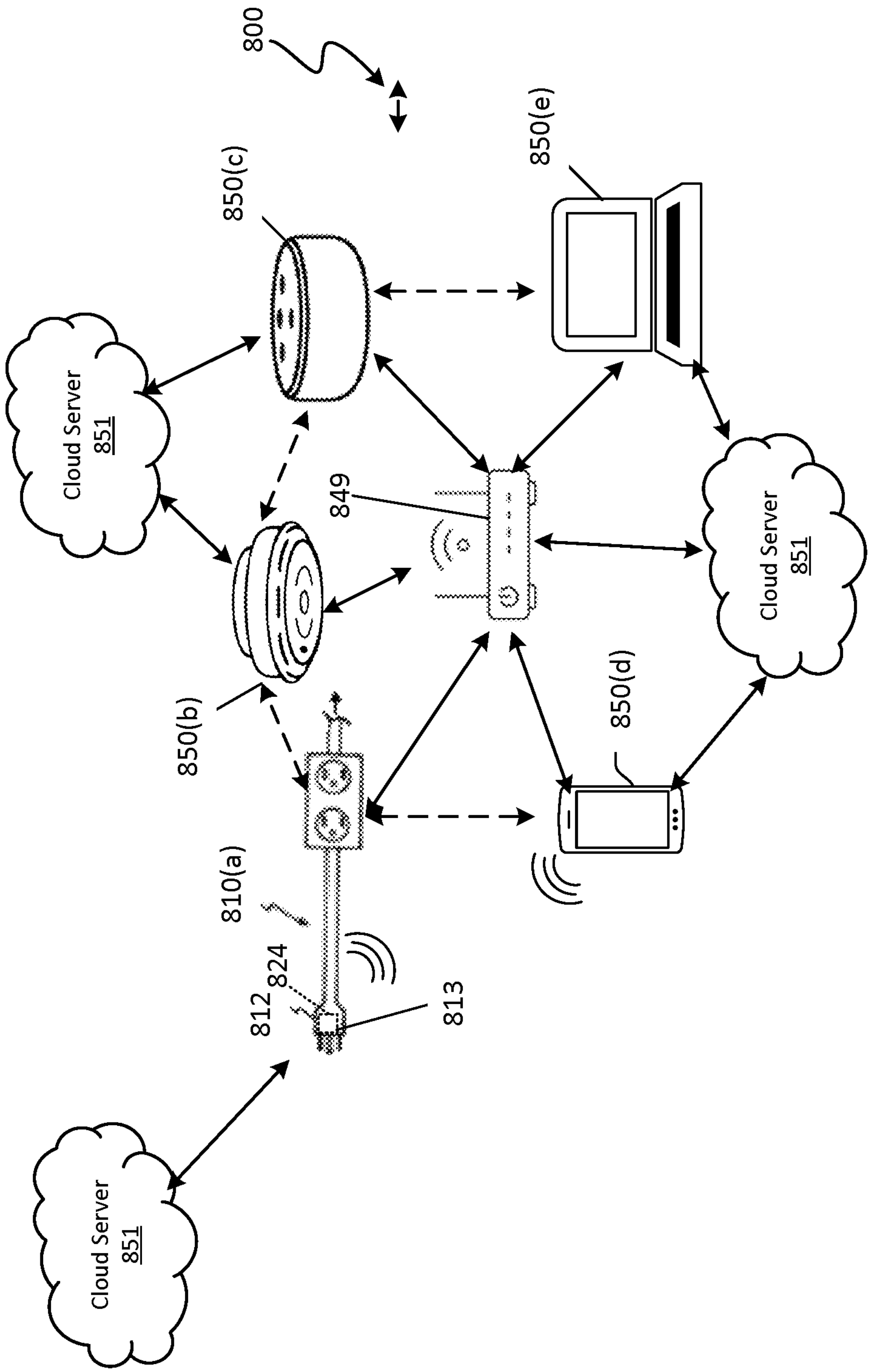

FIG. 23C illustrates a configuration of the electrical connector warning system 800 wherein the monitoring system 850(*a*) (or an application dedicated to interfacing with the electrical connectors 810) is executed at a cloud server 851 and accessed by each of the alarm devices 810 individually. The configuration of FIG. 23C further illustrates that communications can occur via the Internet between the cloud-based application and a local area network (LAN). In exemplary embodiments, the LAN utilizes a router 849 to direct wired or wireless communications to one or more of the various alarm devices 850 within the LAN. FIG. 23C illustrates embodiments in which it is also possible for the various alarm devices 850 to communicate directly with one another; communicate through the LAN; communicate through the cloud; or communicate via a central server, which could be local or in the cloud.

The communication configurations described in FIGS. 23A-23C can be used combination with each other or with other known communication technologies enabling wired or wireless communications between an electrical connector 810 and an alarm device 850.

Figure 24:
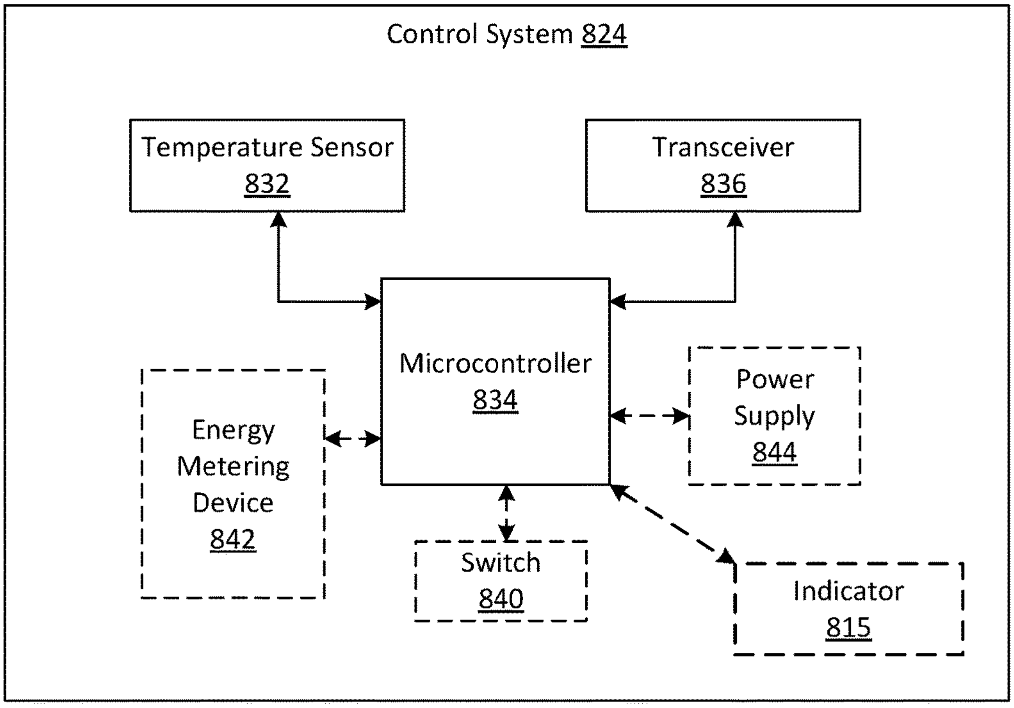
FIG. 24 is simplified block diagram of an exemplary control system of an electrical connector.

FIG. 24 provides a simplified schematic of the control system 824 of the electrical connector 810. As shown, the control system 824 includes a temperature monitoring system comprising one or more temperature sensors 832, a microcontroller 834, and a wireless transceiver 836. One or more switches 840 as well as one or more energy metering devices 842 can be included in the control system 824. Further, an independent power supply 844 can be included in the control system 824.

Each temperature sensor 832 senses the temperature of the electrical connector 810 at the location of the sensor 832 within the electrical connector 810 or senses the temperature of a specific one of the conducting circuits of the electrical connector 810 by being placed in series in the conducting circuit. In alternative embodiments, the temperature sensor can be electrically parallel to the circuit, or be in a circuit other than the main circuit for distributing power. In exemplary embodiments, the temperature sensor 832 is placed proximate the male plug 812 or in other locations within the electrical connector where bending, fraying or breaking of the electrical connector can occur (e.g., a probable failure point). The temperature sensor 832 can comprise a passive component, such as a resistance temperature detector or a thermistor (described herein with reference to FIGS. 10A-10D). Alternatively, the temperature sensor 832 can comprise an active component, such as a temperature sensing integrated circuit (IC). Power supplied to the electrical connector 810, via an electrical outlet, powers the temperature sensing IC. A passive temperature sensor 832 produces an analog output that is conditioned and converted to a digital output for use by the microcontroller 834 while an active temperature sensor 832 generates a digital output. In alternative embodiments, the analog signal from the output is input to the alarm indicator 815 without being converted to a digital signal. In exemplary embodiments, the temperature sensor 832 produces an output that is representative of a temperature value that changes in accordance with the operating conditions of the electrical connector 810 and supplies that output to the microcontroller 834. In alternative embodiments, the temperature sensor 832 produces an output signal, that does not correspond to a specific temperature but, rather, is representative of meeting and/or exceeding a predetermined temperature threshold.

Figure 25:
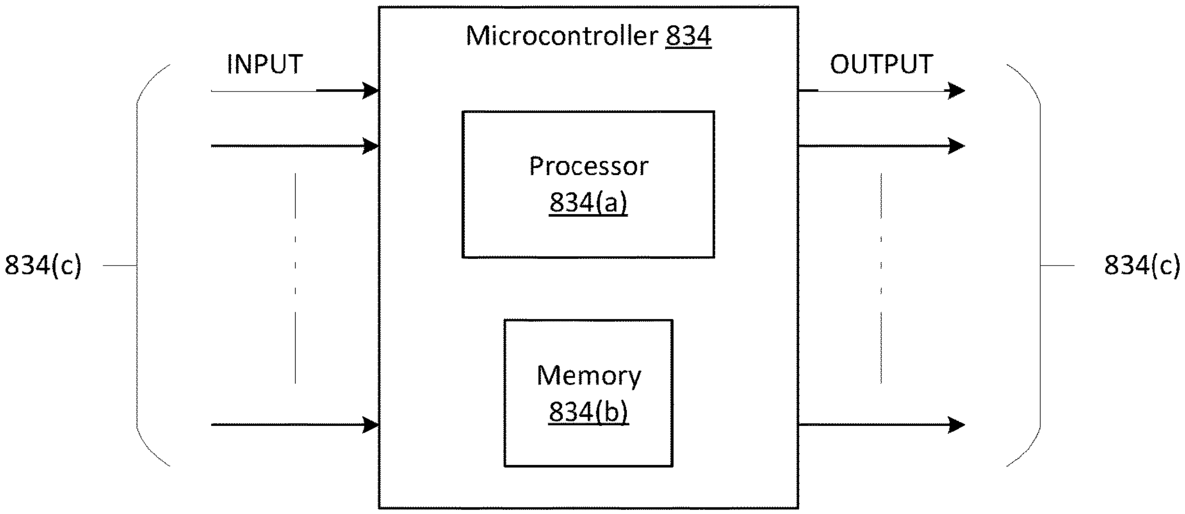
FIG. 25 is a simplified block diagram of a microcontroller of the control system of FIG. 24.

FIG. 25 is an exemplary schematic of the microcontroller 834. As shown, the microcontroller 834 generally includes a processor 834(*a*), a memory 834(*b*), and one or more inputs/outputs 834(*c*) to interface with the temperature sensor 832 and wireless transceiver 836 as well as the one or more switches 840, energy metering devices 842 and indicators 815. The memory 834(*b*) generally includes non-volatile program memory storing instructions for execution by the microcontroller 834 as well as data memory for temporary data storage while the instructions are executed. Other types of memory can also be included. Additional components, for example, an analog-to-digital converter to convert outputs from a passive temperature sensor 832, can also be included in the microcontroller 834. The microcontroller 834 can be embodied in stand-alone IC or combined in an IC with one or both of the temperature sensor 832 and transceiver 836. Power supplied to the electrical connector 810, via an electrical outlet, can power the one or more ICs. In exemplary embodiments, the microcontroller 834 receives input from a one or more temperature sensors 832 with each of the plurality of temperature sensors 832 sensing the temperature of a different location in the electrical connector 810, sensing the temperature of a specific conducting circuit within the electrical connector 810, or sensing the temperature at any other suitable location in the electrical connector 810. The temperature sensors 832 also can indicate that a temperature is approaching a temperature threshold, has met a temperature threshold, or exceeded a temperature threshold. Additionally, two or more temperature sensors can be positioned in the same location or in different locations.

The transceiver 836 receives instructions from the microcontroller 834 to transmit a communication containing the sensed temperature(s) or indication of meeting a temperature threshold to a transceiver 862 (see, e.g., FIG. 27) in the alarm device 850. The communication can be transmitted via any suitable wireless communication protocol such as WiFi, Bluetooth, radio, Zigbee, NFC (Near Field Communication), Z-Wave, Insteon, or Thread. The transceiver 836 can be embodied as a stand-alone IC or combined in an IC with one or both of the temperature sensor 832 and the microcontroller 834. Power supplied to the electrical connector 810, via an electrical outlet, powers the one or more ICs. Use of the transceiver 836 enables bi-directional communication between the electrical connector 810 and alarm device 850. In exemplary embodiments, a transmitter enabling only one-way communication from the electrical connector 810 to the alarm device 850 is used in place of the bi-directional transceiver 836.

Figure 26A:
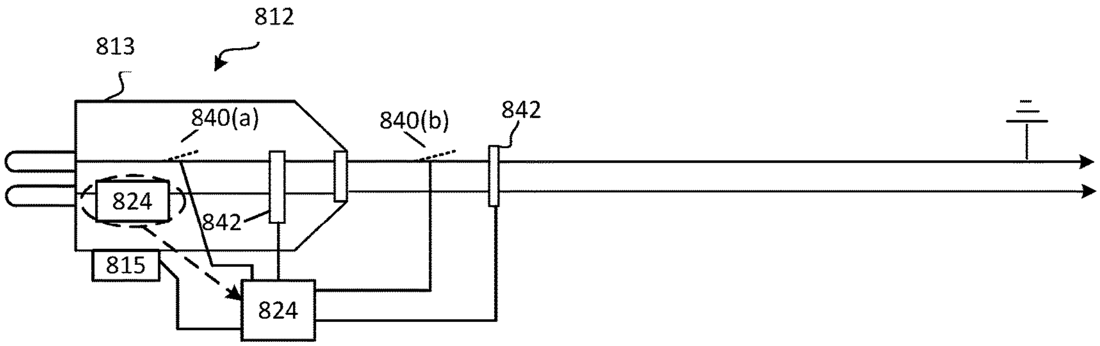
FIGS. 26A-26B are schematic views of an extension cord electrical connector having one or more switches that are controllable to activate/deactivate the extension cord.

FIG. 26A illustrates an exemplary embodiment of the electrical connector 810 in the form of a single circuit extension cord 810(*a*). The extension cord 810(*a*) includes one or more switches 840, e.g., 840(*a*) and 840(*b*), that can be included in the control system 824. The one or more switches 840 are remotely activated ON/deactivated OFF upon instruction from the alarm device 850 received at the microcontroller 834. The one or more switches can be manually activated at the extension cord 810(*a*). The one or more switches 840 can be an alternative to, or in addition to, the ground fault circuit interrupters 30 described herein. Each of the switches 840 generally comprises a normally closed switch that enables the flow of current through the switch 840 but, upon instruction, opens to prevent the flow of current. Each of the switches 840 can be responsive to instruction from the microcontroller 834 (as directed by the alarm device 850) to remain closed or to open and interrupt operation of the circuit. One or more indicators 815, such as a light emitting diode, can be included in the control system 824.

In other example embodiments, the switches can be any suitable type of switch. Examples include manual or momentary switches, single pole single throw switches (SPST), single pole double throw switches (SPDT), other combinations of multipole or multi-throw switches, normally open switches, and normally closed switches. However, any suitable type of switch can be used.

Figure 26B:
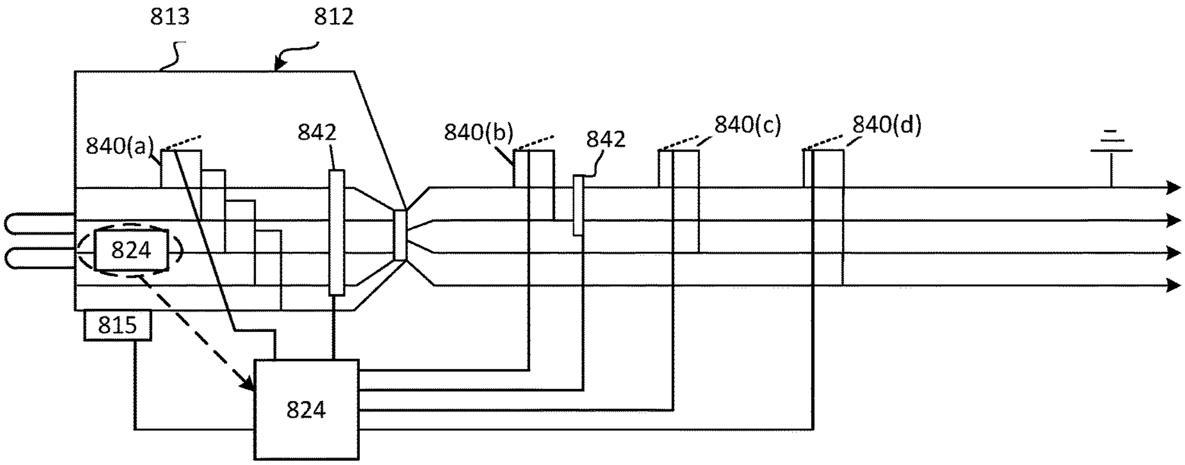

FIG. 26B illustrates an exemplary embodiment of the electrical connector 810 in the form of a multi-circuit extension cord 810(*a*) that additionally includes one or more switches 840, e.g., 840(*a*)-840(*d*) that can be included in the control system 824. The one or more switches 840 are manually activated/deactivated or remotely activated ON/deactivated OFF upon instruction from the alarm device 850 received at the microcontroller 834 of the extension cord 810(*a*). The one or more switches 840 which may be an alternative to, or in addition to, the ground fault circuit interrupters 30 described herein. Each of the switches 840 generally comprises a normally closed switch that enables the flow of current through the switch 840 but, upon instruction, opens to prevent the flow of current. In certain example embodiments, a single switch 840(*a*) is provided in the housing 13 and controls the flow of current to all circuits receiving power via the male plug 812. In certain example embodiments, as an addition to, or an alternative to, the switch 840(*a*), a switch, e.g., switches 840(*b*), (*c*) and (*d*), is provided within each circuit between one or more female sockets 16, dependent upon the configuration of the electrical connector 810. Each of the switches 840 is responsive to instruction from the microcontroller 834 (as directed by the alarm device 850) to remain closed or to open and interrupt operation of the one or more circuits. In exemplary embodiments, each switch 840 is individually controllable while in other embodiments all or a portion of switches 840 are controlled as a unit. One or more indicators 815, such as a light emitting diode, can be included in the control system 824. For example, there could be one or more light emitting diode for the entire electrical connector; one or more light emitting diode for each circuit in an electrical connector; one or more light emitting diodes for each housing (e.g., male plugs and female receptacles) on the electrical connector; two or more light emitting diodes wherein each of the two or more light emitting diodes communicate different information; or any other suitable combination of configuration of light emitting diodes for communicating information to a user.

In exemplary embodiments, as illustrated in FIGS. 26A-26B and 24, the electrical connector 810 additionally includes an energy metering device 842. The energy metering device 842 can comprise an energy metering circuit, which can include an energy metering integrated circuit (IC), to measure the energy consumed via the electrical connector 810. In example embodiments, the energy metering device 842 includes a shunt electrically connected to and arranged electrically parallel to the conductor being measured; a current transformer extending around the conductor being measured; or combinations thereof. The current transformer can be a Rogowski coil.

The energy can be measured, for example, in kilowatt hours—kWh, or other appropriate unit of measurement. The output of the energy metering IC is representative of the energy consumed and is supplied to the microcontroller 834 for transmission, via the transceiver 836, to the alarm device 850. The energy metering IC can be embodied as a stand-alone IC or combined in an IC with one or more of the temperature sensor 832, the microcontroller 834, the transceiver 836 and the switch 840. Power supplied to the electrical connector 810, via an electrical outlet into which the male plug 812 is inserted, powers the one or more ICs.

In example embodiments, the energy metering device 842 is positioned in the male head and arranged to measure the total energy that flows through the electrical connector 810. If the electrical connector 810 has multiple circuits the energy metering device 842 can be arranged to measure the total energy flowing through all of the circuits, or just the energy through one of the individual circuits, or through the energy of a combination of individual circuits. In another example, energy metering circuit 842 can be positioned in the housing for a female receptacle and arranged to measure the energy flowing through an individual female receptacle in the housing or the total energy flowing through all of the receptacles in the housing. The electrical connector 810 can include more than one energy metering device 842. For example, the electrical connector 810 can include an energy metering device 842 for each distinct circuit within the electrical connector 810, an energy metering device 842 in each of the housings for female receptacles, or in both the housing for the male plug and the housings for the female receptacles.

Energy metering devices 842 employing technology other than that of the energy metering IC also may be used. For example, the energy metering device 842 can include a power meter to measure current power consumption, or an ammeter to measure current flow. Power can be measured in Watts or other appropriate unit of measure.

In exemplary embodiments, the control system 824 can include an independent power supply 844 to power some or all of the components of the control system 824 apart from the power supplied to the electrical connector 810 via an electrical outlet. A battery is an example of such an independent power supply. In exemplary embodiments, the independent power supply 844 powering the components of the control system 824 enables temperature and energy consumption monitoring to continue at the electrical connector 810 even when the electrical connector 810 is unplugged from an electrical outlet or the circuits have been electrically opened to stop the flow electricity. The independent power supply 844 additionally can enable data transmission of the monitored temperature and energy consumption data to remote devices such as the alarm device 850 and enables monitored temperature and energy consumption to be stored in the memory 834(*b*) of the microcontroller 834. In other example embodiments, the control system is electrically connected to the circuit between the male plug and the switch 840 so that it continues to operate even when power to the circuits has been disconnected.

In exemplary embodiments, the control system 824 can include one or more indicators 815 that can be used to indicate an alarm state of the electrical device 810, to indicate a current temperature of the electrical device 810, to indicate an ON/OFF status of the electrical device 810 and/or to indicate that a communication has been established/not established with an alarm device 850. The indicator 815 can comprise, for example, a light emitting diode or other light-based device, having one or more colors to indicate a status. Other embodiments have two or more light emitting diodes, each with a different color. Or the control system 824 can be configured to cause the light emitting diode to flash in a patter indicative of determined information. This arrangement enables embodiments in which an alarm is maintained even when the power to the female receptacles is interrupted.

Figure 27:
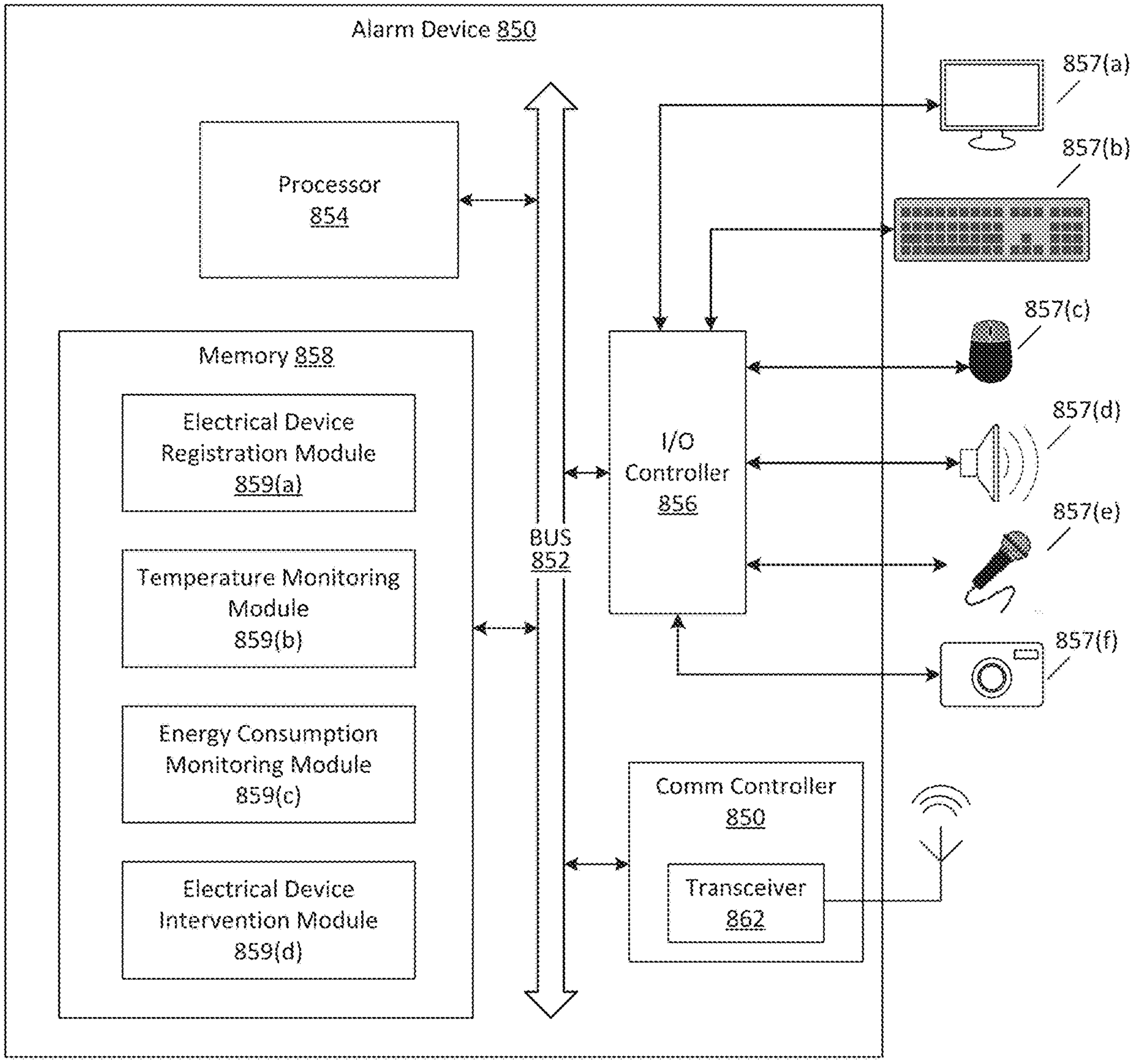
FIG. 27 is a simplified block diagram of an alarm device that communicates with an electrical connector.

FIG. 27 is an exemplary schematic of an alarm device 850 that can remotely access and communicate with the electrical connector 850. As noted herein, examples of alarm devices 810 include residential or non-residential monitoring systems 850(*a*); smoke detectors 850(*b*); voice-activated smart personal assistants 850(*c*) such as an Echo Dot, Google Home, or Apple HomePod; smart phones 850(*d*); and computing devices 850(*e*) such as a tablet, laptop, or desktop. Any other device capable of receiving a communication (wired or wireless, directly or indirectly) from an electrical connector 810 and delivering an alarm in one form or another can also be used as an alarm device 850. As shown, the alarm device 850 generally comprises a bus 852, a processor 854, an input/output (I/O) controller 856, a memory 858 and a communication controller 860.

The bus 852 includes conductors or transmission lines that provide a path to transfer data between the components in the alarm device 850 including the processor 854, input/output controller 856 and memory 858. The bus 852 typically comprises a control bus, address bus, and data bus. However, the bus 852 can be any bus or combination of busses suitable to transfer data between components in the alarm device 850.

The processor 854 can be any circuit that processes information and can include any suitable digital or analog circuit. The processor 854 can also include a programmable circuit that executes instructions. Examples of programmable circuits include microprocessors, microcontrollers, application specific integrated circuits (ASICs), programmable gate arrays, field programmable gate arrays, or any other processor or hardware suitable for executing instructions. The processor 854 can comprise a single unit or a combination of two or more units (which can be located in the same location or different locations).

The I/O controller 856 comprises circuitry that monitors operation of the processor 854 and peripheral or external devices such as a display 857(*a*), keyboard 857(*b*), mouse 857(*c*), speaker 857(*d*), microphone 857(*e*), or camera 857(*f*). The I/Q controller 856 also can monitor a push button that can be used to pair electrical connector 810 with other devices as discussed in more detail herein. Other peripheral or external device are also possible. The I/O controller 856 also manages data flow between the alarm device 850 and the peripheral devices, and frees the processor 854 from monitoring and controlling the peripheral devices.

The memory 858 generally includes non-volatile, non-transitory program memory storing instructions for execution by the processor 854 as well as volatile data memory for temporary data storage while the instructions are executed. Examples of types of memory that can be included in the memory 858 include random access memory (RAM), read only memory (ROM), electrically erasable programmable read only memory (EPROM), flash memory, magnetic memory, optical memory, or another suitable memory technology.

The memory 858 can store a number of program modules for execution by the processor 854, such as an electrical device registration module 859(*a*), a temperature monitoring module 859(*b*), an energy consumption monitoring module 859(*c*) and an electrical device intervention module 859(*d*). Each module is a collection of data, routines, objects, calls and other instructions that perform one or more particular tasks. In exemplary embodiments, the modules are combined into a stand-alone application while in other embodiments the modules are combined into an existing application such as a home security application, a utility monitoring application or a smart home system controlling one or more electrical appliances in the home; other existing applications are also possible.

In at least some example embodiments, the electrical device registration module 859(*a*) generally facilitates associating a specific electrical connector 810 with a specific user account thereby enabling various operating functions and statuses of the electrical connector 810 to be monitored and/or controlled by the alarm device 850. In other example embodiments, the electrical device registration module 859(*a*) facilitates peer-to-peer communication between the electrical connector 810 and other electrical connectors or other devices. The peer-to-peer communication can be directly between the electrical connector 810 and the other device or through an intermediate device such as a network router. In other embodiments, the electrical device registration facilitates both registration with a user account in the cloud and registration with another device for peer-to-peer communication.

The temperature monitoring module 859(*b*) generally operates on temperature data received from the various temperature sensors 832 of the electrical connector 810 by continually assessing the temperature data against one or more threshold temperatures; each threshold temperature indicating a different operating status of the electrical connector 810. In exemplary embodiments, the temperature sensors 832 provide a signal indicating that a predetermined temperature threshold has been met or exceeded rather than providing a signal representative of a specific temperature. The energy consumption module 859(*c*) generally operates on the energy consumption data provided by the energy metering IC 842 to maintain and provide current and historical energy consumed via the electrical connector 810. The electrical device intervention module 859(*d*) generally facilitates the ability of a user of the alarm device 850 to intervene in the operation of the electrical connector 810 by turning ON/OFF the electrical connector 810 or turning ON/OFF one or more specific circuits of the electrical connector 810.

The modules 859(*a*), (*b*), (*c*) and (*d*) operate in conjunction with one or more user interfaces, described further herein, that are displayed on the display device 857(*a*) of the alarm device 850. It should be noted that, although certain modules are disclosed herein, the various instructions and tasks described herein can be performed by a single module, a different combination or modules, modules other than those disclosed here, or modules executed by a remote device (e.g., cloud computing device) that are in communication with the alarm device 850. A display device 857(*a*) is any suitable device for presenting information. Additionally, a display device 857(*a*) can be remote from the electrical connector 810, or integrated into the electrical connector 810 such as being mounted in or on a housing for a male plug or female receptacle. Examples of a display device 857(*a*) for displaying information visually include a smart phone, tablet, monitor for a computer, LCD screen, LEDs, and lamps.

The communication controller 860, which includes a transceiver 862, facilitates data communication between the transceiver 862 and the processor 854. The transceiver 862 receives instructions from the processor 854, via the communication controller 860, to transmit communications to the transceiver 836 of the electrical connector 810 and/or accepts communications from the transceiver 836 of the electrical connector 810. As noted herein, the communications between transceivers 862 and 836 can be transmitted via any suitable wired or wireless communication protocol.

As discussed herein, the electrical connector 810 can use any suitable protocol or communication standard for data communication. One example is Bluetooth. In a typical Bluetooth configuration, the electrical connector 810 typically is a slave, and the device with which it is paired (e.g., alarm device 850) is considered as a master. An advantage of this configuration is that the paired device can be in data communication with more than one electrical connector 810 or other Bluetooth devices. In other embodiments, however, the electrical connector 810 can be the master and of the paired device can be the slave. The Bluetooth pairing can be accomplished using any suitable method. For example, the pairing process can use a “Just Works” process in which the user presses a button on the electrical connector 810 to place it into a discovery mode and then a button on the alarm device 850 to complete the pairing process. In other embodiments, the parent process involves entering a PIN code into both the electrical connector 810 and the alarm device 850 to authenticate the devices and complete the paring. Additionally, in at least some embodiments, the paring between the electrical connector 810 and the paired device 850 is bonded so that the electrical connector 810 is automatically connected to the paired device each time the electrical connector 810 is connected to a power source. In at least some example embodiments, the paired device can form a part of a piconet. The electrical connector 810 can be paired to a variety of different devices such as an alarm device 850, router 849, or central controller such as a home alarm or automation controller.

In another example, the electrical connector 810 is connected or paired a device using Wi-Fi Direct or Wi-Fi Peer-to-Peer. An advantage of pairing devices using Wi-Fi Direct is that there typically is not a master/slave relationship. Accordingly, the electrical connector 810 can have a one-to-one or one-to-many relationship with paired devices. For example, the electrical connector 810 can be paired to or in data communication with several devices such as different alarm devices, alarm controllers, and routers. When using Wi-Fi Direct, the electrical connector 810 is paired with the alarm device 850 or other device such as a central alarm controller or router, using a push button or PIN process similar to the processed described herein.

In another example, the electrical connector 810 is connected to a device using a Z-Wave protocol. When using a Z-Wave protocol, the electrical connector 810 is a slave and is paired to a central Z-Wave controller in at least some embodiments. During the pairing or inclusion process, the Z-Wave controller assigns the electrical connector 810 a Home ID and a Node ID. The Home ID is the common identification for the Z-wave network; it belongs to the central control and is assigned to each node included in the network. The Home ID identifies each node, and each electrical connector 810 in the network will have a unique Node ID. In at least some example embodiments, upon inclusion of the electrical connector 810 into a Z-wave network, the electrical connector 810 becomes a node and can communicate with other nodes or devices in the network.

As noted herein, the electrical connector 810 can communicate with alarm devices 850 and other devices using any suitable protocol for data communication, including protocols other than Bluetooth, Wi-Fi Direct, and Z-Wave protocols.

Figure 28:
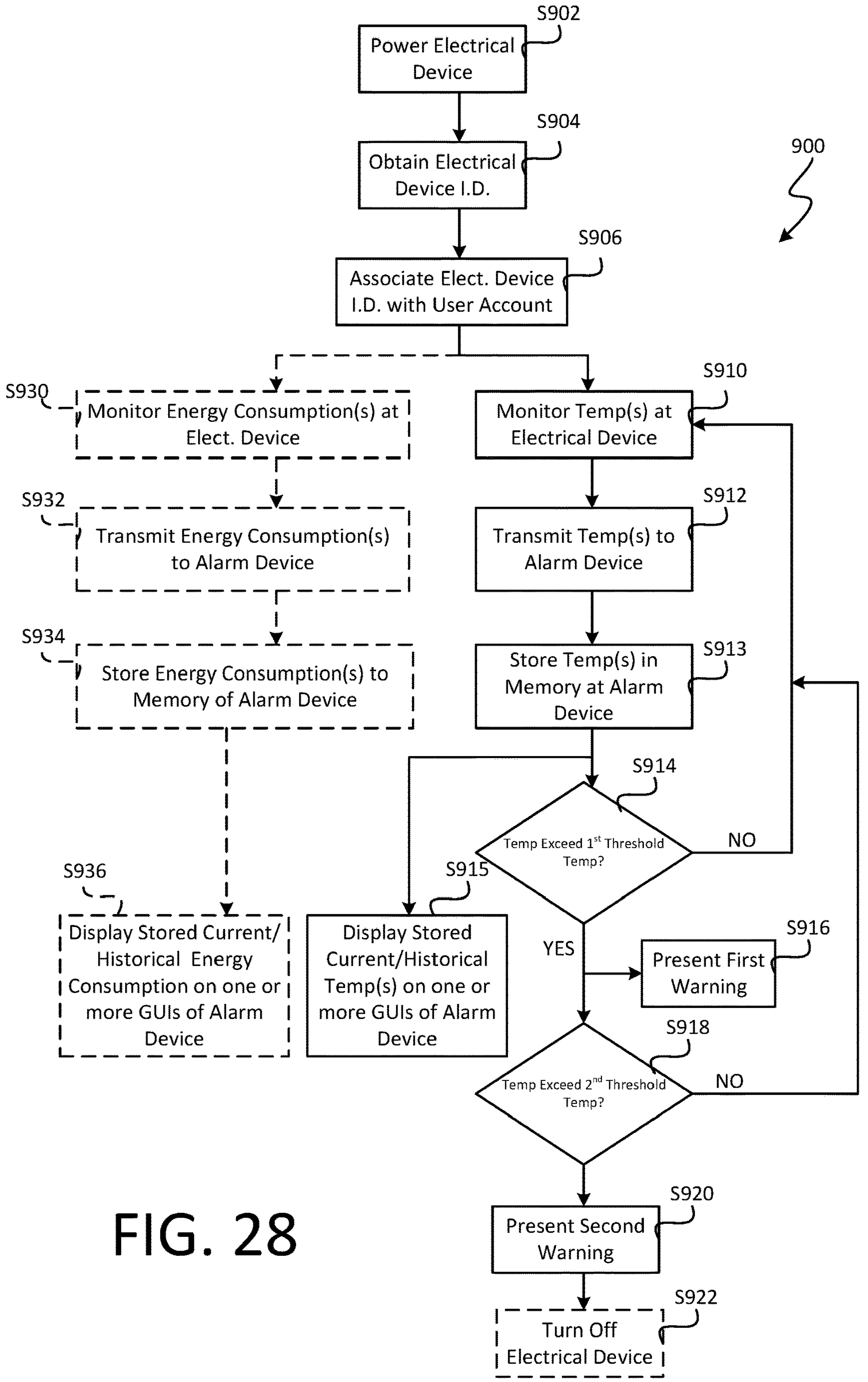
FIG. 28 is a flowchart illustrating an exemplary method for communication between an electrical connector and an alarm device.

Referring now to FIG. 28, a flowchart illustrates an example method 900 for delivering an alarm utilizing the electrical connector 810 and the alarm device 850. In this example, the electrical connector 810 and alarm device 850 are linked to a user account. The user creates an account to monitor alerts, alarms, notifications, meter readings, and other data generated by the electrical connector 810. The user account would then control distribution of information related to the data to the alarm device 850 or any other device that can track, record, or otherwise take an action based on the data. The user account can be hosted locally on a device such as a home server, central alarm controller, or home automation controller such as a Z-Wave controller. In another example, the account can be hosted by a commercial or central home monitoring service such as an alarm service to which users can subscribe.

The method 900 begins with the powering of the electrical connector 810, S902, via an electrical outlet. Once the electrical connector 810 is powered, a unique identification (I.D.) associated with the electrical connector 810 is obtained by the alarm device 850, S904. In exemplary embodiments, the unique I.D. of the electrical connector 810 is obtained from the microcontroller 834 of the electrical connector 810 responsive to receiving an instruction from the alarm device 850 to transmit the I.D. In other embodiments, the microcontroller 834 automatically begins transmitting its unique cord identifier upon power up until the microcontroller 834 receives notification that the unique cord identifier has been received at the alarm device 850. In other embodiments, the unique cord identifier is obtained by the alarm device 850 by scanning a code (e.g., a bar code or QR code) associated with the electrical connector 810 with the camera 857(*f*) or other internal or external device capable of communicating with the alarm device 850. Other manners of obtaining the unique cord identifier are also possible, such as manually entering the unique cord identifier into the alarm device 850.

Once the I.D. of the electrical connector 810 is received at the alarm device 850, the I.D. is stored in memory 858 and associated with a user account, S906, via execution of the electrical device registration module 859(*a*). Once associated with a user account, the electrical device registration module 859(*a*) further enables a user to associate a personalized identifier with the electrical connector 810, S908. In exemplary embodiments, the ability to add a personalized identifier is achieved through a graphical user interface (GUI) such as that depicted in FIG. 29. The various GUIs described herein can comprise a software interface or a web interface accessible via the Internet.

Figure 29:
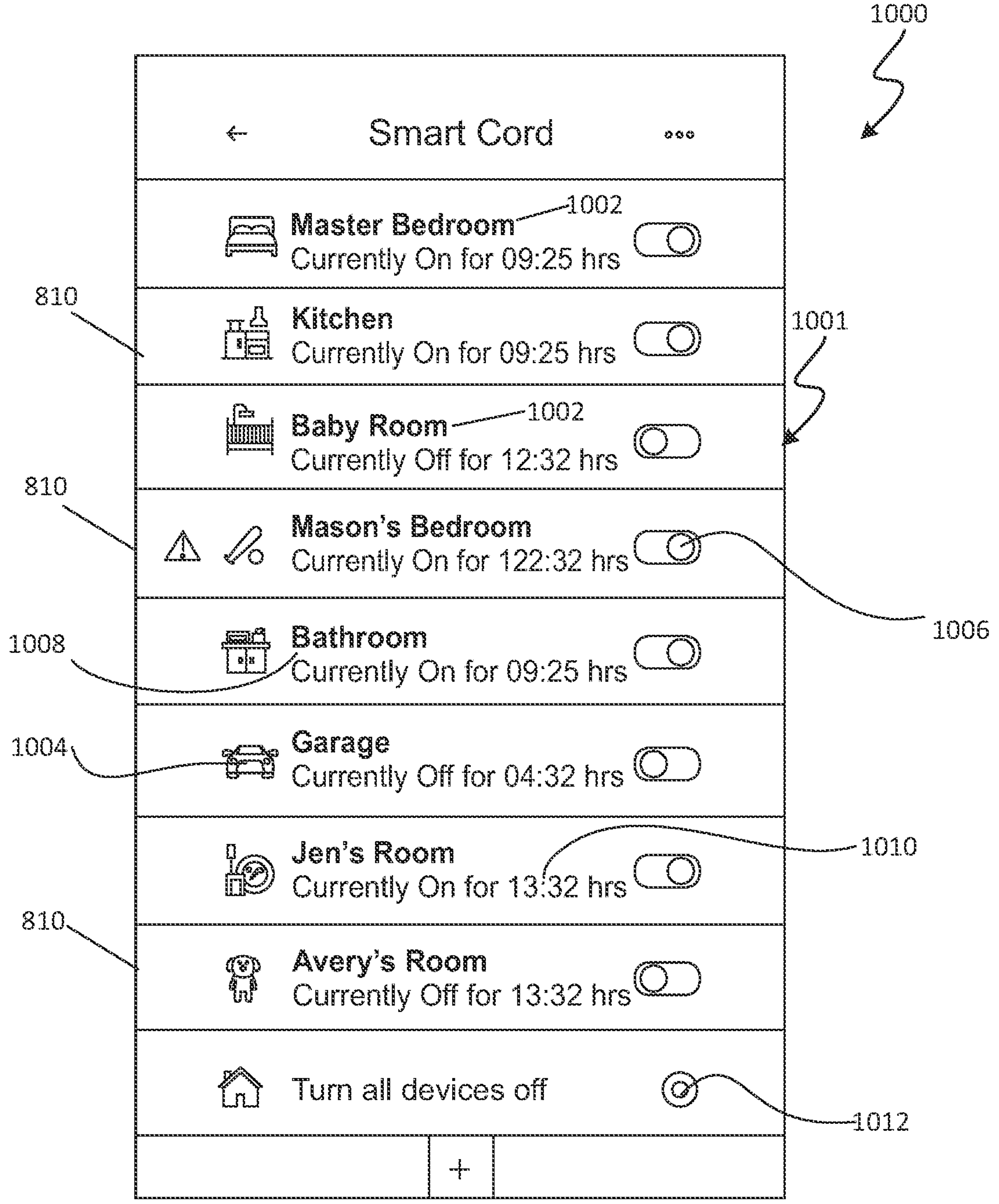
FIG. 29 is an example of a graphical user interface displayed on an alarm device which displays one or more parameters related to the electrical connector and which is usable to access, instruct, or control the electrical connector.

The GUI 1000 of FIG. 29 displays a listing 1001 of all electrical devices 810 associated with specific user account. In the user interface 1000, each of the electrical devices 810 is provided with a standard or personalized identifier 1002 such as “Master Bedroom,” “Kitchen,” and “Baby Room.” The personalized identifier 1002 may be manually typed in response to user selection of the respective electrical connector 810 from the GUI 1000 or the personalized identifier may be selected by the user from a pre-established list of identifiers displayed and offered to the user.

As shown, the personalized identifier 1002, may alternatively, or additionally, include an icon 1004 indicative of a location or other feature associated with the electrical connector 810. The listing 1001 of the electrical devices 810 additionally includes a selectable ON/OFF indicator 1006 for one or more of the electrical devices 810 to initiate and indicate an activated (ON, e.g., current is flowing through the electrical device 810 to a load and at least one switch 840 is closed) or deactivated (OFF, e.g., no current is flowing through the electrical device to a load and at least one switch 840 is open) status of the respective electrical connector 810. In exemplary embodiments, each circuit of a multi-circuit electrical connector 810 is listed in the listing 1001 of FIG. 29 (or a sub-listing of the listing 1001) enabling a user to turn ON and OFF a specific circuit rather than to turn ON or OFF an entire electrical connector 810.

In exemplary embodiments, the ON/OFF indicator 1006 may automatically indicate an ON status upon power being provided to the electrical connector 810 and drawn by a load or an OFF status upon power being removed from the electrical connector 810; an automatic OFF status can also be indicated if power is provided to the electrical connector but at least one switch 840 is open. The automatic ON/OFF status, which is representative of the operating status of the one or more switches 840 in the electrical connector 810 (presuming power is supplied to the electrical connector 810 via an electrical socket), is transmitted from the electrical connector 810 to the alarm device 850 automatically or by request of the alarm device 850. In exemplary embodiments, the listing 1001 additionally displays a text indicator 1008 of the words “ON” or “OFF” to indicate an activated or deactivated state of the respective electrical connector 810 and/or an energy consumption indicator 1010 to indicate the amount of energy being drawn through each of the respective electrical devices 810.

The GUI 1000 can additionally include an all-device OFF user interface element 1012, which upon selection turns OFF all electrical devices 810 associated with a specific user account. Turning OFF one or more circuits and/or one or more electrical devices 810 as indicated by the GUI 1000 is achieved by the processor 854 receiving the OFF instruction, via the user interface GUI 1000, and transmitting the OFF instruction to the electrical connector 810. The microcontroller 834 of the electrical connector 810 receives the OFF instruction, wherein the microcontroller 834 correspondingly directs one or more of the switches 840 to open.

Returning to the flowchart of FIG. 28, once the electrical connector 810 has been supplied power and has been associated with a user account at the alarm device 850, the one or more temperature sensors 832 of the electrical connector 810 operate to monitor their respective temperatures, S910. The temperature from each of the temperature sensors 832 is communicated to the microcontroller 834 of the electrical connector 810. In exemplary embodiments, only a signal indicating that a temperature threshold has been met or exceed, without an indication of a specific temperature, is communicated to the microcontroller 834 of the electrical connector. The microcontroller 834 communicates the one or more temperatures (or threshold signal), via the transceiver 836, to the alarm device 850, S912. In exemplary embodiments, the temperatures of the electrical connector 810 are transmitted on a pre-determined periodic time schedule. In exemplary embodiments, the temperatures of the electrical connector 810 are transmitted in response to a request from the alarm device 850. In exemplary embodiments, the one or more temperatures are transmitted to the alarm device 850 upon one or more of the temperature sensors 832 reaching a threshold temperature as programmed into the microcontroller 834.

The temperatures (or threshold signal) communicated to the alarm device 850 from the electrical connector 810 are stored in memory in association with a date, time and/or operating status, S913, and the current and/or historical temperatures are displayed on one or more GUIs of the alarm device 850, S915. Further, the communicated temperatures (or the threshold signal) are acted upon by the temperature monitoring module 859(*b*) executing on the alarm device 850. The temperature monitoring module 859 (*b*) continually assesses the communicated temperature data containing a current temperature against one or more threshold temperatures; each threshold temperature indicating a different temperature operating status of the electrical connector 810. In the flowchart of FIG. 28, the temperature is assessed against a first temperature threshold, S914, wherein meeting or exceeding the threshold indicates that the electrical connector 810 is operating at a higher than normal, but still acceptable, operating temperature. If the first temperature threshold is not met or exceeded, S914:NO, operation returns to S910, wherein the alarm device 850 continues to receive temperature readings from the electrical connector 810 under normal operating procedures. In the instance of having received the threshold signal in place of a specific temperature no comparison is required, rather a warning can be delivered by the alarm device based only on having received the threshold signal; the use of more than one temperature sensor 832, each calibrated for a different temperature threshold, can provide different warning levels without need of a comparison.

Referring once again to the process for comparing specific temperatures illustrated in FIG. 28, if the first temperature threshold is met or exceeded, S914:YES, a first level warning is presented to the user using sound or color via the alarm device 850, S916, and the temperature is assessed against a second temperature threshold, S918. Meeting or exceeding the second temperature threshold indicates the electrical connector 810 is operating at a high temperature that is likely to cause failure of the electrical connector 810. If the second temperature threshold is not met or exceeded, S918: NO, operation returns to S910, wherein the alarm device 850 continues to receive temperature readings from the electrical connector 810 under normal operations albeit with the first level warning displayed.

If the second temperature threshold is met or exceeded, S918:YES, a second more urgent warning is presented to the user using a different sound or color via the alarm device 850, S920. In exemplary embodiments, the alarm device 850 may automatically, e.g., without user intervention, transmit an instruction, responsive to meeting or exceeding the second temperature threshold, to the electrical connector 810 to turn OFF, S922, thereby terminating operation of the control system 824 of the electrical connector 810 and causing the switch 840 to open. In exemplary embodiments, a predetermined time delay occurs prior to an automatic turn OFF. In exemplary embodiments, an automatic turn OFF option is can be enabled or disabled at the alarm device. In exemplary embodiments, the alarm device 850 waits to receive a user instruction (e.g., via selection of an OFF indicator from one of the GUIs) prior to transmitting an instruction to the electrical connector 810 to turn OFF.

In exemplary embodiments, a single temperature threshold is used to prompt a warning by the alarm device 850. In other embodiments, greater than two temperature thresholds are used to prompt escalating warnings from the alarm device 850.

In exemplary embodiments, upon the electrical connector 810 being supplied with power, the energy metering device 842 measures the energy consumed via the electrical connector 810, S930 and communicates the energy consumption data to the microcontroller 834. The microcontroller 834 transmits, via the transceiver 836, the energy consumption data containing the current energy consumption to the alarm device 850, S932. In exemplary embodiments, temperature data and energy consumption data are transmitted in the same communication from the electrical connector 810 to the alarm device 850. In exemplary embodiments, temperature data is transmitted in a communication that is distinct from the communication transmitting the energy consumption. In exemplary embodiments, the energy consumption of the electrical connector 810 is transmitted on a pre-determined periodic time schedule. In exemplary embodiments, the energy consumption of the electrical connector 810 is transmitted in response to a request from the alarm device 850. In exemplary embodiments, the energy consumption is transmitted to the alarm device 850 upon the energy consumption reaching a threshold level as programmed into the microcontroller 834. In exemplary embodiments, the current energy consumption is associated with a specific time period, e.g., an hour, day, month, year, or since power has been supplied to the electrical connector 810. The specific time period can be programmed into the microcontroller 834 and/or identified in a communication from the alarm device 850 to the microcontroller (e.g., a user may set a time period for measuring energy consumption via a graphical user interface). In exemplary embodiments, the energy consumption is correlated to the temperature of the electrical device 810.

The energy consumption communicated to the alarm device 850 from the electrical connector 810 is acted upon by the energy consumption module 859(*c*). The energy consumption module 859(*c*) operates on the energy consumption data provided by the energy metering device 842 to maintain and provide current and historical energy consumed by storing the energy consumption data in memory 858 of the alarm device 850 in association with one or more of a time, date, time period, or operating status of the electrical connector 810, S934. In exemplary embodiments, energy consumption of the electrical connector 810 for is stored in association with the one or more temperatures of the electrical connector 810 for a same time, date, time period, or operating status. The time, date, time period or operating status can be transmitted by the microcontroller 834 to the alarm device 850 or determined at the alarm device 850. The current and/or historical energy consumed can be displayed on one or more GUIs of the alarm device 850, S936. In exemplary embodiments, the energy consumption module 859(*c*) operates to turn OFF the electrical device 810 when a predetermined amount of energy has been consumed.

As noted herein, the one or more temperatures received at the alarm device 850 or the energy consumption data received at the alarm device 850 are displayed in association with a specific electrical connector 810 in the listing of 1001 of the GUI 1000 in FIG. 29. Further details for each of the electrical devices 810 in the listing 1001 can also be obtained by selection of one of the electrical devices 810 from the listing 1001. For example, selection of the electrical connector 810 having the personalized identifier "Mason's Bedroom" from the GUI 1000 of FIG. 29 causes display of the GUI 1100 of FIG. 30, which also displays the personalized identifier of "Mason's Bedroom."

Figure 30:
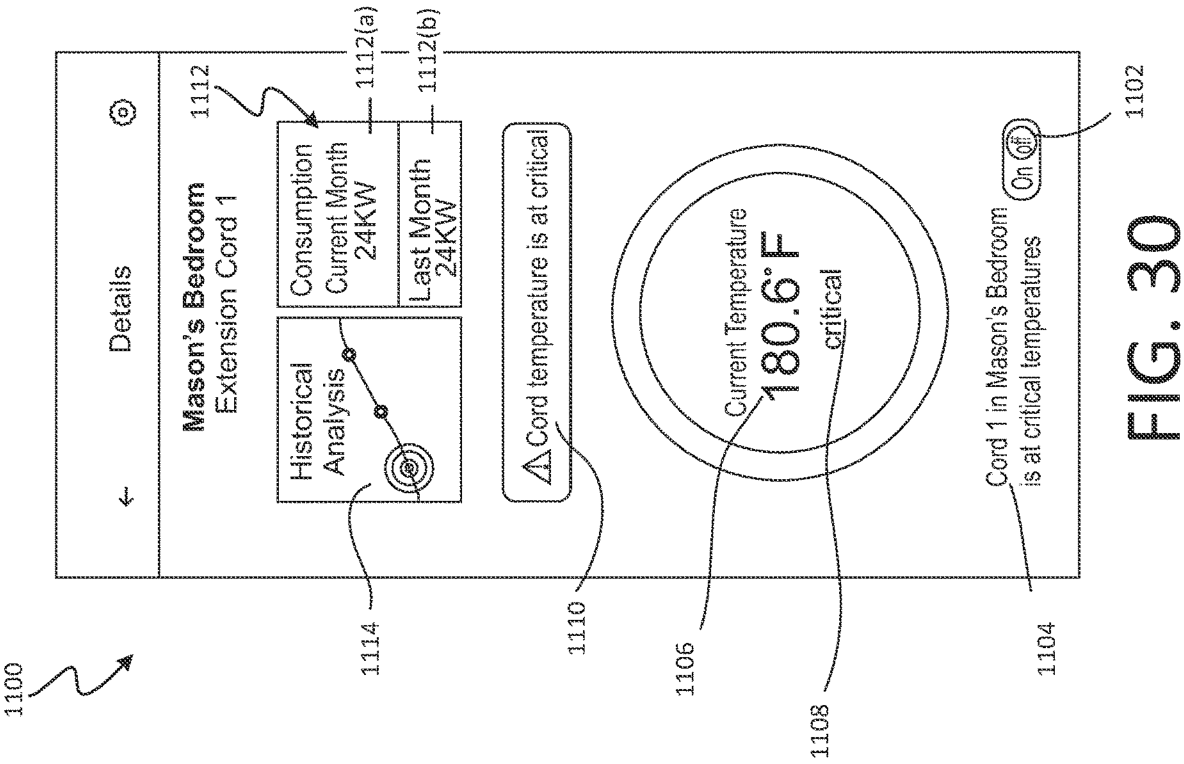
FIG. 30 is an example of a graphical user interface displayed on the alarm device which displays one or more parameters related to the electrical connector and which is usable to access, instruct, or control the electrical connector.

The GUI 1100 of FIG. 30 includes an ON/OFF indicator 1102 that is selectable to turn ON the inactive electrical connector 810 of "Mason's Bedroom" or selectable to turn OFF an active electrical connector 810 of "Mason's Bedroom." A text status indicator 1104 is provided in the GUI to provide a textual description of the current operating status of the electrical connector 810. The GUI 1100 additionally includes a temperature indicator 1106 that displays one or more current temperatures transmitted from the electrical connector 810. A word status indicator 1108 indicating one of a plurality of operating statuses of the electrical connector 810 can also be displayed. A warning indicator 1110 is displayed, when suitable, to indicate an undesirable operating status. One or more elements of the GUI 1100, such as indicator 1102, indicator 1104, indicator 1106, indicator 1108, can be colorized (e.g., green, yellow, red) to indicate an operating status of a respective electrical connector 810.

In exemplary embodiments, the plurality of operating statuses includes a "normal" operating status, a "warm" operating status, or a "critical" operating status; other and/or greater or fewer operating statuses may also be used. The "normal" operating status indicates that the electrical connector 810 is operating within a predetermined acceptable temperature operating range and has not exceeded a temperature threshold. A "warm" operating status indicates that one or more temperatures of the electrical connector 810 has exceeded a first temperature threshold but has not exceeded a second temperature threshold and, as such, can continue to operate normally while also display a warning of the increased temperature. A "critical" operating status indicates that one or more temperatures of the electrical connector 810 has exceeded a second temperature threshold. The second temperature threshold reflects an operating temperature that may cause failure of the electrical connector 810.

Figures 31A, 31B, 31C:
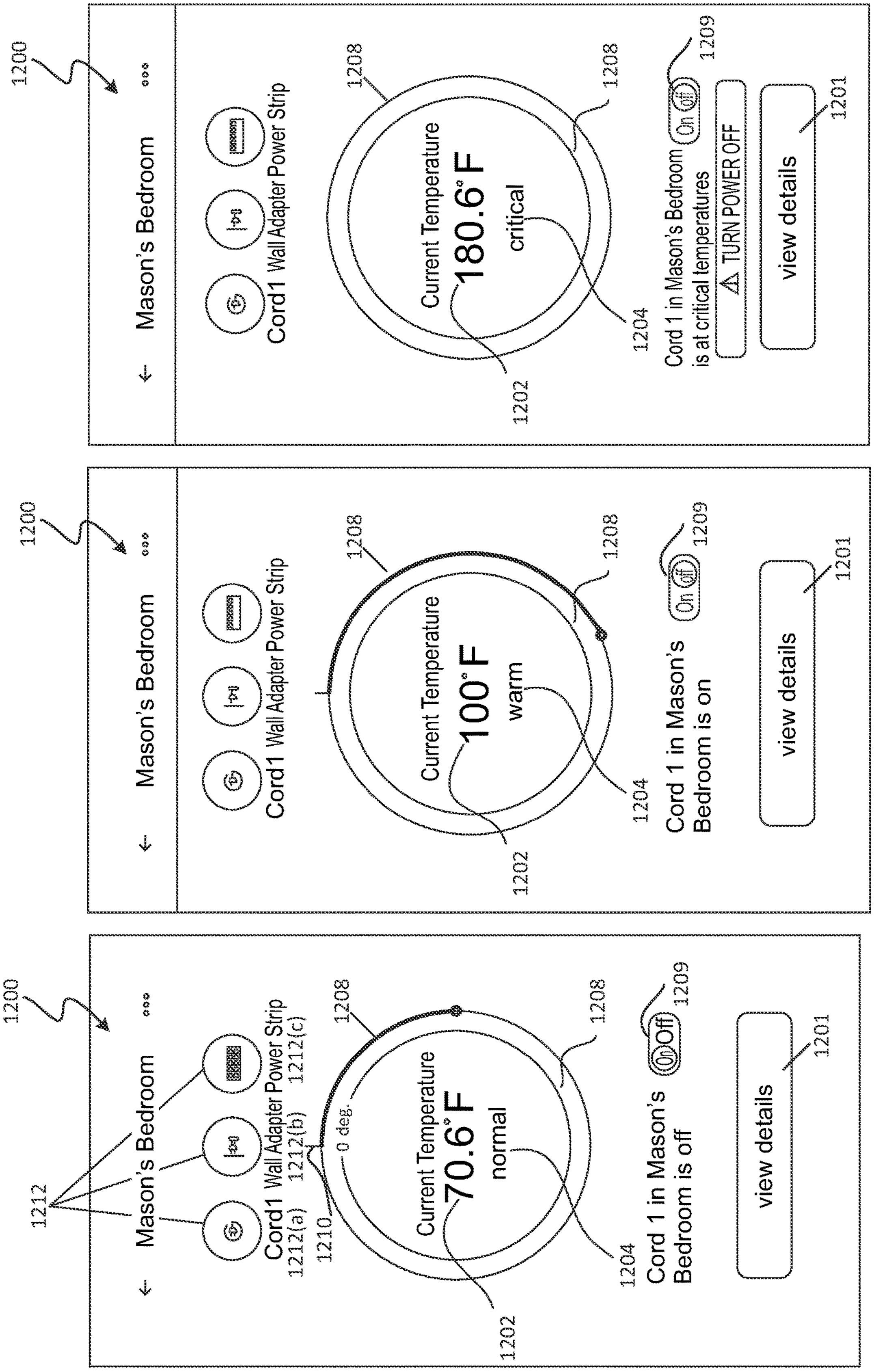
FIGS. 31A-31C are examples of a graphical user interface displayed on the alarm device which displays one or more parameters related to the electrical connector and which is usable to access, instruct, or control the electrical connector.

Referring now to FIGS. 31A, 31B and 31C, each of which illustrates an exemplary GUI 1200 for each of the "normal" operating status, the "warm" operating status, and the "critical" operating status, respectively. The GUIs 1200 can provide access to a detailed view, e.g. GUI 1100 of FIG. 30, via selectable element 1201. Dependent upon configuration, each of the GUIs can provide access to one or more of the other GUIs illustrated herein.

In the GUI 1200 a numerical temperature indicator 1202 of the current temperature of the electrical connector 810 is displayed along with a word status indicator 1204. An outline 1206 is provided about the numerical temperature indicator 1202 and the word status 1204 indicator that changes color in accordance with the change in operating status, e.g., "normal"—green, "warm"—amber, "critical"—red (other colors to indicate different temperatures can also be used). A line indicator 1208 follows the outline 1206 and provides indication of the current temperature as measured from zero degrees (C/F) at a starting point 1210 of the line indicator 1208. A selectable ON/OFF indicator 1209 is also provided to remotely control ON/OFF operation of the electrical device 810 is also provided.

In exemplary embodiments, as illustrated in FIGS. 31A, 31B, 31C, the GUI 1200 includes a device type indicator 1212. The device type indicator 1212 indicates (via text or icon) the type of electrical connector 810 that is remotely accessed by the alarm device 850 and can comprise, for example, the various electrical devices 810 of FIGS. 23A-23C including, the extension cord 810(*a*), the adapter 810 (*b*), the power strip 810(*c*), the drill 811(*a*) with electrical connector 810(*d*), the refrigerator 811(*b*) with electrical connector 810(*e*), and the lamp 811(*c*) with electrical connector 810(*f*). In the illustration of FIGS. 31A-31C, an "extension cord" device type indicator 1212(*a*) is selected while a "wall adapter" device type indicator 1212(*b*) and a "power strip" device type indicator 1212(*c*) are unselected.

Referring once again to FIG. 30, in exemplary embodiments, GUI 1100 additionally displays an energy consumption indicator 1112 that presents the energy consumption that has been determined at the electrical connector 810 by the metering device 842 and transmitted to the alarm device 850. The energy consumption displayed may be the energy consumption through the electrical connector 810 since the electrical connector 810 was activated or the energy consumption for a specific time period, e.g., an hour, a day, a month, a year etc. In exemplary embodiments the energy consumption indicator 1112 is divided into a first section 1112(*a*) and a second section 1112(*b*) with the first section 1112(*a*) displaying energy consumption for a present time period and the second section 1112(*b*) displaying an energy consumption for a past time period for the respective electrical connector 810.

Figure 32:
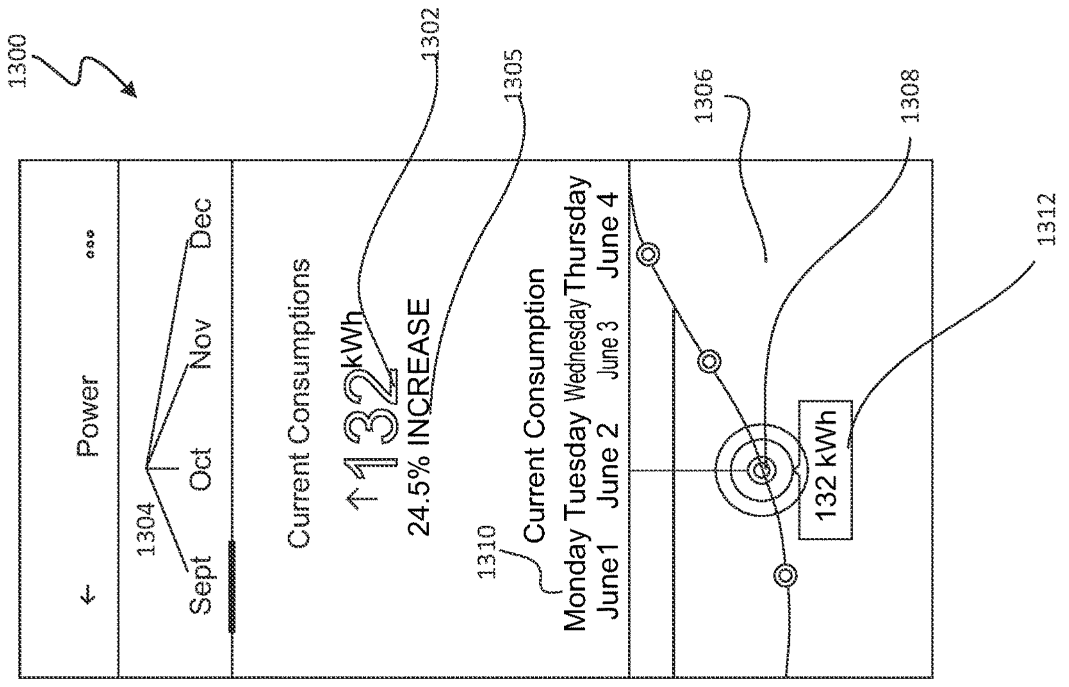
FIG. 32 is an example of a graphical user interface displayed on the alarm device displaying current and historical operation of the electrical connector.

In exemplary embodiments, GUI 1100 additionally displays an historical analysis indicator 1114. Selection of the historical analysis indicator 1114 prompts display of the GUI 1300, which is illustrated in FIG. 32. The GUI 1300 displays a current energy consumption indicator 1302 for a specific time period selected via a selectable time period indicator 1304, e.g. "September," "October," "November," and "December" A comparison indicator 1305 displays a calculated change in energy consumption based on the current energy consumption and a historical energy consumption (e.g., the energy consumption of the previous year on the same data or a previous month for the same date, etc.). An historical energy consumption graph 1306 is also displayed in the GUI 1300 illustrating the energy consumption of the electrical connector 810 over time. The historical energy consumption graph 1306 marks a specific time period with a time period indicator 1308, e.g., a dot, wherein selection of the time period indicator highlights the relevant time period in a shadowed listing 1310 of time periods and displays the energy consumption 1312 for the relevant time period. In exemplary embodiments, a color of the historical energy consumption graph 1306 varies in accordance with the historical temperature of the 810 and the corresponding operating status, (e.g., "normal," "warm," and "critical") of the electrical connector 810 for the relevant time period e.g., "normal"—green, "warm"—amber, "critical"—red. As such, the historical energy consumption graph 1306 easily enables a user to determine where temperature spikes during operation of the electrical connector 810 have occurred.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. An electric vehicle charging system for monitoring temperature, comprising:

a battery;

a power line in electrical communication with the battery;

an electric vehicle charging system comprising electrical contacts in electrical communication with the power line; and a control system comprising a relay, a temperature sensor, and an input/output (I/O) circuit, the relay selectively providing electrical communication between the electrical contacts and the power line, the temperature sensor positioned to sense a temperature corresponding to the electrical contacts, the output circuit for transmitting a temperature value sensed by the temperature sensor.

2. An electric vehicle charging system for monitoring temperature, comprising:

a power line;

an electric vehicle charging system comprising electrical contacts in electrical communication with the power line; and a control system comprising a relay, a temperature sensor and an output circuit, the relay selectively providing electrical communication between the electrical contacts and the power line, the temperature sensor positioned to sense a temperature corresponding to the electrical contacts, the output circuit for transmitting data corresponding to a temperature value sensed by the temperature sensor.

3. The electric vehicle charging system of claim 2, wherein the control system further comprises a relay arranged to selectively provide electrical communication between the electrical contacts and the power line.

4. The electric vehicle charging system of claim 2, wherein the output circuit is in electrical communication with a wired data bus.

5. The electric vehicle charging system of claim 2, wherein the output circuit is in electrical communication with a wireless transmitter.

6. The electric vehicle charging system of claim 5, wherein the wireless transmitter is a transceiver.

7. The electric vehicle charging system of claim 2, wherein the output circuit is an input/output (I/O) circuit.

8. The electric vehicle charging system of claim 2, further comprising a charging station for an electric vehicle, the charging station for an electric vehicle comprising the electrical contacts and the control system.

9. The electric vehicle charging system of claim 8, wherein the charging station further comprises a power line in electrical communication with the electrical contacts.

10. The electric vehicle charging system of claim 2, further comprising a housing, wherein the housing houses the electrical contact.

11. The electric vehicle charging system of claim 10, wherein the housing further houses the control system.

12. The electric vehicle charging station of claim 10, wherein the housing is positioned proximal an end of the power line.

13. The electric vehicle charging station of claim 10, further comprising a battery, wherein the housing further houses the battery, the temperature sensor, and the control system.

14. The electric vehicle charging system of claim 13, wherein the housing further houses the power line.

15. The electric vehicle charging system of claim 2, further comprising a battery.

16. The electric vehicle charging system of claim 2, wherein the data is an alarm signal.

17. The electric vehicle charging system of claim 2, wherein the data is a flag indicating an over temperature condition.

18. The electric vehicle charging system of claim 2, wherein the control system further comprises a processor, the processor in data communication with the temperature sensor.

19. The electric vehicle changing system of claim 18, wherein the processor is a programmable circuit.

20. A method of controlling heat in an electric vehicle charging system, the method comprising:

conducting an electric current to a battery in an electric vehicle through an electrical connector, the electrical connector being an electrical connector between an electric vehicle and an electric vehicle charger;

sensing a temperature corresponding to the electrical connector; and in response to the temperature being at or above a determined temperature, opening a relay in electrical communication with the battery, terminating a flow of the electric current through the electrical connector and to the battery in the electric vehicle, and transmitting at least one data item corresponding to a temperature value.

21. The method of controlling heat in an electric vehicle charging system of claim 20, wherein:

a relay is in electrical communication between the electrical connector and a power line; and the act of terminating a flow of the electric current through the electrical connector and to the battery of the electric vehicle, comprises selectively opening the relay to terminate the electrical connection between the electrical connection and the power line.

22. The method of controlling heat in an electric vehicle charging system of claim 21, wherein the act of opening the relay is automatically performed in response to determining that the temperature is at or above the determined temperature.

23. The method of controlling heat in an electric vehicle charging system of claim 20, further comprising:

generating temperature data corresponding to the temperature; and storing the temperature data in memory.

24. The method of controlling heat in an electric vehicle charging system of claim 23 further comprising:

communicating the temperature data to a remote device.

25. The method of controlling heat in an electric vehicle charging system of claim 23 wherein:

communicating the temperature data to a remote device comprises wirelessly transmitting the temperature data.

26. A method of controlling heat in an electric vehicle charging system, the method comprising conducting an electric current to a battery in an electric vehicle through an electrical connector, the electrical connector being an electrical connector between an electric vehicle and an electric vehicle charger;

sensing a temperature corresponding to the electrical connector; and transmitting a unique identification number associated with the electrical connector in response to determining that the temperature data has met or exceeded the temperature threshold.

27. The method of controlling heat in an electric vehicle charging system of claim 26, wherein the unique identification number identifies the electrical connector.

28. The method of controlling heat in an electric vehicle charging system of claim 27, wherein the act of transmitting the unique identification number comprises wirelessly transmitting the unique identification.

29. A method of controlling heat in an electric vehicle charging system, the method comprising:

conducting an electric current from an electric vehicle charger, through an electrical connector, through a relay, and to a battery in an electric vehicle;

sensing a temperature corresponding to the electrical connector;

generating temperature data;

communicating the temperature data and a unique identification number associated with the electrical connector; and in response to the temperature being at or above a determined temperature, automatically opening the relay and terminating a flow of the electric current through the electrical connector and to the battery in the electric vehicle.

* * * * *